US012117982B1

(12) United States Patent
Ballin et al.

(10) Patent No.: US 12,117,982 B1
(45) Date of Patent: Oct. 15, 2024

(54) COMPUTING APPARATUSES, METHODS, SOFTWARE AND DATA STRUCTURES FOR STORING, INDEXING AND RETRIEVING DATA SUBJECT TO THE CONTINUOUS TEMPORAL EVOLUTION OF HETEROGENEOUS BUSINESS PROCESSES

(71) Applicant: Intelligent Lagoon Research Ltd, London (GB)

(72) Inventors: James Ballin, London (GB); Ian Hunt, Heathfield (GB)

(73) Assignee: Intelligent Lagoon Research Ltd, London (GB)

( * ) Notice: Subject to any disclaimer, the term of this patent is extended or adjusted under 35 U.S.C. 154(b) by 0 days.

(21) Appl. No.: 18/412,663

(22) Filed: Jan. 15, 2024

(30) Foreign Application Priority Data

May 11, 2023 (WO) ................. PCT/EP2023/062693

(51) Int. Cl.
*G06F 16/00* (2019.01)
*G06F 16/18* (2019.01)
*G06F 16/21* (2019.01)
*G06F 16/23* (2019.01)
*G06F 16/2458* (2019.01)

(52) U.S. Cl.
CPC ........ *G06F 16/219* (2019.01); *G06F 16/1805* (2019.01); *G06F 16/21* (2019.01); *G06F 16/2365* (2019.01); *G06F 16/2477* (2019.01)

(58) Field of Classification Search
CPC .................................................... G06F 16/21
See application file for complete search history.

(56) References Cited

U.S. PATENT DOCUMENTS

| | | | |
|---|---|---|---|
| 11,048,593 B2 | 6/2021 | Knuhtsen | |
| 2019/0012637 A1 | 1/2019 | Gillen | |
| 2019/0281066 A1 | 9/2019 | Simons | |
| 2020/0356082 A1 | 11/2020 | Wang | |
| 2021/0058418 A1* | 2/2021 | Murphey | H04L 63/145 |
| 2021/0281395 A1 | 9/2021 | Narayanaswami | |

FOREIGN PATENT DOCUMENTS

| | | |
|---|---|---|
| CN | 112506747 B | 5/2021 |
| CN | 115965372 A | 4/2023 |

OTHER PUBLICATIONS

International Search Report and Written Opinion issued in PCT/EP2023/062693, dated Dec. 19, 2023, 19 pages.

* cited by examiner

*Primary Examiner* — Ajith Jacob
(74) *Attorney, Agent, or Firm* — Blueshift IP; Robert Plotkin

(57) ABSTRACT

Computing apparatus, computer implemented methods and computer readable media comprising instructions for: monitoring and storing data pertaining to a plurality of business processes; indexing for retrieval immutable, denormalised blocks storing data pertaining to the plurality of business processes; for managing process objects instantiated by a processor to monitor progress of the plurality of business processes; and for interrogating immutable, denormalised blocks storing data pertaining to a plurality of business processes.

20 Claims, 25 Drawing Sheets

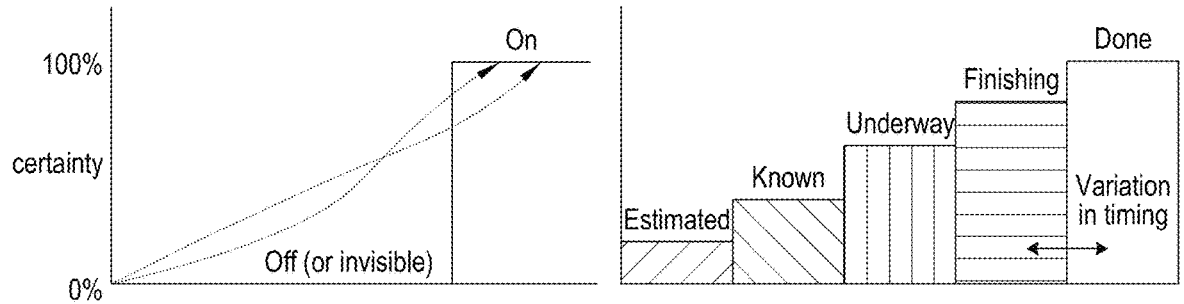

FIG. 3

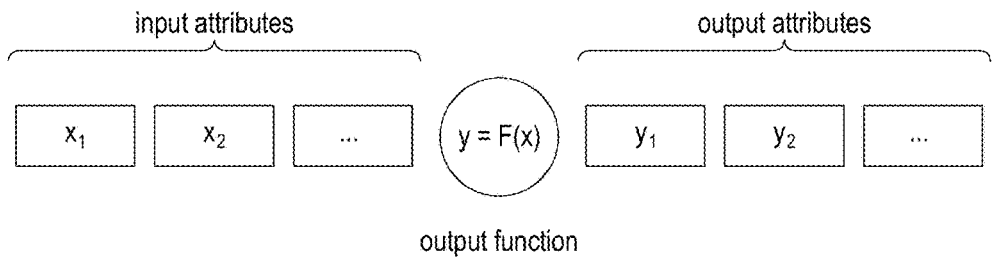

FIG. 4

| Stencil | | | | |
|---|---|---|---|---|
| Stencil Parameters | | Schedule Function | | |
| Stencil Name | Market Order | State | Event Signal | Timing |
| Tags | User: $Username | Estimated | Planned | $TInit |
| Input Attributes | Item (String) Quantity (Int) Price (Currency) | Known | Confirmed | end_of_day ($TInit) |
| | | Underway | Picking | beginning_of_day ($TKnown + 1 day) |
| Output Functions | Cost (Currency) = Quantity * Price | Finishing | Packing | $TUnderway + 3 hours |
| Hyper-Indices | $Item | Done | Despatched | end_of_day ($TUnderway) |

| Parameter | Operates at | Purpose | Type | Use |
|---|---|---|---|---|
| Information time $t_i$ | Processes, blocks, and hyper-indices | Picks one block from the list of blocks contained in a process or the set of blocks known to the hyper-index. The block captures everything we know about the process at that point in information time. | Continuous, between $t_{-\infty}$ and now $t_0$ | Latest and greatest view. Reconstruction and audit: what did we know when...? Evaluate contributions of adjustments and corrections. |
| Information state $S_i$ | Blocks | Describes what quality of knowledge the block has. A block is estimated when all the future states are populated, and there is no history, i.e. it was created while the process itself was in an estimated state. A block is done when there are no more future states. | At least one state. | Include or exclude blocks created with speculative through to certain knowledge. A block forecasting a done state with a data state of finishing is more reliable than one whose information state is estimated. |
| Effect time $t_e$ | Within the block | Within a single block, picks one of the states (if any) prevailing at the effect time. | Continuous, any time between $t_{-\infty}$ and $t_{\infty}$. | Relative past, present, or future. |
| Effect state $S_e$ | Within the block | Control over the state of the process (and attributes) at the effect time requested. | At least one state. | Control over the certainty of the attribute taking effect. |

FIG. 18

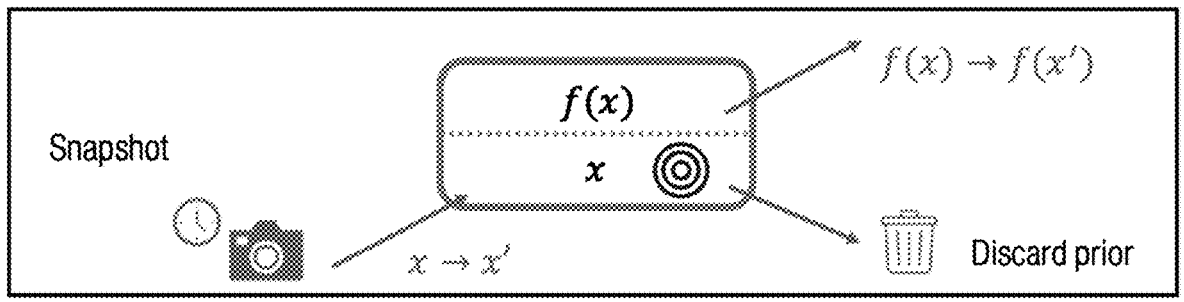
(a) Classical management of state: monotemporal monostate crystallized views.
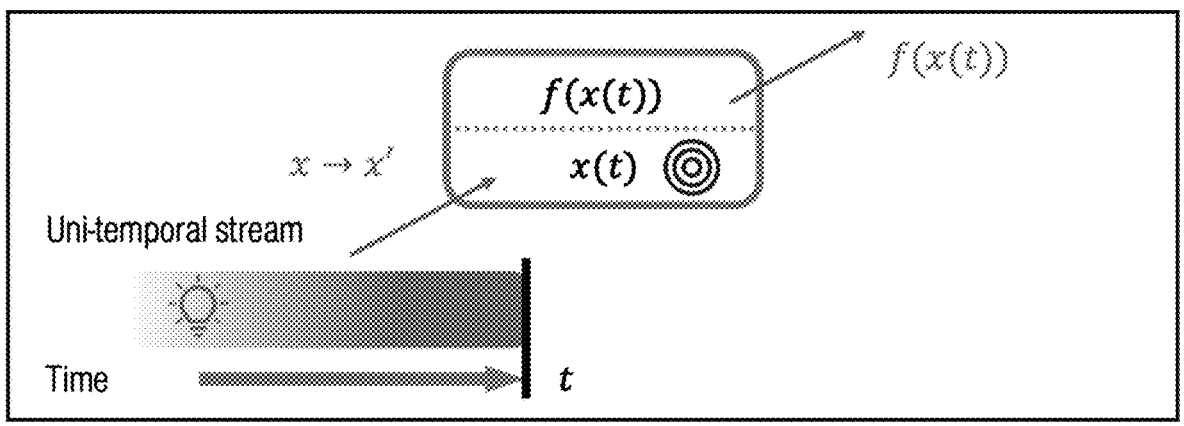
(b) Advanced state management: monotemporal monostate streaming views.
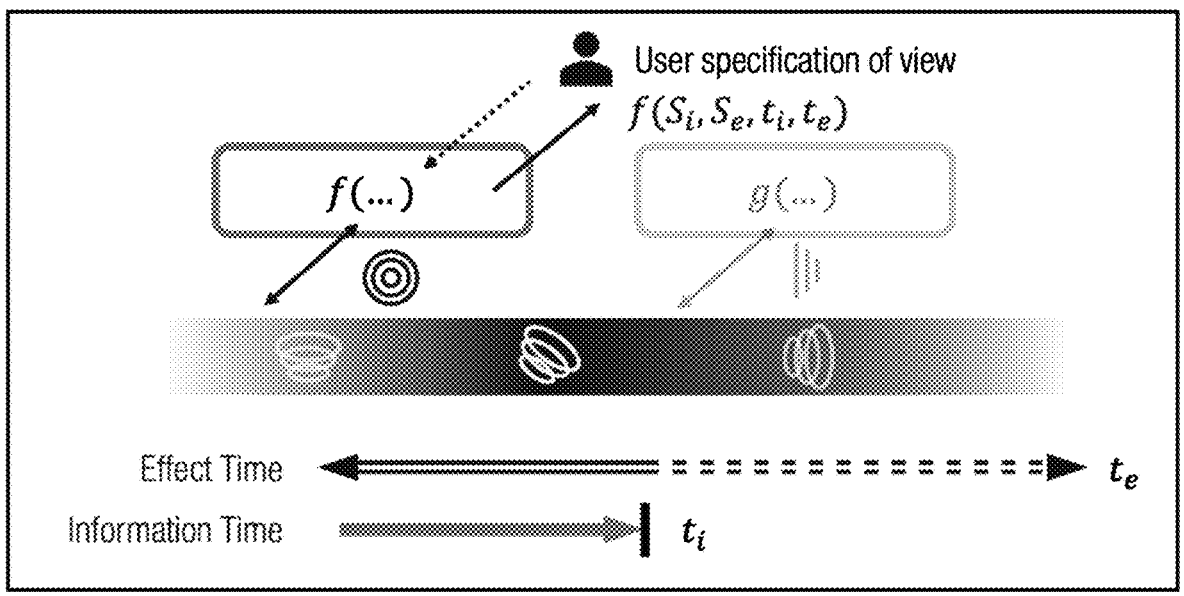
(c) Intelligent Lagoon manages state offering views on-demand to decoupled functionality.
FIG. 21

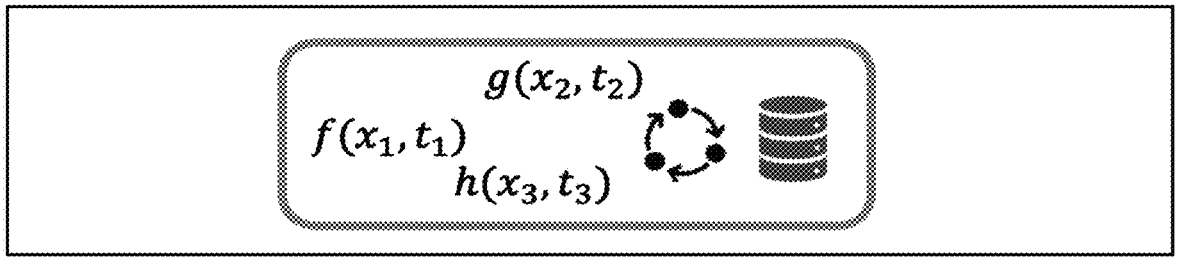

(a) Monolithic relational database-centric architecture: there is a global control of timing and state against a complete centralised data model and complexity manifests when developing and extending the application.

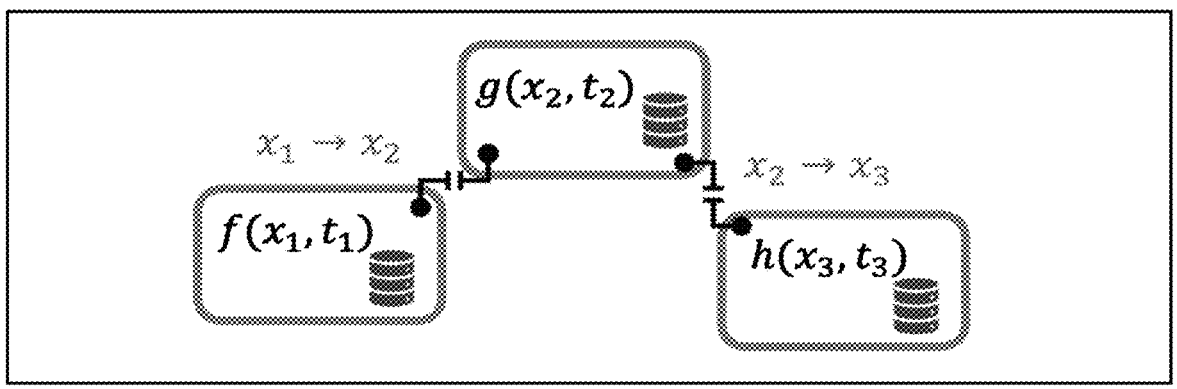

(b) Microservice-based / best-of-breed architecture: each service encapsulates local state and manipulates incoming messages accordingly. Complexity manifests in communication between services.

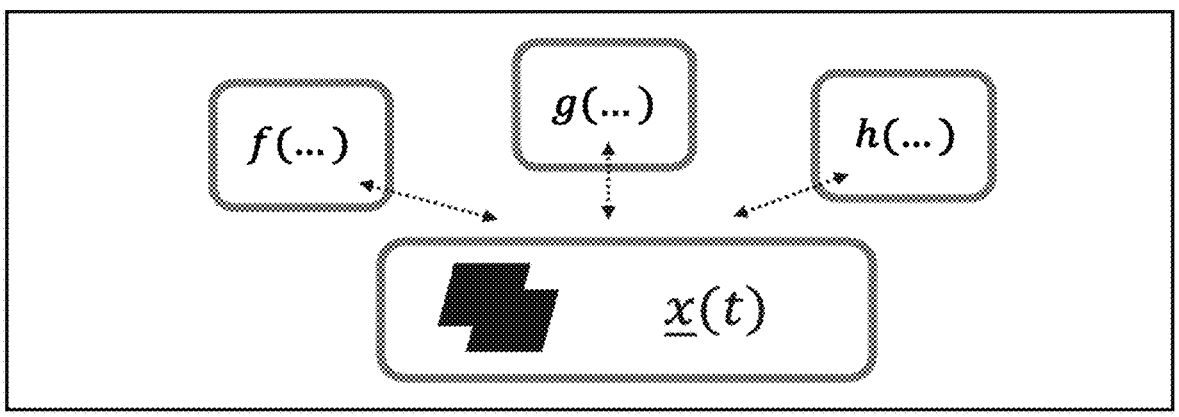

(c) Architecture with Intelligent Lagoon. Complexity pertaining to managing coherent state is maintained by Intelligent Lagoon rather than by consumer applications and services.

FIG. 22

COMPUTING APPARATUSES, METHODS, SOFTWARE AND DATA STRUCTURES FOR STORING, INDEXING AND RETRIEVING DATA SUBJECT TO THE CONTINUOUS TEMPORAL EVOLUTION OF HETEROGENEOUS BUSINESS PROCESSES

TECHNICAL FIELD

The present disclosure relates to computing apparatus, computer implemented methods and computer readable media storing instructions for monitoring, storing, indexing, retrieving, data pertaining to a plurality of business processes which evolve through time and certainty.

BACKGROUND

Complex organisations, particularly modern enterprises, are increasingly dependent on software-driven technologies to anticipate, monitor, and manage their many overlapping and diverse business processes. These technologies play a crucial role in enabling the efficient planning and smooth execution of business operations, the optimal utilisation and allocation of assets and resources, the exploitation of opportunities and mitigation of risks, all while the commercial environment evolves. As such, various business management software systems based around a variety of database and software technologies have been developed over time and their complexity has increased to match the needs of modern organisations.

It is in this context that the present disclosure has been devised.

SUMMARY OF THE DISCLOSURE

The management of state is a fundamental challenge in computing, especially for enterprise applications where multiple, concurrent, diverse real-world events evolve incoherently through time and mutate state across different parts of the enterprise. Conventional applications treat events as either wholly invisible or fully visible and arbitrarily certain, manifesting as data. In reality, every event evolves through a lifecycle in which its certainty (and its data) matures over time. If it can be known, an event and its data should always be visible, with its uncertainty obvious and explicit at every point.

As a consequence of this inability to understand the temporal evolution of data and events, enterprise architectures often become needlessly complex, complicated, difficult to maintain, extend, and reason with. Whether the architecture is monolithic and relational database-centric, or streaming and microservice-based, state tends to be closely tied to functionality. Each piece of functionality implicitly encapsulates an arbitrary and unilateral view of state in terms of timing and a threshold of certainty and hence visibility. However, this approach to software, treating data as static in time and arbitrarily certain, makes state in the presence of evolving events to be brittle, and functionality to be inflexible and inaccurate. In a world of accelerating change and increasing complexity, these assumptions limit what the user can do, and limit what the user can know.

Software systems for managing business data emerged in the middle of the twentieth century when computing resources were extremely limited. Relational databases (RDBMS) based on Codd's relational model of data have been widely adopted due to their effective management of business information with a space-efficient and consistent data model. While a normalised data model makes for an efficient use of storage space and facilitates navigation of relations, joins at query time can be slow especially as the volume of data and complexity of the model increase. The process of inserting and updating rows of data in tables involves locks and transactions, and while rows can be versioned, reconstructing queries across joins using versioning is challenging. The design of the schema plays a crucial role in determining the functionality that can be offered and it can be difficult to get right at the beginning and to adapt to changing requirements.

Contrasting with relational databases, document databases, which originated as far back as IBM's Information Management System (IMS, released 1968)™, have seen a resurgence in popularity. However they offer relatively weak safety guarantees and there are limitations to the hierarchical and network models of data because they do not support the characteristic of access path independence of relational data.

The relational database model and the document-oriented model both have their advantages and disadvantages. However, both arose in the earliest days of computing's development when computing resources were extremely limited. This has influenced how we capture and record data in systems today.

In addition to the above two different database paradigms, two recent technological developments that are relevant to organisational data handling and storage should also be mentioned. First, decentralized blockchain (distributed ledger) technologies emerged in 2009. Blockchains are data structures with append-only immutable characteristics with high resistance to tampering, thus improving the security of data stored within them, albeit incurring significant performance penalties when reading and writing data. Second, event-driven architectures and platforms, such as Apache Kafka™ (open sourced in 2011) or Amazon Web Services EventBridge™ combine message broking with stream processing to allow heterogeneous systems to communicate asynchronously and for computations to be performed as information arrives. This can reduce latency compared to batch-based systems, but it is debatable whether architectures are simplified. One should also note that such streaming data platforms are not databases in themselves, but database technologies such as Materialize™ and ksqlDB™ have been specifically developed to consume event streams and provide database-like functionality using them.

Aside from the data models used by software systems to store data relating to business processes, the business software applications themselves that interact with the data models typically handle the state of events that happen in business processes in a manner that is specific to each application. That is, the assessed state of a business process is individual to each business application, and the state is assumed to be static until a need arises to cause the application to mutate it.

Furthermore, irrespective of the programming language in use, it is common for state to be persisted by a database of one of the forms described above. This separation of state is superficial. The database has the responsibility to ensure the data is durable and consistent according to the specification of the data schema, but it does not manage the evolution of the data itself—this remains the responsibility of the application. The data in the database remains in its state of rest until acted on by an application. Furthermore, while enterprise systems can theoretically be considered as single programs, in practice they resemble a collection of programs that are woven together and have more in common with object-oriented languages where each entity encapsulates its own state.

As such, existing software systems struggle with the fact that events evolve as they affect our lives, businesses, and organizations. Events rarely appear as finished articles out of a vacuum. They often first appear uncertain and indefinite, progress and mutate, and usually (but not always) increase in certainty and become more concrete. Events impact many parts of the business in space and time, and inconveniently span many systems and users as they do so. Events are dynamic and the certainty associated with them (and any attributes they carry or infer) is neither binary nor guaranteed to be strictly increasing with time.

In the course of digitisation, software has systematically tended to treat these events as much more static and certain than they really are. It is incorrect to say "the world is digital": while at a fundamental level nature is quantum mechanical and discrete, at the level of our day-to-day lives, the world is classical and inconveniently, analogue. Thus the static view of state as fundamentally assumed and adopted by business management software systems is unrepresentative of the business processes they are intended to manage, especially when human behaviour and real objects are involved.

Thus while single programs and individual applications may be appropriate for addressing particular events, or a portion of any particular event's lifecycle, these assumptions present an enormous problem for enterprise applications and enterprise users. Enterprises are distinguished by the size, complexity, and diversity of their activities, and hence heterogeneity of events and processes. Enterprises dedicate enormous effort to strategic planning, often with very long time horizons (sometimes decades), balancing uncertain supply and uncertain demand, with complex supply chains, making efficient use of capital, all the while managing the operational minutiae of everyday business.

The Zachman model of Enterprise Architecture (EA, which we note is as much about understanding the structure of an organization as it is about IT) is based around the 6 interrogatives: what, who, where, how, when, and why? In a world of accelerating change, increasing complexity, and the increasing importance of factors outside the organization's control (e.g. scarcity of resources arising from climate change), how are these questions to be answered when time and certainty are so fundamental? Current business management software systems, based around the above database models, static assumptions and encapsulated approaches to state, struggle to answer these questions for the following reasons.

First, existing business management software systems tend to impose a unary or binary treatment of timing and certainty. IBM's Random Access Method of Accounting and Control (RAMAC, 1956) was severely constrained by the memory, storage, and processing resources available at the time. Accounting was chosen as the demonstrative application as a financial transaction experiences a lifecycle (order, trade execution, confirmation, posting, and settlement) and posting to accounts is late in this lifecycle and expected to be definitive. Because posting to accounts is not expected to vary, updates, adjustments and corrections (which are not as easy to handle as inserting data in the first instance) are the exception rather than the norm. Furthermore, the event needed only to be captured once it was an accepted fact, and there was no apparent need to capture it earlier in its lifecycle. Accounting is complete, at least as far as financial impacts are concerned as all business activities with financial implications must eventually lead to accounting's General Ledger.

Accounting-centric systems continue to be built. These kinds of systems are not even binary in their treatment of certainty. They're unary: before the event is 'done' it is not even visible to the system. It appears as 'on' from nothing. Fundamentally, the idea that an event has a lifecycle is not captured by these models. Consequently, there is no natural competency in the data model to perceive events at different stages in their lifecycle.

Second, existing business management software systems tend to store information about events in order to offer monostate monotemporal crystallized views. By monostate we imply a view whereby an event transitions from 'off' to 'on' when it crosses a singular software-specific threshold of certainty. Each system captures (and can only capture) the event when it deems the event is certain enough for the functionality to perform (and no earlier) and thus there is a tight integration of state and functionality. By monotemporal we mean that the recording of events is specific to a particular point in time and has an implicit coupling between the moment that the event takes effect and when we learn about it, that is, the time that the information about the event is received. If the record is wrong because we learn of corrections, we need to drop the old record and replace it with the new. Oftentimes it is more convenient to replace the entire dataset from an authoritative complete source such as accounting, and this approach is called "flush-and-fill". By crystallized we mean that the view has been frozen in time: the events are now recorded, they are no longer evolving in this representation, and we have lost information about where they have come from and where they may be going. In common parlance we call a monostate monotemporal crystallized view a snapshot.

It is important to recognize that this is not restricted to batch-based and antiquated systems. Even in streaming systems, while not crystallized, each piece of functionality maintains a streaming monostate monotemporal view based on notifications received from the stream.

Third, existing business management software systems tend to provide multiple incoherent partial views of the data. Large enterprises typically deploy multiple different business management software systems with each maintaining a monostate monotemporal crystallized view, with each system perceiving a fraction of the overall event in its lifecycle. The systems may partially overlap: first, different systems manage different activities of the business (i.e. horizontally), and second, different systems manage different phases of the event corresponding to different timing and state in the event (i.e. vertically). In Asset Management, for example, there are frequently distinct systems by asset class for the ordering (Order Management Systems, OMS) and execution of trades (Execution Management Systems, EMS), while the confirmation of trades, posting to accounts, and settlement and receipt in custody is generally agnostic of asset class. As different activities, or phases of events, are outsourced to third parties, as is so common in organisations, gaining insight into the progress of events inside these externally abstracted components becomes even harder.

The result is multiple systems in each part of an enterprise (e.g. human resources, manufacturing, trading, accounts, . . . ) recording events at particular moments in the lifecycle in the process. These partial monostate views inevitably drift apart as a result of their intrinsic inconsistency with respect to each other which worsens as time progresses and new information is received. Thus users are confronted with multiple incoherent and inconsistent partial systems and thus a need to reconcile before the errors arising from inconsistency overtake reality. Again, we see the role that accounting-centric systems play, because accounting's General Ledger is complete and eventually all activities which affect a business's financial position must arrive there. However the accounting model is late and imperfect, and intended to serve the specific purpose of financial reporting and control. These assumptions unreasonably limit other users.

In this context obtaining a complete, coherent, timely view of the state of the business, essential for management insight, operations, and governance, under the action of evolving heterogeneous and incoherent events is extremely difficult. Reconciliation between these different systems is specifically problematic for several reasons:

1. Partial overlaps imply it is ambiguous as to which system is definitive when they differ.
2. High latency and irregular computational load arise when the reconciliation process is periodic and batch-based. For a global 24/7 business, there is no unique midnight hour to run the batch.
3. It is inflexible: while a reconciliation can be semi-automated, if the nature of the business changes, the reconciliation process will need to adjust too.
4. It carries high operational risk: batch processes invariably require human supervision and interaction, comma separated value (CSV) files, Excel, macros, scripts, and these are all sources of operational risk.
5. It requires operational effort and resourcing. Resolving the differences in data is not a trivial task and requires expertise.
6. As a result, data integrity is compromised: exchanging data between systems with 'flush-and-fill' puts integrity of the data at risk.

Fourth, even in scenarios where reconciliation is not a problem, whenever data is updated in existing business management software systems there is the potential for data integrity to be compromised:

1. Row updates and deletions discard preceding data. While versioning files or rows in tables maintains a local historical record (usually for the purposes of audit) it is impossible to reconstruct the historical context (i.e. follow all the other dependent data and relations) in an efficient, reliable, and secure way.
2. The risk to data integrity is high when one needs to extract data from one monostate system, transform it, and load (i.e. 'ETL') into another monostate-based system, as occurs frequently during reconciliation and with flush-and-fill processes.
3. The nature of adjustments and corrections is often unclear when data is combined and aggregated.

Loss of data integrity is a source of high operational risk for any business, especially when security of the historical record is important, for example in finance, healthcare, aviation, and other regulated industries. This is a potential motivation for introducing blockchain, but it is a tactical solution. Blockchain improves data integrity, inasmuch as it makes it effectively impossible to tamper with data, and the distributed ledger aspect of blockchain improves shared visibility of data (with potential to reduce the number of partial views) but this technology does not solve the other issues under discussion.

Fifth, existing business management software systems tend to provide inconsistent computational performance and restricted temporal views. Systems which operate based on a monostate have tried to offer some flexibility for looking forwards and backwards in time but these are computationally much worse than simply querying the monostate view that they start from:

1. Looking backwards, and as discussed above, obtaining a historical version for a particular row may be possible, but this is usually for audit purposes and not for reconstruction of the historical context. If historical global contexts are available, these will be on a periodic basis (e.g. nightly, monthly, or quarterly), and even then these will be restricted to retrieving particular snapshots or reports rather than supporting open-ended queries.
2. Looking forwards, forecasting is often disconnected, aggregated, and highly restricted in terms of the 'assets' and 'resources' that can be forecasted. It is disconnected because it usually involves the extraction of another monostate into a separate 'tool' (e.g. CSV into Excel, again with potential for compromising integrity), aggregated because the tool cannot understand the specific line-item detail, and frequently restricted to financial planning (cash and cash equivalents).
3. Finally, these systems present a 'unified' view by combining historical data points (measurements and facts) with statistical predictions, opinions, and hypotheses for the future into a plot, even though past, present, and future are operating from disconnected or incompatible assumptions. There is much to be understood about events that are still evolving and events that have barely begun without having to resort to statistical predictions. The blending of the two regimes is opaque and deserves better transparency and control for the user to operate on the view that suits them.

We also note that data in conventional systems is limited by the frequency of snapshotting, or the frequency of a batch process to process a snapshot as input, and this introduces latency. Streaming architectures may reduce the latency between the occurrence of the event and its materialization in data, but do not solve the other issues under discussion.

Finally, existing business management software systems tend towards implementation in increasingly monolithic architectures leading to systems that are inflexible and unwieldy to manage and adapt. Business management software vendors recognise the flaws of implementing separate systems offering partial monostate views, and so to reduce the likelihood of incoherent states and facilitate the exchange of information between competencies of an organization, enterprise-wide solutions have settled on relational database-centric monolithic architectures. An enterprise resource planning (ERP) software system supposes a universal model of a business. While ERP systems are competent and elaborate, they are immensely complex and complicated. The functionality is constrained by the relational data model and structure. As a result they are difficult to extend, customise, maintain, expensive to operate (not least because of the volume of data required to drive the system) and resource-consuming to commission. In seeking universal applicability, and despite some degree of modularity, the practical embodiments do not offer 'zero cost abstractions', with many customers implicitly encumbered by components that are irrelevant to their business or industry. This reduces agility, flexibility, and increases costs for both the customer and vendor.

Nevertheless, as opposed to a monolithic architecture, a microservice architecture, where a complex application is decomposed into small, independent, and loosely coupled services, facilitates development but creates a different set of problems such as complexity arising from many moving parts, the difficulty of testing components in combination, and operational overhead (deployments, versioning etc.). Most relevant, however is that with each service managing its own state and functionality, managing coherent state across all services in a microservice architecture is challenging. Indeed in a microservice architecture the temptation to maintain a private, partial, unilateral view of state is even stronger than in a monolithic architecture because there is no architectural constraint to cooperate in terms of state, and it is the responsibility of the microservice to manage it. The cooperation is enforced by communication contracts between services at the API level. With analogy to the outsourcing practices common in large enterprises referred to earlier, while microservices provide helpful abstractions over internal complexity, their opacity can make it difficult to see the progress of events and data through a sequence of such services.

As such, whether the architecture is monolithic or microservice-based, state and functionality are de-facto tightly coupled.

It is remarkable that although the 'application' and the 'database' are thought of as quasi-independent entities, the treatment of state and functionality is, in fact, tightly coupled in the delivery of the solution. This is especially problematic at the level of the enterprise, partly because events take time to flow across the enterprise and the applications which are distributed in it, and each system only perceives the event when it reaches its chosen view of certainty, causing it to internalise the event within its private state. Events can affect multiple sub-domains simultaneously.

While individual applications can maintain monostates, as they see the event as and when it passes them, at the higher level it is all but impossible to obtain a coordinated, complete, coherent, timely view (whether underlying data or functionally-derived) as multiple incoherent, temporally evolving events flow over the sub-domains and individual applications of the entire enterprise.

Further still, existing architectures place considerable requirements on the volume and sourcing of data needed to drive them. ERP systems are designed 'bottom-up' to capture the finest level of operational detail and the data required to keep them accurate at a high level is extremely intensive that is to say, that high level accuracy is guaranteed by low level precision. In an ideal world this would not be a problem, and it enables drilling down into aggregates, but it does not allow functionality at an aggregated level to be driven by summary level information that may be more readily available. The approach prioritises precision over accuracy and contributes to the burden of keeping the system fed with data. The data requirements of these systems are correlated with their complexity and implementation cost. On the other hand, there exist many tools (Excel, Jupyter notebooks for example) for business analysts to hypothecate models. However, tools are not platforms, and they quickly exhibit drawbacks already discussed. Existing solutions are thus not capable of handling data and facilitating data insights at both a high level of detail and a high level of abstraction.

Existing systems are also biased towards managing intrinsic variables and factors within the boundary and control of the organization. Sourcing data concerning extrinsic factors, but which may nevertheless impact the organisation, presents a real challenge, and is an increasingly common requirement in a connected world. The nature of these external inputs may be especially uncertain in terms of their timing, quantum, and impact. The challenge is compounded when the external input does not fit into the existing data model.

To make matters worse, the complexity of these business management software systems is increasing. The above issues are interrelated and the symptom of one becomes the cause of another, and so on. They are some of the reasons why managing application state is so difficult and creates accidentally complex software. However, it has been identified that the issues share a root cause: the close coupling of singular views of state to functionality is one of the prime sources of complexity in software, and it arises because software assumes that events and data are static and arbitrarily certain.

In view of the root cause, the solution, as disclosed herein, is based on software that does not assume that events and data are static in time and arbitrarily certain. Rather, it is software that understands that events evolve, that can perceive the effects of events on data from multiple perspectives of timing and certainty. Further, the solution, as disclosed herein, is based on a new architecture that separates data from functionality and can offer a universal source of truth, rather than impose a single view of truth. Further still, the solution, as disclosed herein, is based on a platform that offers new degrees of freedom to applications and users, allowing them to get the view they need when they need it, rather than be forced to accept whatever singular view is available.

The solution defines business processes as sequences of events which affect the state of a business or organization, and that, in general, these processes evolve through a lifecycle from first sight to completion, ultimately becoming settled matters at which point their effects are definitive. By introducing data structures that can cope with the lifecycle of processes and their effects, so the data pertaining to business state becomes a dynamical construct, with the certainty of each process's effect on data obvious and explicit at every point.

Thus, viewed from one aspect, the present disclosure provides computing apparatus for monitoring and storing data pertaining to business processes. The computing apparatus includes one or more processors and memory storing a plurality of stencils, each stencil being for one of a plurality of business processes $\rho=(\rho_1, \rho_2, \ldots)$ and each stencil being a homogeneously structured program-code template by which a processor may instantiate a process object to monitor progress of a process $\rho$, the process object to operate as a finite state machine able to advance through a sequence of a predefined number of at least two discretized states $S=(S_1, S_2, \ldots, S_n)$, the states universal to each stencil for all modelled processes. The stencil defining: one or more attributes for the modelled process $\rho_i$, each attribute having a specified data type, to be instantiated as key-value pairs; and for the sequence of states $S=(S_1, S_2, \ldots, S_n)$, a mapping specifying, for each of the states in the sequence, at least: a signal event taken to cause a transition to that state, the signal events including information updating knowledge concerning the process $\rho_i$ defined by that stencil; and an instruction for determining an expected timing for the transition to that state. The states $S=(S_1, S_2, \ldots, S_n)$ in sequence represent indicators of increasing certainty about the progress of the processes and their attribute values from initialisation to completion.

The memory further storing instructions which when executed cause one or more of the processors to implement a process object manager to: monitor events received as messages in a stream or queue, wherein at least some of the events include or infer information updating knowledge concerning one or more business processes $\rho=(\rho_1, \beta_2, \ldots)$; and in response to receipt of any event matching a signal event in a mapping of a stencil for a given business process $\rho_i$ for transitioning to a state $S_j$ of that process, instruct a process object instantiated for process $\rho_i$ based on the stencil for that process to transition to the state $S_j$, thereby causing the process object to generate and store in an immutable, denormalised block a complete view of the state of the process at the time of state transition. The generated block including: a timestamp representing the information time for the transition to state $S_j$; the current attribute values for the process based on information contained in the event and/or the stencil; if a block has previously been generated corresponding to a transition to an earlier effective state $S_e = (S_1, \ldots, S_{j-1})$ of the process $\rho_i$, a reference to the most recently generated and stored block. The generated block further including, for any and all previous effect states $S_e = (S_1, \ldots, S_{j-1})$ of the process $\rho_i$: a timestamp of the time the process transitioned to the previous effect state; and attribute values for the process as stored in the block for that previous effect state. The generated block further including: for any and all subsequent effective states $S_e = (S_{j+1}, \ldots, S_n)$ of the process $\rho_i$: a timestamp of the expected time for the transition to that state; and the expected attribute values for the process based on the current attribute values.

The receipt of event signals for the process $\rho_i$ thereby generating an append-only contiguous chain of immutable blocks each providing a complete bitemporal view of the process P in its evolution over information time through the sequence of states $S=(S_1, S_2, \ldots, S_n)$, each block showing, at that information time, the realized times at which transitions of the process to earlier states occurred, the values of the attributes at those times, the time the current state took effect and the current values of the attributes, and the expected times at which transitions of the process to later states are expected take effect.

Viewed from another aspect, the present disclosure provides a computer implemented method, the computer having access to the above-described plurality of stencils and the method implementing the above-described process object manager for monitoring and storing data pertaining to business processes. Viewed from yet another aspect, the present disclosure provides a computer readable medium comprising instructions which when executed cause computing apparatus to carry out the above-described method for monitoring and storing data pertaining to business processes.

In embodiments, one or more of the attributes defined in the stencils may indicate an intended effect the process represented by the stencil has on a resource at completion of the process. In embodiments, the intended effect the process has on a resource indicated by the attributes may comprise one or more of: the availability of a resource; the physical location of a resource; the virtual location of a resource; the count of a resource; the status of a resource; the condition of a resource.

In embodiments, one or more of the attributes defined in the stencils may take a value from or based on a value contained in an event received on the event stream or queue.

In embodiments, to monitor events received as messages in an event stream, the process object manager may be configured to monitor a stream of events on an event channel in an event driven architecture.

In embodiments, the number of states $S=(S_1, S_2, \ldots, S_n)$ in the sequence may be at least three, and optionally five states.

In embodiments, when an event is received matching a signal in a mapping of a stencil for a given business process $\rho_i$ for transitioning to a state $S_j$ of that process, where the transition to one or more previous states in the sequence has not previously occurred, the instructions may be further to instruct the finite state machine instantiated for process $\rho_i$ to transition to the state $S_j$ and to generate and store in the block record for the state transition to $S_j$, for any skipped previous effect states of the process $\rho_i$: a timestamp of the time of the current state transition to the state $S_j$ at the time the process transitioned to the skipped effect state; and attribute values for the process as stored in the block for the transition to the effect state $S_j$.

In embodiments, the process object manager may further be to instantiate a process object $\rho_i$ based on the stencil for that process in response to receipt of the first signal event for causing a state transition to any state for the process.

In embodiments, the process object manager may further be to, in response to receipt of any event for the business process $\rho_i$ not corresponding to a state transition in the stencil for that process, instruct the process object $\rho_i$ to refine the stored information about the process in the current state $S_j$ or a prior state, causing the generation and storage in an immutable, denormalised block record a refined complete view of the state of the process at the time of receipt of the event. The generated block may include: a timestamp of the time at which the block was created representing the information time for the refinement; updated current attribute values for the process based on the received event; a reference to the most recently generated and stored block. The generated block may further include, for any and all previous effect states $S_e = (S_1, \ldots, S_{j-1})$ of the process $\rho_i$: a timestamp of the time the process transitioned to the previous effect state; and attribute values for the process as stored in the block for that previous effect state. The generated block may further include, for any and all subsequent effective states $S=(S_{j+1}, \ldots, S_n)$ of the process $\rho_i$: a timestamp of the expected time for the transition to that state; and the expected attribute values for the process based on the updated current attribute values.

In embodiments, the process object manager may further be to, when the current information time passes beyond the expected time stored in the current block process $\rho_i$ for the transition to a subsequent effective state $S_{j+1}$ for the process $\rho_i$: cause the process object $\rho_i$ instantiated for the process $\rho_i$ to automatically transition to the subsequent effective state S t for the process and to generate and store in a new block a complete view of the state of the process at the time of the deemed transition to state $S_{j+1}$. The block may be optionally marked as quarantined until a further event is received confirming or refining the deemed state transition. Alternatively or in addition, in embodiments, the process object manager may further be to, when the current information time passes beyond the expected time stored in the current block process $\rho_i$ for the transition to a subsequent effective state $S_{j+1}$ for the process $\rho_i$: cause the process object $\rho_i$ instantiated for the process $\rho_i$ to generate and store in a new block a complete view of the state of the process at the time of the expected deemed transition to state $S_{j+1}$, where the timestamps of the expected times for the transition to the subsequent effective states $S=(S_{j+1}, \ldots, S_n)$ are updated to reflect the absence of the expected signal event for causing transition to the next state $S_{j+1}$. The block may be optionally marked as quarantined until a further signal event is received corresponding to the transition to a subsequent effective state $S_e = (S_{j+1}, S_n)$.

In embodiments, the generated blocks may further include one or more of: a unique identifier for the process $\rho_i$; an index value for the block that is incremented for each block in the chain. In embodiments, the reference to the most recently generated and stored block may be the index value of the previous block in the chain.

In embodiments, the memory may further store, in relation to the stencil for each process, tags for one or more hyperindices instantiated by a hyperindex manager to be notified by the process object on the generation and storage of a new block for the process. The process object manager may be further to cause the process objects, on the generation and storage of a new block, to send a hyperindex notification to the hyperindices tagged in the stencil for the process $\rho_i$. The hyperindex notification may include: a timestamp of the block creation in information time, an identifier of the process $\rho_i$ and a reference to the generated and stored block, the hyperindices thereby selectively indexing the relevant subset of all blocks and/or processes current for that hyperindex at all information times. The hyperindex notification may optionally further include an indication of the current information state for the process.

In embodiments, the process object manager may be further to, when an instruction to close a process object is received: cause to send to the hyperindices instantiated by a hyperindex manager tagged in the stencil for the process $\rho_i$, the hyperindices storing the reference to the final block for the process, an instruction to remove the closed process, the hyperindices thereafter removing the reference to the blocks for the closed process $\rho_i$ and/or the reference to the closed process $\rho_i$ from the hyperindex for the notified information time onwards; and close the process object. In embodiments, the instruction to close a process object may optionally be received from a rollup manager instantiated to manage and close processes, in response to the rollup manager determining that the process monitored by process object has transitioned to and settled in the final state $S_n$ of that process.

In embodiments, the process object manager may further be configured to store in the blocks additional information relating to the process as payload data.

In embodiments, the process object manager may further be configured to store in each block as the reference to the previous block a cryptographic hash of the previous block, the blocks thereby forming an immutable blockchain for each process.

In embodiments, the process object manager may cause created blocks to be transmitted to a network of peer computing apparatus each to validate and store copies of the created blocks, the network of peer nodes immutably storing the blockchain in a distributed ledger.

Viewed from another aspect, the present disclosure provides computing apparatus for indexing and retrieval of immutable, denormalised blocks storing data pertaining to a plurality of business processes $\rho=(\rho_1, \rho_2, \ldots)$, each process $\rho=(\rho_1, \rho_2, \ldots)$ being monitored by a process object instantiated by a processor based on a stencil for that process $\rho=(\rho_1, \rho_2, \ldots)$ to operate as a finite state machine to advance through a sequence of a predefined number of at least two discretized states $S=(S_1, S_2, \ldots, S_n)$ universal to all modelled processes $\rho=(\rho_1, \rho_2, \ldots)$, each stencil being a homogeneously structured program-code template, the process objects generating and storing the blocks in response to receipt of events matching a signal event in a mapping in the stencil for a given business process $\rho_i$ for transitioning to a state $S_j$ of that process, each of the process objects generating and storing in the blocks on transition to a state $S_j$ a complete view of the state of the process at the time of state transition, each stencil storing tags for one or more hyperindices instantiated by a hyperindex manager to be notified by the process object on the generation and storage of a new block for the process. The computing apparatus includes: one or more processors; and memory storing instructions which when executed cause one or more of the processors to implement a hyperindex manager to, in response to receipt of a hyperindex notification for a hyperindex instantiated by the hyperindex manager, the hyperindex notification issued by a process object for a process $\rho_i$ on the generation and storage of a new block for the process $\rho_i$, the hyperindex notification including: a timestamp of the information time of the transition of the process $\rho_i$ to the state $S_j$ leading to the creation of the block; an identifier of the process $\rho_i$; and a reference to the generated and stored block; the hyperindex notification optionally further including an indication of the current information state for the process $\rho_i$; store in relation to the hyperindex at an information time corresponding to the timestamp of the block creation in information time, and in relation to the process $\rho_i$ corresponding to the identifier, the reference to the generated and stored block. The hyperindex manager thereby selectively indexing the relevant subset of all blocks and/or processes current for the hyperindices at all information times, the references allowing the recovery of that subset of blocks for any information time $t_i$.

Viewed from another aspect, the present disclosure provides a computer implemented method implementing the above-described hyperindex manager for indexing and retrieval of immutable, denormalised blocks storing data pertaining to a plurality of business processes $\rho=(\rho_1, \rho_2, \ldots)$. Viewed from yet another aspect, the present disclosure provides a computer readable medium comprising instructions which when executed cause computing apparatus to carry out the above-described method for indexing and retrieval of immutable, denormalised blocks storing data pertaining to a plurality of business processes $\rho=(\rho_1, \rho_2, \ldots)$.

In embodiments, the hyperindex manager may be further to, in response to receipt of any normal subsequent hyperindex notification for a hyperindex instantiated by the hyperindex manager, the hyperindex notification issued by the process $\rho_i$ on the generation and storage of a subsequent block for the process $\rho_i$, update the block reference stored by the hyperindex in relation to the process at an information time corresponding to the timestamp of the subsequent block creation, the hyperindex thereby updating the index to replace the previous block with the subsequent block for times after that information time.

In embodiments, the hyperindex manager may be further to, in response to receipt, for a hyperindex instantiated by the hyperindex manager, of an instruction to remove a closed process $\rho_i$: update the hyperindex to remove at an information time corresponding to the receipt of the instruction for the closed process, the reference to the last generated and stored block for the process, the hyperindex thereafter ceasing to index the blocks of the closed process $\rho_i$.

In embodiments, the memory may further store, in relation to the stencil for each of a plurality of business processes $\rho=(\rho_1, \rho_2, \ldots)$, one or more attributes for the process $\rho_i$, each attribute having a specified data type, to be instantiated as key-value pairs; wherein the tags stored in a stencil for a process $\rho_i$ include at least the attribute keys for that process $\rho_i$.

In embodiments, the hyperindex manager may be further to, on receipt of a hyperindex notification from a process object for a hyperindex: forward the hyperindex notification to the hyperindex if already instantiated; or, if the hyperindex is not yet instantiated, instantiate the hyperindex, and forward the hyperindex notification to the hyperindex.

Viewed from another aspect, the present disclosure provides computing apparatus for managing process objects instantiated by a processor to monitor progress of a plurality of business processes $\rho=(\rho_1, \rho_2, \ldots)$, each process object instantiated by a processor based on a stencil for that process to operate as a finite state machine to advance through a sequence of a predefined number of at least two discretized states $S=(S_1, S_2, \ldots, S_n)$ universal to all modelled processes $\rho=(\rho_1, \rho_2, \ldots)$, each stencil for each process being a homogeneously structured program-code template, the process objects generating and storing immutable, denormalised blocks containing data pertaining to a plurality of business processes $\rho=(\rho_1, \rho_2, \ldots)$ in response to receipt of events matching a signal event in a mapping in the stencil for a given business process $\rho_i$ for transitioning to a state $S_j$ of that process $\rho_i$, each of the process objects generating and storing in the blocks on transition to a state $S_j$ a complete view of the state of the process at the time of state transition including the current attribute values for the process, the attributes for the process being defined in the stencil as key-value pairs. The computing apparatus includes: one or more processors; and memory storing instructions which when executed cause one or more of the processors to implement a rollup manager to: periodically, determine all of the instantiated business processes that have transitioned to and settled in the final state $S_n$ such that these processes are deemed completed; aggregate, based on the stored blocks for the final state $S_n$ of the complete processes, the cumulative effect of the complete processes on the each of the attributes indicated in the final blocks; and generate and store in an immutable, denormalised rollup block, for each of the attributes indicated in the final blocks, the collected and aggregated cumulative effects of the complete processes, as key-value pairs.

Viewed from another aspect, the present disclosure provides a computer implemented method implementing the above-described rollup manager for managing process objects instantiated by a processor to monitor progress of a plurality of business processes $\rho=(\rho_1, \rho_2, \ldots)$. Viewed from yet another aspect, the present disclosure provides a computer readable medium comprising instructions which when executed cause computing apparatus to carry out the above-described method for managing process objects instantiated by a processor to monitor the progress of a plurality of business processes $\rho=(\rho_1, \rho_2, \ldots)$.

In embodiments, the rollup manager may be to: for all hyperindices indicated in the stencil for each process deemed complete, the hyperindices being to be notified by the process on the generation and storage of a new block for the process, generate a rollup notification including: a timestamp of the rollup, an identifier of the closed process $\rho_i$, and a reference to the generated and stored rollup block collecting and aggregating the effects of the complete processes; and send the generated rollup notifications to the hyperindices, to thereby cause the hyperindex to remove the references to the final generated and stored blocks for the final state $S_n$ of the complete processes Pi, and to include the reference to the generated and stored rollup block aggregating the effects of the complete processes.

In embodiments, the rollup manager may further be to cause the instantiated processes deemed complete to be closed.

Viewed from another aspect, the present disclosure provides computing apparatus for interrogating immutable, denormalised blocks storing data pertaining to a plurality of business processes $\rho=(\rho_1, \rho_2, \ldots)$, each process $\rho=(\rho_1, \rho_2, \ldots)$ being monitored by a process object instantiated by a processor based on a stencil for that process $\rho=(\rho_1, \rho_2, \ldots)$ to operate as a finite state machine to advance through a sequence of a predefined number of at least two discretized states $S=(S_1, S_2, \ldots, S_n)$ universal to all modelled processes $\rho=(\rho_1, \rho_2, \ldots)$, each stencil being a homogeneously structured program-code template, the process objects generating and storing the blocks in response to receipt of events matching a signal event in a mapping in the stencil for a given business process $\rho_i$ for transitioning to a state $S_j$ of that process $\rho_i$, each of the process objects generating and storing in the blocks on transition to a state $S_j$ a complete view of the state of the process at the time of state transition including: the current attribute values for the process, the attributes for the process being defined in the stencil as key-value pairs, the effective transition times to any previous states $S=(S_1, \ldots, S_{j-1})$ and attribute values at the time of those transitions, and expected transition times to any subsequent states $S=(S_{j+1}, \ldots, S_n)$ and the expected attribute values for the process based on the current attribute values. The computing apparatus includes: one or more processors; and memory storing instructions which when executed cause one or more of the processors to implement an extraction manager to, in response to receipt of a query indicating at least an attribute and none or more of: an information time; an effect time; an information state; and an effect state; identify hyperindices relevant to the attribute, the hyperindices selectively indexing the subset of all prevailing blocks relevant to the attribute across information time: request all identified hyperindices to return to the extraction manager from all blocks indexed by each hyperindex at the queried information time and satisfying the queried information state, all values for the attribute prevailing at the queried effect time and effect state; in response to receipt of the attribute values satisfying the query from the identified hyperindices, collect and, when instructed, aggregate the values for the attribute to provide an answer to the received query. Any unspecified query values may be assigned with default values if appropriate, for example taking the latest information time if not specified.

Viewed from another aspect, the present disclosure provides a computer implemented method implementing the above-described extraction manager for interrogating immutable, denormalised blocks storing data pertaining to a plurality of business processes $\rho=(\rho_1, \rho_2, \ldots)$. Viewed from yet another aspect, the present disclosure provides a computer readable medium comprising instructions which when executed cause computing apparatus to carry out the above-described method for interrogating immutable, denormalised blocks storing data pertaining to a plurality of business processes $\rho=(\rho_1, \rho_2, \ldots)$.

Viewed from another aspect, the present disclosure provides one or more computing apparatus and computer readable media comprising instructions to implement together or separately one or more of: the computing apparatus for implementing the above-described process object manager for monitoring and storing data pertaining to business processes; the computing apparatus for implementing the above-described hyperindex manager for indexing and retrieval of immutable, denormalised blocks storing data pertaining to a plurality of business processes $\rho=(\rho_1, \rho_2, \ldots)$; the computing apparatus for implementing the above-described rollup manager for managing process objects instantiated by a processor to monitor progress of a plurality of business processes $\rho=(\rho_1, \rho_2, \ldots)$; the computing apparatus for implementing the above-described extraction manager for interrogating immutable, denormalised blocks storing data pertaining to a plurality of business processes $\rho=(\rho_1, \rho_2, \ldots)$.

Viewed from another aspect, the present disclosure provides an append-only contiguous chain of immutable blocks, for storage in a computer readable medium, generated by the method for monitoring and storing data pertaining to business processes as described above, each block in the chain providing a complete bitemporal view of a business process $\rho_i$ in its evolution over information time through a sequence of states $S=(S_1, S_2, \ldots, S_n)$.

The present disclosure provides a computer readable medium storing a plurality of append-only contiguous chains of immutable blocks as described above, the chains of immutable blocks being each representing the evolution of one of a plurality of different business processes $\rho=(\rho_1, \rho_2, \ldots)$ over information time through a sequence of states $S=(S_1, S_2, \ldots, S_n)$ universal to each of the different processes.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Certain embodiments of the invention will now be described by way of example only, with reference to the accompanying figures, in which:

FIG. 3 illustrates a schematic comparison of a unary or binary approach to state, with the use of an example higher number of discrete states in accordance with aspects of the present disclosure;

FIG. 4 illustrates a schematic example for the obtaining of attributes for a process and the relation between direct input attributes and their processing to provide output attributes in accordance with aspects of the present disclosure;

FIG. 5 illustrates a schematic of the structure of an example stencil in accordance with aspects of the present disclosure;

FIG. 11 illustrates the schematic example operation of hyperindices to monitor prevailing processes and blocks in accordance with aspects of the present disclosure;

FIG. 18 illustrates a table describing the degrees of freedom that can be interrogated for querying blocks in accordance with aspects of the present disclosure;

FIG. 21 illustrates a schematic example of how state becomes decoupled from functionality in the business management software system in accordance with aspects of the present disclosure;

FIG. 22 illustrates a schematic further example of how state becomes decoupled from functionality in the business management software system in accordance with aspects of the present disclosure;

DETAILED DESCRIPTION

Figure 1:
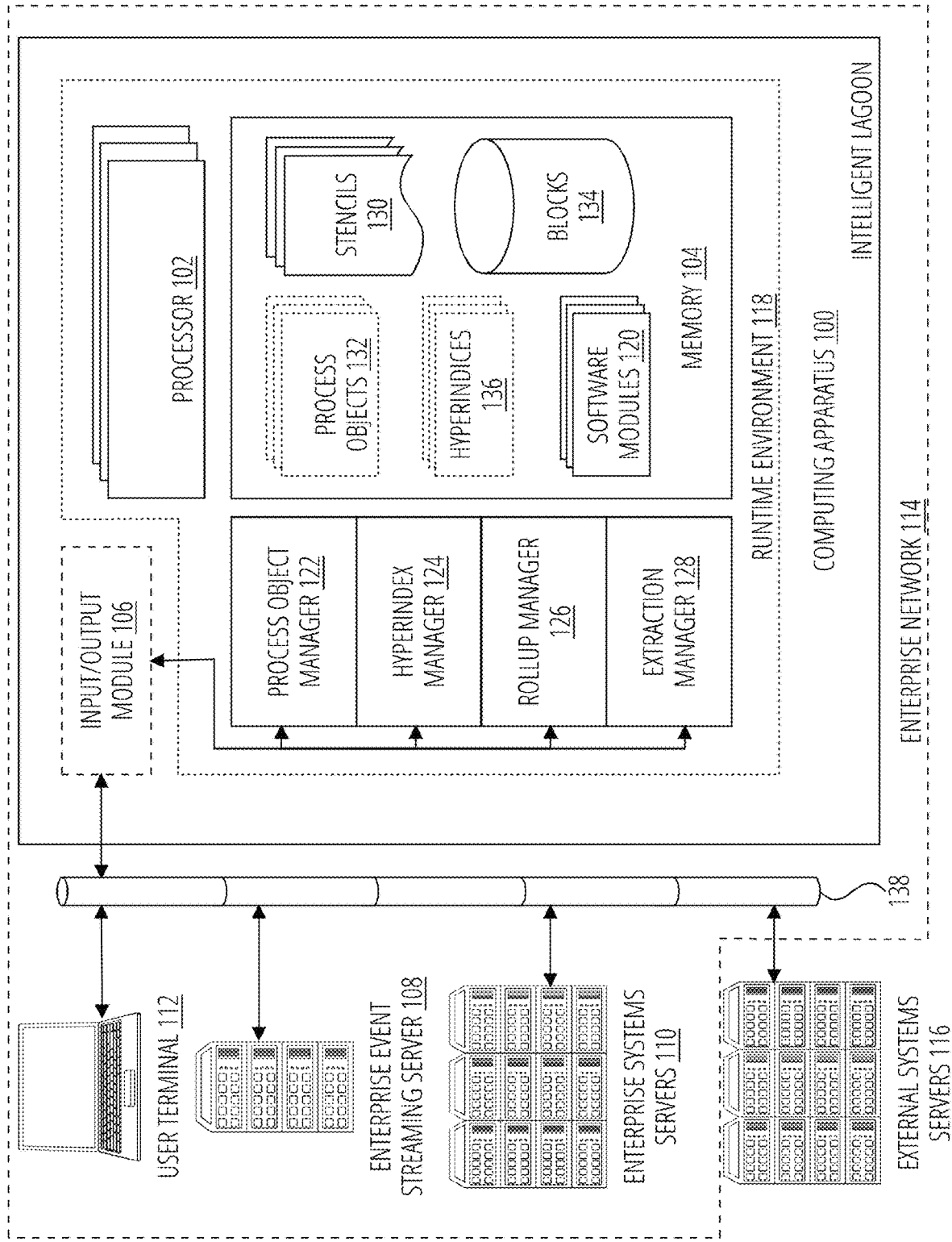
FIG. 1 illustrates a schematic example implementation of a computing apparatus in accordance with aspects of the present disclosure.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features. Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, reference to a first component and a second component may indicate different components from each other regardless of the order or importance of the components.

It will be understood that when an element (e.g., a first element) is referred to as being (physically, operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to FIG. 1 which shows an example implementation of aspects of the present disclosure embodied in a computing apparatus 100 providing an "Intelligent Lagoon" business management software system for monitoring, storing, indexing, retrieving, data pertaining to a plurality of business processes.

The example computing apparatus 100 includes one or more processors 102, memory 104 and an input/output module 106. A bus system (not shown) may be provided which supports communication between at the least one processor 102, memory 104 and input/output module 106.

The processor 102 executes instructions that can be loaded into memory 104. The processor 102 can include any suitable number(s) and type(s) of processors or other devices in any suitable arrangement. Example types of processor include microprocessors, microcontrollers, digital signal processors, field programmable gate arrays and application specific integrated circuits.

The memory 104 may be provided by any structure(s) capable of storing and facilitating retrieval of information (such as data, program code, and/or other suitable information on a temporary or permanent basis). The memory 104 can represent a random access memory or any other suitable volatile or non-volatile storage device(s). The memory 104 may also contain one or more components or devices supporting longer-term storage of data, such as a read only memory, hard drive, flash memory, or optical disc, which may store instructions in the form of software modules 120 for loading into the memory 104 at runtime.

In use, the processor 102 and memory 104 provide a runtime environment 118 in which instructions loaded into the memory in the form of software modules 120 can be executed by the processor 102 to generate instances of software applications in the runtime environment 118.

The computing apparatus 100 also comprises input/output module 106 providing a communications interface for receiving, via a network such as an Enterprise network 114, data and instructions from one or more other network nodes including an Enterprise Event streaming Server 108, Enterprise systems servers 110 or User Terminal 112. The Enterprise network 114 may include one or more overlapping virtual networks for an enterprise supported by a plurality of physical networks, and secured as a virtual private network, to provide a secure perimeter for the enterprise systems and data. Within the Enterprise network 114, the User Terminal 112, Enterprise Event streaming Server 108 and Enterprise systems servers 110 communicate with each other and with the computing apparatus 100 through network connections 138, to provide data about events in processes of the business as inputs to the computing apparatus 100.

Although shown in FIG. 1 as a standalone computing apparatus, the computing apparatus 100 may be configured as one or more networked servers or as a virtual machine implemented in a cloud computing and cloud storage environment supported by one or more data centres, any of which may be suitable for implementing the business management software system for monitoring, storing, indexing, retrieving, data pertaining to a plurality of business processes as described herein.

Although shown as being within the Enterprise network 114 in FIG. 1, in alternative implementations, the computing apparatus 100 may actually exist outside the Enterprise network 114 and interface with the data sources within it, for example, using an API.

The computing apparatus 100 may participate in or implement a data pipeline for processing the events and other business data. The data provided to the data pipeline may include data which can be consumed as events relating to the business processes, and other augmenting data which may refine information about the existing events in the processes.

In the context of the present disclosure, events and processes are to be understood and consistently referred to as follows. Processes are matters that evolve through time and certainty towards completion or abandonment, whereas events are moments or occurrences in the evolution of the process. This remains consistent with accepted terminology. Various examples of business processes and the events that drive them forward, will be set out in the description below.

As will be explained in more detail below, a process carries a set of attributes. Generally, certainty of these attributes will improve as events evolve and as the process progresses from initialization towards completion. Specification of a process requires the initial values of the attributes and the sequence of events that will drive the process forwards. Initially the values of attributes and timings of successive events may be highly uncertain, but a view maintained and offered by the computing apparatus 100 will become more definitive as events unfold.

For example, consider the number of passengers on a flight. When a flight is scheduled a view is taken of how many passengers will be carried. As the aircraft is prepared and eventually departs, the view of how many passengers are carried becomes more definitive.

Processes are thus sequences of events which, when taken together, bring about some change or refinement in some attributes of assets or resources within the ecosystem of a business. Processes may be intended, in the context of a business, to coordinate activities to attain some goal, which may be fulfilled on completion of the process. Events represent occurrences in these activities or updates in knowledge on the journey of a process towards its completion. Processes may involve or be conditional on activities by participants within the business and outside the business, such as upstream or downstream members of a supply chain, customers which may be individuals, businesses or other organisations, or unrelated third parties such as competitors, or may be dependent in some way on environmental factors such as the weather, or more abstracted factors such as economic indicators, demographics, or other incidental or natural occurrences, and not necessarily reliant on some human or organisational actor.

While the above understanding of processes and events is key to the business management software systems disclosed herein, it is unfortunate that computing typically considers events are merely akin to flashes of light, and so they are not understood as forming part of a process. This is what events are to event driven architectures and streaming platforms like Apache Kafka™.

In this respect, data relating to events may be received at the computing apparatus 100 from Enterprise Event streaming Servers 108, which may implement an event driven architecture platform like Apache Kafka™ or Amazon Web Services EventBridge™. The Enterprise Event streaming Servers 108 may provide a platform for direct support and event production for various business systems. Alternatively or in addition, the Enterprise Event streaming Servers 108 may provide a platform for monitoring other existing business systems to produce events therefrom. In this way, the Enterprise Event streaming Servers 108 generate a real time feed of data in the form of events or messages in an event stream. The Enterprise Event streaming Servers 108 may partition the produced events into different channels by marking them as relating to different topics. Different channels in the event stream may be subscribed to and monitored by consumers on the event stream to discover information about events relating to different business processes. The computing apparatus 100 may act as a consumer of the event stream and receive and process the events indicated thereby to monitor the progress of business processes from initialisation to completion.

Alternatively, or in addition to receiving information about events from Enterprise Event streaming Servers 108 in an event driven architecture, the computing apparatus 100 may receive events from a User Terminal 112, which may be based on or be a result of user input thereat, or from Enterprise systems servers 110. Data relating to business processes may be periodically sent from the Enterprise systems servers 110 to the computing apparatus 100 by means of batch processing, or by extract, transform and load (ETL) processes. The batch exports of data from the Enterprise systems servers 110 to the computing apparatus 100 may occur automatically, or semi-automatically or manually under user control, for example by operation of User Terminal 112. Further still, data can be provided to the computing apparatus 100 from External systems servers 116, outside the Enterprise network 114 itself, which may include public, environmental or contextual data, such as weather data, market prices, and so on.

In the example, the memory 104 comprises instructions in the form of software modules 120 for instantiating computing applications in the runtime environment 118 including a process object manager 122, hyperindex manager 124, rollup manager 126 and extraction manager 128. A brief overview of the function and operation of these four software applications will now be given.

The process object manager 122 is for monitoring and storing data pertaining to business processes and will be described below with reference to FIG. 2. Generally, to understand the data received at the computing apparatus 100 relating to events, the process object manager 122 refers to a library of stencils 130 stored in the memory 104, each of which defines one of a plurality of business processes $\rho=(\rho_1, \rho_2, \ldots)$ in terms of its attributes and mapping the events that progress the process from initialisation to completion. When a new process to be monitored is implied by the occurrence of an event in the event stream or queue by the process object manager 122, the process object manager 122 instantiates a process object 132 based on the stencil 130 corresponding to the business process. As the process objects 132 are instantiated in memory 104 based on the stencils 130, which are program-code templates, the process objects 132 persist in memory only as long as the time from when the process object is instantiated (e.g. on the initialisation of the process) and until the process object is closed (e.g. on completion or abandonment of the process). For that reason, the temporarily persisting process objects 132 are shown in dotted lines in the memory 104 in FIG. 1. In contrast, as the stencils 130 represent the permanent definition of the processes as program-code templates, these are stored in memory 104 persistently, to be drawn on as needed to instantiate process objects 132, and so the stencils 130 are shown as file objects in memory 104 in unbroken lines in FIG. 1.

As will be described, from there the process object 132 stores updates on the progress of the process in the form of immutable, denormalised blocks in the data store for Blocks 134. Again, as the Blocks 134 are immutable, the data store is shown in unbroken lines. As will be explained in more detail below, these blocks record the state of the process and bitemporal information about the progress of knowledge about the process over time. By building up a store of blocks as processes progress through states of increasing certainty to completion, different views of the overall business can be easily reconstituted for any time, based on the aggregated state of its processes and their effects on the affected attributes of business resources and assets, in a way that is not readily achievable using existing technologies as described above.

To facilitate retrieval of the stored blocks at a later date, the hyperindex manager 124 creates instances of hyperindices 136 to monitor and index blocks that relate to the subject of the hyperindex. The operation of the hyperindex manager 124 will be described later below with reference to FIG. 10. This facilitates the searching and efficient discovery of blocks when generating extracts and reduces the time taken to respond to arbitrary queries against the data by avoiding the need to search for irrelevant blocks.

Over time, as processes are completed, their effects can be deemed to be settled, and to avoid the proliferation of now-closed processes, and to reduce the number of blocks that need to be searched and aggregated when performing extracts against the Blocks 134, a rollup manager 126 is instantiated. The operation of the rollup manager 126 will be described later below with reference to FIG. 13. The rollup manager 126 thus periodically acts to manage and close completed process objects instantiated by the process object manager 122, as well as generating and storing in the data store for Blocks 134 rollup blocks that collect and aggregate the effects of the blocks of the closed processes, allowing the blocks of the closed processes to be discontinued from monitoring by the hyperindices, and the most recent rollup block to be referred to instead.

Figure 16:
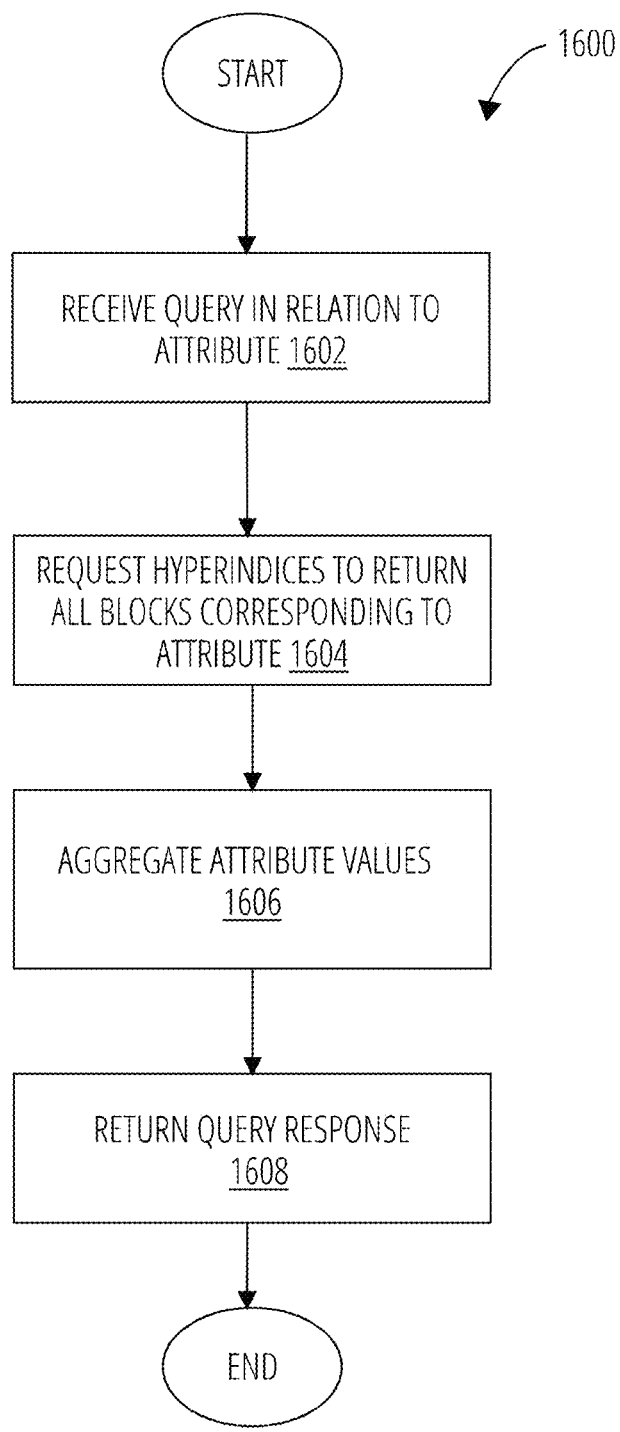
FIG. 16 illustrates a flow chart showing an example computer implemented method for extracting aggregated attribute values from blocks in response to a query to form a view of the business in accordance with aspects of the present disclosure.

Then in FIG. 16, the description of the operation of the extraction manager 128 will set out how queries to form views of the business are processed to search the hyperindices and extract blocks to provide an answer.

A detailed explanation of the operation of these four software applications of the business management software system disclosed herein will now be provided, with reference primarily to FIG. 2, FIG. 10, FIG. 13 and FIG. 16 in turn.

Figure 2:
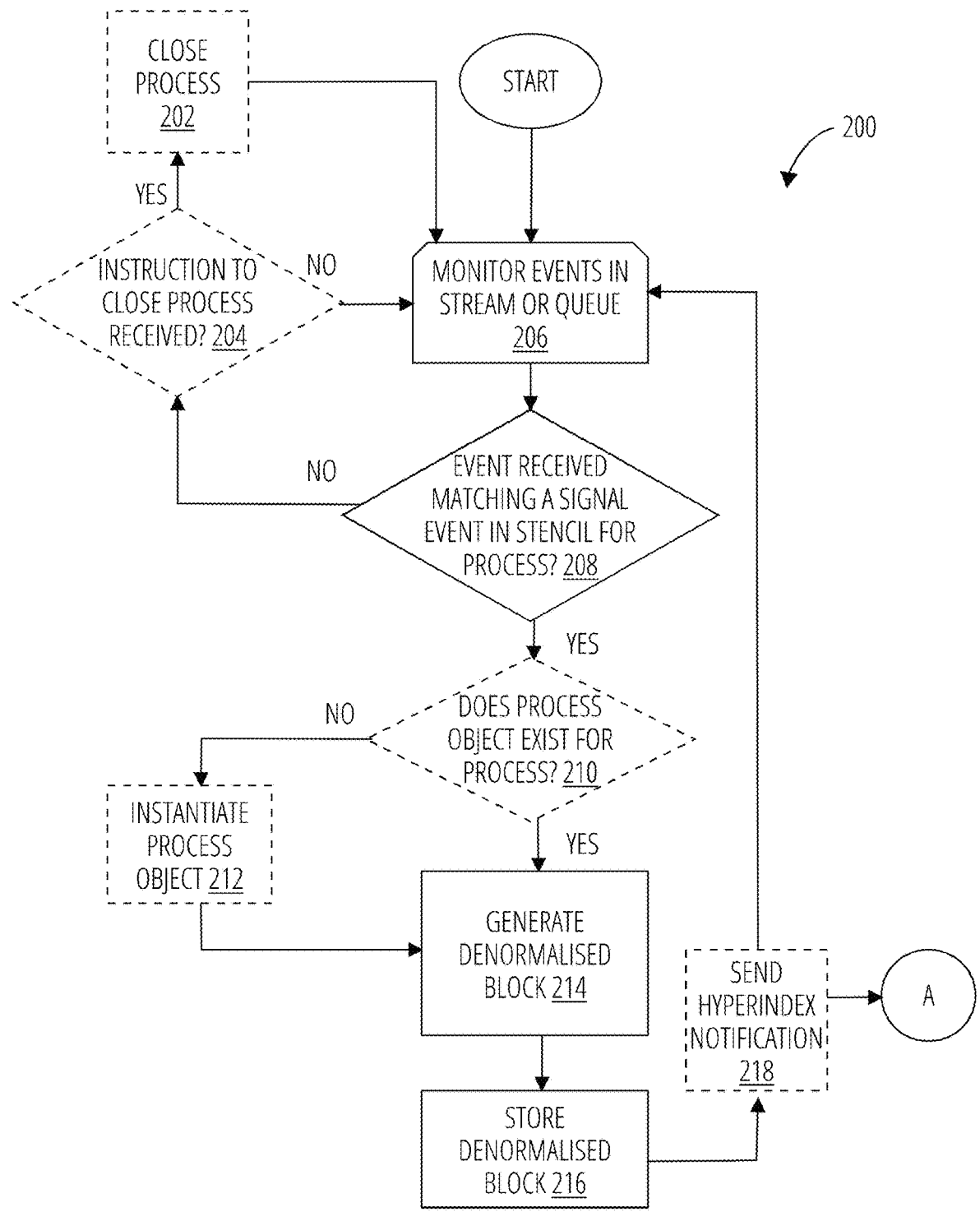
FIG. 2 illustrates a flow chart showing an example computer implemented business process monitoring method for monitoring and storing data pertaining to business processes in accordance with aspects of the present disclosure.

Thus, turning now to FIG. 2, a computer implemented business process monitoring method 200 for monitoring and storing data pertaining to business processes is shown. The business process monitoring method 200 may be carried out primarily by the process object manager 122 implemented in the computing apparatus 100 shown in FIG. 1.

As explained above, the computing apparatus 100 implementing the business process monitoring method 200 has access to a plurality of stencils, each stencil being for one of a plurality of all possible business processes $\rho=(\rho_1, \rho_2, \ldots)$ which may cause events to be generated in a stream or queue at 206. The structure and function of the stored stencils will now be explained in more detail.

Each stencil (for each represented process) is a homogeneously structured program-code template by which a processor may instantiate a process object to monitor the progress of a process. By the business process monitoring method 200, the process object monitors the process and captures bitemporal information about the progress of the process and its attributes through states of certainty, and this information is stored in blocks for later interrogation. To aid understanding of the operation of the process objects based on the stencils, the key concepts of bitemporality and state will now be introduced and explained in more detail.

Bitemporality is to be understood to mean that there are two ways to consider time in the business management software system disclosed herein. First, information time $t_i$ represents what the viewer/observer knew at that point in time, specifically, the location of the viewer in a continuous stream of information. This can be any time up to the present moment $t_0$. Second, effective time $t_e$ represents when we expect a process to take effect (or a state of a process to be reached and take effect). This can be any time from past, present, to future. The effective time a process is expected to take effect may vary over different information times as the process evolves and events within the process occur, leading to updating of knowledge and increased confidence of the progress and outcome of the process.

To illustrate bitemporality, consider again the example of a departure time of a flight:

At 10 am today (information time), an observer's view of the flight BA249 (LHR to GIG) (e.g. as given by events received up to that time at computing apparatus 100) was that it would take off at 11.50 am (effective time).

At 11.50 am today (information time), an observer's view of flight BA249 (e.g. as given by events received up to that time at computing apparatus 100) is that it has already taken off 4 minutes early at 11:46 am (effective time).

In the present disclosure, state is to be understood as an indication of how certain an observer can be concerning the progress of a process. As described above, conventional systems may typically indicate this with a Boolean field (creating a binary view of a process or event), or possibly a status field specific to the type of process underway. There is an argument for state to take a continuous value between 0 and 1 but this creates unnecessary complexity.

In the business management software systems of the present disclosure, the certainty of the process is discretised into a handful of key states that are universal. That is, each process $\rho=(\rho_1, \rho_2, \ldots)$, as modelled by a stencil, can be mapped to the same sequence of a set of discretized states $S=(S_1, S_2, \ldots, S_n)$. The set of universal states for all processes consists of a predefined number of states. That is, all stencils for all processes have the same number n of states, n being a predefined number, however some stencils may have no need to specify a mapping of a real-world event to each state as no such event exists. Every stencil must however specify a mapping to the final state. The predefined number of universal states is at least two or more states (i.e. n≥2). In embodiments, the predefined number of universal states may be at least three (i.e. n≥3). In embodiments, the predefined number of universal states may be five states.

In the embodiments described herein, the predefined number of states has been chosen to be five states as, in the context of the interpretations given and the objective of the business management software systems disclosed herein, this represents a reasonable compromise between detail and universality. This is not a fixed parameter of the invention though, and industry-specific implementations may adopt fewer or more states with different interpretations: indeed, with two states the model becomes binary but bitemporality is still supported. However in any implementation of the business management software systems disclosed herein, the number n of states will be a fixed number and the introduction of a multiplicity of states allows for broader technical benefits to be realised.

The five states used in implementations described herein, and their interpretation as applied to any and different processes, are shown below in Table 1.

TABLE 1

Interpretations of state for a process.

| State (Si) | Interpretation |
|---|---|
| $S_1$ = Estimated | The business process is planned, scheduled, and is expected to happen. Refinements to attributes and timing are very likely. Effects are virtual. (*) If the process affects or uses some specific asset or resource (expressed as an attribute), this may not yet have been allocated and is left indeterminate. |
| $S_2$ = Known | The attributes of the process are known and the expected timing is now manifested and known (as in, the process is expected to occur on a known timescale), but the process has no discernible real-world manifestation and the attributes and timing may be subject to change. (*) A specific asset or resource (expressed as an attribute) has been picked if it was previously indeterminate but there is otherwise no discernible change to the asset with respect to the node it is originating from. |
| $S_3$ = Underway | The effects of the process are starting to manifest themselves in the real-world: things are happening. There may yet be some refinement to attribute values and timing, but especially to timing. (*) Resources may be engaged to service the process. To abandon or cancel the process at this stage would require a new process to return things to their original state. |
| $S_4$ = Finishing | It is highly likely the process will terminate normally, we have a good view of when it will be done, and we expect no further refinements to attributes or timing. But the process is not yet completed. (*) Resources are starting to be released. |
| $S_5$ = Done | The process has irreversibly terminated, finished and the attributes are definitive. It cannot be cancelled. It is not expected to be refined. (*) Assets are definitely located at their new nodes. |

Note, in Table 1, 'Real-world' does not exclusively imply physical and non-virtual. Further, items marked with a (*) are in particular relevant to applications of the business management software system to the use case of inventory management, an example of which will be set out in more detail later in this disclosure.

The states shown above in Table 1 can be informally considered in 3 groups. First, while estimated and known, the process is effectively virtual and still being planned. There is no discernible real-world or manifest effect. We note that the known state corresponds to knowing all the attributes and terms of the process concretely so while estimated, the attributes may be subject to variation. But once known, all these are taken to be concrete. Despite being estimated, it is still the case that the process is expected to complete.

Second, once underway and finishing (which can be considered a checkpoint on progress), it is considered that the process has been committed to and that aborting at this point would incur cost (wasted materials, energy, disruption etc.). Sometimes the known and underway states will coincide. Lastly, once done it is considered that the process has completed and its effects and attributes are definitive.

FIG. 3 shows a comparison of a unary or binary approach to state (left pane) in which n=1 or 2, with the use of a higher number of discrete states (right) as used in implementations of the universal business management software system as described herein, in which n=5. The progress of the process through the deemed states, corresponding to increasing certainty concerning the attributes and actual completion of the process, is plotted against time. In the left pane, in the unary or binary approach, possible paths of true certainty (which are never truly known for an individual process in advance) are shown as dotted lines. As can be seen, in the right pane in which five states are used, a view can be taken of the progress of processes through increasing certainty to completion, which is superior to a binary or unary approach. In particular, with experience of the process as it progresses, knowledge of the attributes and expected timing of the fulfilment of the process can be updated, so that the business management software system can learn and calibrate its expectations of their progress over time.

An example of how these five universal states of increasing certainty might be mapped to the two different processes for departure and arrival of a flight, indicating the different events in the flight process that drive the two different processes forward to transition to the next effect state, is shown below in Table 2.

TABLE 2

Example mapping of effect states to events in flight departure and arrival processes

| Event | Departure | Arrival |
|---|---|---|
| Flight scheduled | estimated | estimated |
| Check-in closes | known | — |
| Boarding begins | underway | known |
| Push-back/Engines started | finishing | — |
| Airborne | done | underway |
| Final approach | — | finishing |
| Landed | — | done |

Note how the arrival process and departure process overlap. As an airborne aircraft must eventually lead to a grounded aircraft, the arrival process transitions to the underway (i.e. $S_3$) state based on the same signal (airborne) driving the departure process to transition to the final state done (i.e. $S_5$). Different personas will perceive the flight as completed at different stages: for example, gate staff will be freed from duty once the aircraft pushes back from the gate.

A system of 5 states discussed can accommodate business processes with fewer state transitions, provided the final state is always specified, a mapping to real world events only needs to be specified where relevant. For example, the spontaneous digital and atomic transfer of title (for cash, tokens) on blockchain specifies the underway and done states corresponding to the pre and post consensus phases of the transaction lifecycle, and there is no need to specify a mapping to the irrelevant states. The irrelevant states have zero duration and are not resolved (i.e. seen) in an extract.

It is important to note that, as used in relation to the business management software system of the present disclosure, the term 'state' relates to state of certainty about a business process, as represented by discretised states in instantiated process objects used to monitor the business processes. This is to be disambiguated from references to state in computing, as used above in the discussion of conventional approaches to computing, where state is a term in computing used to represent the internal state of knowledge of some object like a button on a user interface (UI), or the balance of an account. The use of state to refer to increasing certainty about a process, is also to be disambiguated from other uses of the term 'state' in computing (and as used herein) such as in the context of a state machine, which is a digital object that transitions atomically between well-defined states (which represent the status of a modelled system like, for an aeroplane, flying or grounded), in response to external signals which cause the transitions. This is usually represented with the states as nodes in a state graph joined by arrows representing the transitions between the states.

As such, the instantiated process objects 132 operate as event-driven finite state machines able to advance (or retreat) through a sequence of a predefined number of at least two discretized states of certainty $S=(S_1, S_2, \ldots, S_n)$ for the business processes. The operation of the process objects as event-driven finite state machines shall be described later.

To aid understanding of the operation of the business process monitoring method 200, further key terms will now be explained.

The process object 132 for each process $\rho=(\rho_1, \rho_2, \ldots)$ is a bitemporal object: first, the process objects 132 include expected times that form a view of when events (signals, messages, cues) in effect time $t_e$ are expected to occur and cause increments in certainty, called the effect states, to occur. Second, each time the process object 132 learns something about the process, an updated version of the improved view or knowledge of the process in the form of a new block is appended to the data store of Blocks 134, the block recording the information time $t_i$ at which the event occurred or was received at process object 132 or at which the block was created, as appropriate. If the event causes the process object 132 to change the state of the process to the next in the sequence of states of certainty, or a later state if some states coincide, overlap or are skipped, $S=(S_1, S_2, \ldots, S_n)$, the process object 132 is caused to transition to the relevant state corresponding to the received event. If the information received as indicated by the event adjusts or corrects existing data about the monitored process currently recorded in process object and stored in the previous block without changing state, the process object 132 is said to undergo a refinement of its knowledge of the process. (The possibility of reversing in states is discussed below.) A new block containing this updated information may be generated and stored by the process object 132, without the state of the process as captured in the block being changed from the state of the process captured in the previous block.

Each version is called a block β and it is timestamped with information time $t_i$. A block captures the state of knowledge of the process as has been made available to the process object 132 at that moment in information time. The information state $S_i$ of the block is defined by the effect state $S_e$ that the process was in at the moment of the block's creation.

The block also contains attributes that are expected to become more certain as the process evolves. Attributes are key-value pairs and highly general. Some may be determined at the moment of instantiation of the process (for example, a name, some classification, an asset, item, or resource that is being affected by the process) while others become more definite (specifically known) at later points.

Attributes can be direct input attributes, or they can be processed to provide output attributes. That is, as illustrated in FIG. 4, attributes can be informed directly from information in the event stream, in which case they are referred to as input attributes (indicated in FIG. 4 as the $x_1, x_2, \ldots$). For example, they may correspond to the terms of a contract or an order. In turn, by specification of an output function (i.e. $y=F(x)$) the values of output attributes (indicated in FIG. 4 as the $y_1, y_2, \ldots$) can be computed.

Both types of attribute are stored in the block. The output function may be stored in the block in such a form that allows the process to create the next block by reading the latest block and interpreting the output function as a set of instructions to compute the output attributes. This would not require the entire instruction set to be stored on the block: the function could refer to internal functionality, make a call to a library, or call a service or 'expert' system in order to calculate the output attributes. Any number of output attributes may be specified, and if the output function is not specified there will be no output attributes. In many scenarios, an external 'expert' system may generate all attributes for a particular instance of a process, and so no output attributes will need to be calculated.

For the example of a process describing the departure of a flight, the input attributes may include (in the form of attribute key [units of value to be recorded]):

fuel_load [kg]; and fuel_price_per_kg [currency/kg]

From these input attributes the following output attribute may be calculated based on the output function shown:

fuel_cost [currency]=fuel_load*fuel_price_per_kg

Furthermore, in this example, thefuel load has been provided as an input attribute, presumably determined by the aircraft crew and their expert system, but it could be calculated as an output attribute from suitable inputs and specification.

In embodiments relating to monitoring business processes affecting inventory management, one or more of the attributes defined in the stencils may indicate an intended effect the process represented by the stencil has on a resource at completion of the process. In embodiments, the intended effect the process has on a resource indicated by the attributes may comprise one or more of: an availability of a resource; a physical location of a resource; a virtual location of a resource; a count of a resource; a status of a resource; a condition of a resource.

As noted above, the process object manager 122 instantiates process objects 132 according to the relevant stencil for that process stored in the store of stencils 130 stored in memory 104. The structure of a stencil 130 is shown in FIG. 5 for the example process "Market Order" as example stencil 500. As can be seen, the stencil 500 includes a set of stencil parameters including the stencil name, corresponding to the business process it is related to. The stencil 500 specifies the input attributes and output functions for computing output attributes. The stencil 500 also specifies the hyperindices to be notified of block updates, and tags. As can be seen the stencil 500 also specifies a schedule which describes the sequence of state transitions that the process will undergo in accordance with business events witnessed in an information stream. That is, the schedule relates events expected to be received in the event stream or queue providing information about the progress of the any given Market Order process that is underway, to the states in the universal sequence of states of certainty $S=(S_1, S_2, \ldots, S_n)$. The universality of the states for all business processes is significant in that, as will become evident, process objects and the blocks generated and stored thereby have homogeneous data structures for all process objects and business processes, but describe heterogeneous sequences of events and attributes expressed by the stencils for the different business processes.

In the example shown, the 'Market Order' process is initialised into its estimated state (i.e. $S_1$) when an event corresponding to a 'planned' signal indicating a planned market order, is received in the event stream or queue. According to the schedule, the time at which the estimated state is entered corresponds to the initialisation time for the process indicated by the pseudocode $TInit. From there, the schedule provides for the expected timing for the progress of the market order process to each subsequent state of known, underway, finishing and done.

The timings of the expected state transitions are computed with the schedule function possessing the same degree of generality available to output functions. In the most simple form the timings are simply fixed at initialization of the process. The example illustrates their calculation relative to the time of prior states.

The variables prefixed with a $ are pseudo-code for values that are taken at the moment $TInit of the process's instantiation from the stencil 500 or from other records, like $TUnderway. The stencil 500 may also refer to some convenient external functions like end_of_day($TUnderway), indicating that the expected time for the market order process to transition to the done state corresponds to the end of the day the process transitions to the underway state.

The schedule function for determining an expected time to transition to a state could also refer to attributes in its calculation of transition times, and, vice versa, output functions (in relation to determining output attributes) can also refer to transition times—provided that no logical circularity occurs.

In an implementation of the business management software system according to the present disclosure, the computing apparatus 100 may offer a catalogue of stencils to users for different types of business processes, and that these stencils can be then easily configured and mapped to a businesses processes by a user operating a User Terminal 112, for example with a 'no code' or 'low code' integrated development environment, or using a visual programming language. Similarly, the computing apparatus 100 may also offer the user operating the User Terminal 112 the ability to define stencils from scratch.

In the context of a business's operations, for example for inventory management, a key technical advantage of the business management software system disclosed herein is provided by the ability to define stencils that describe processes which affect assets and inventory in very general and abstract terms, making it ready to adapt to new markets, new processes, and able to capture all assets and resources in the business. Many attributes can be specified without the need for code. Users can configure a stencil (or a process directly) using a UI which will guide them through the necessary steps. In most cases, the derived attribute functions are simple expressions. They can be expressed using an expression-builder in the style of Excel. While this could be considered code it does not require a new release of software to make the stencil generally available. Therefore, a wide range of users without programming expertise can create stencils when they need to, and the system can respond in a rapid and agile way to changing business requirements.

Crucially, the stencils 130 enable heterogeneous business processes to be captured with homogeneously structured processes and blocks. Note that the stencils correspond to business activities, and that the stencils can be made generic with respect to the underlying asset or market conventions. A stencil is not required for every activity for every possible asset.

Thus each of the stencils 130 is for one of a plurality of business processes $\rho=(\rho_1, \rho_2, \ldots)$. Each of the stencils 130 is a homogeneously structured program-code template by which a processor may instantiate a process object 132 to monitor progress of a process $\rho$. As will be explained below, the process objects 132 each operate as a finite state machine able to advance through the sequence of a predefined number of at least two discretized states $S=(S_1, S_2, \ldots, S_n)$, the states universal to each stencil for all modelled processes. The states $S=(S_1, S_2, \ldots, S_n)$ in sequence represent indicators of increasing certainty about the progress of the processes and their attribute values from initialisation to completion.

Each of the stencils 130 defines: one or more attributes for the modelled process $\rho_i$, each attribute having a specified data type, to be instantiated as key-value pairs; and for the sequence of states $S=(S_1, S_2, \ldots, S_n)$, a mapping specifying, for each of the states in the sequence, at least: a signal event taken to cause a transition to that state, the signal events including information updating knowledge concerning the process $\rho_i$ defined by that stencil; and an instruction for determining an expected timing for the transition to that state.

Turning now to FIG. 2, an example business process monitoring method 200 to be implemented by the computing apparatus 100, and in particular the process object manager 122, will now be described. The dotted outlines for some steps are intended to clearly indicate that those steps are optional to embodiments, and inessential for implementation of the method described below.

The business process monitoring method 200 starts and proceeds to step 206 in which the process object manager 122 begins a loop to monitor events received as messages in a stream or queue as described above. At least some of the events include or infer information updating knowledge concerning one or more of the business processes $\rho=(\rho_1, \rho_2, \ldots)$.

In response to information received about the business processes monitoring events, the process object manager 122 instantiates and sends instructions to process objects to drive their behaviour as finite state machines, which will be described later with reference to FIG. 9. In operations performed by the process object manager 122 to send the initialise and transition instructions to the process objects to initialise the process object in a state S of the sequence of states, and to transition the process object to a subsequent state S' will now be described in relation to steps 208 to 216.

In step 208, the process object manager 122 determines whether any events received match a signal event in a mapping of a stencil for a given business process $\rho_i$ for transitioning to a state $S_j$ of that process. For example, receipt of an event indicating that a market order is confirmed corresponds to the transitioning of a 'Market Order' process defined in the stencil 500 shown in FIG. 5 to a known state (i.e $S_2$).

If such an event is received, the process object manager 122 may proceed to step 210 (this step being inessential, as indicated by the dotted outline) to determine whether a process object exists for the business process indicated in the received event. Note, the business may have plural, and indeed a very large number of different instances of the same process running concurrently, proceeding according to their own timelines as events unfold. For example, an airline may have a large number of flights departure processes $\rho_{departure}$ and flight arrival processes $\rho_{arrival}$ running concurrently, for different aircraft at different gates in different airports. Each instance of a business process is monitored in by the computing apparatus 100 using a separate process object instantiated based on the same stencil for that business process. Thus, a computing apparatus 100 monitoring a business with 15 market orders between the first estimated and last completed states would have 15 process objects instantiated based on the Market Order stencil. The different processes may be distinguished using different unique process identifiers maintained in the process objects.

In the event that a process object does not yet exist for the business process corresponding to the received event, the process may first proceed to step 212 in which the process object manager instantiates a process object $\rho_i$ based on the stencil for that process. This may be, for example, in response to receipt of the first signal event for causing a state transition to any state for the process. For example, when an event is received indicating that a new market order is planned, a new 'Market Order' process object is instantiated based on the 'Market Order' stencil as shown in FIG. 5. In the instantiation of the process object, the process object manager 122 sends an initialisation instruction (see FIG. 9) to the process object to cause it to be configured based on the stencil and any information in the event signal triggering the instantiation. In the example where an event signal is received to indicate a new market order is planned, the initialisation instruction causes the process object for the market order to enter an initial state S corresponding to the estimated state (i.e $S_1$). It is possible for process objects to be initialised into later states in the sequence (so that states may be skipped). For example, if an event signal for a new market order is received, for which no process object has yet been instantiated, with the event signal indicating that the market order is confirmed, the process object would be initialised in an initial state S corresponding to the known state (i.e $S_2$). Generally, a process object can be initialised in any state in the sequence, without limitation, depending on the event signal received leading to the instantiation and initialisation of the process object.

If the assessment in step 210 determines that the process object already exists, the process object manager issues to the process object instead a transition instruction (see FIG. 9) such that the process objects transitions from a current effect state S to a subsequent effect state S'. For example, if the process object for a given Market Order process is already instantiated and in the estimated effect state (i.e $S_1$) and an event signal is received indicating that the market order is confirmed, the process object manager would send an instruction to the process object to transition to the known effect state (i.e $S_2$).

Once the process object is instantiated in step 212, or if the assessment in step 210 determines that the process object already exists, the method proceeds to step 214 in which the process object relevant to the event is instructed to generate a denormalised block, as will now be described. That is, both the sending of the initialisation and transition instructions to the process object, once instantiated, cause the process object to generate for storage a denormalised block. As will be explained later in relation to FIG. 9, other instructions sent to the process objects also cause them, acting as finite state machines, to generate and store blocks through refining, quarantining, releasing, or closing processes, such instructions as will be described below.

A block is an immutable denormalised entity capturing a complete view of the state of the process at the point in information time that the block was created, which may correspond to the time of receipt of the event causing the block generation, and thus the time that the process has been deemed to transition to the current effect state, or that a refinement to its attributes was made. Importantly, a block may capture the past, present, and future view of the process's attributes in effect time $t_e$ without referring to any other block, through its state records.

Figure 6:
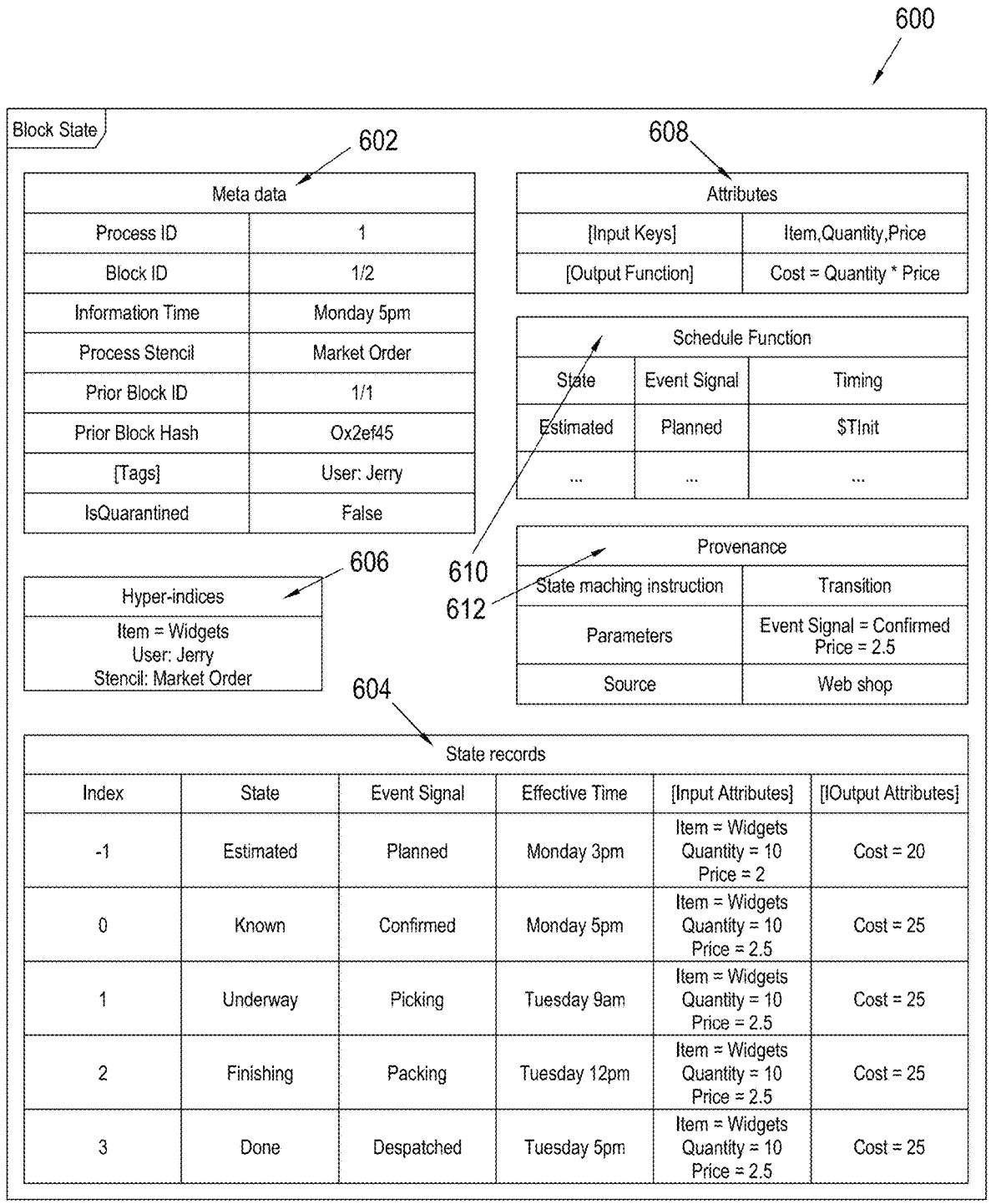
FIG. 6 illustrates a schematic of the structure of an example block in accordance with aspects of the present disclosure.

The data structure and field in a generated example block 600 for a Market Order process in accordance with aspects of the present disclosure, is shown in FIG. 6, which shows, in particular, the block 600 as using a canonical state record formulation, as will be described in further detail later. The current state record has an index of 0, corresponding to the known state in this example. Lists in fields are represented in square brackets. The fields in the block are as follows.

The metadata fields 602 fields capture information necessary to maintain referential integrity between blocks and their parent processes, and guarantee the integrity of the data contained in the block. Each block is identified by a process identifier field (in the example, Process ID=1) and a Block ID field generated from a combination of the process identifier field and its numerical index in the sequence of blocks for the process. The index is one for the first block in the process. In the example, Block ID=1/2, meaning this is the second block generated for Process ID 1. The Process Stencil field is a reference to the stencil that was used to give the process object its specific form (in this case, the process object was instantiated based on the Market Order stencil shown in FIG. 5). The [Tags] field allows other useful key-value information to be associated with the block such as the name of the user or system who created the block or process etc. As will be explained later, if the information content of the block is suspect, or implies an anomalous condition, the block may be marked as quarantined using the 'isQuarantined' Boolean field. As the blocks are immutable, the flagging of a block as quarantined is an immutable characteristic of the block. When a process is reviewed by an operator or otherwise released from quarantine a new block is appended with the quarantine condition removed.

The state records 604 is a list of the states of the sequence of states $S=(S_1, S_2, \ldots, S_n)$ including, for each of the states, the transition times (in information time for current and previous states, and the expected timings for transitions to future states), the current values of attributes, and corresponding signals driving the state transitions. With regard to the state records for previous states, the values of the attributes included are the attribute values that were adopted at the time of the transition to those previous states, based on the knowledge then available concerning the process. For subsequent states, attribute values are equal to the currently expected values of the attributes based on the knowledge available while the process is in its current state.

The expected timings and signals that populate the state record list are given by the stencil when the process is created. The information state of the block corresponds to the state of that record whose effective time equals the block's information time, and in the example implementation the index field is set such that this record has an index of 0.

The state records 604 are ordered by increasing effect state and the index field is set relative to the current record. In the example implementation, the present view and history are given by those records with zero and negative indices (0, −1, −2, . . . ), and the input and output attributes, times, impacts, and signals reflect what actually happened to realise those state transitions. In the example implementation, the future view is given by those records with strictly positive indices (1, 2, . . . ). The input and output attributes and impacts for the subsequent states will be the same as the current record's, as the current view is (and must be) the best view of the process then available.

If a process moves through multiple effect states simultaneously (e.g. from estimated to underway) then the intermediate states will take the same effective time as the arrived-at state. The state records will be continue to be ordered by increasing effect state. When searching for a record intersecting with a specified effective time $t_e$, the record with the highest state prevails.

It is important to note that the view of the processes monitored by process objects 132 and stored in the state records 604 of the blocks concerns how attributes evolve with respect to events occurring in time increasing our certainty about them. It is not a time series of how the attributes are expected to vary in value in future time. The values of attributes for the current state and all future states are the same. For a process which boards passengers onto an aircraft, the number of people to be eventually loaded is relatively constant; the process is not about how many people have been loaded so far.

The block 600 also records in the hyperindices field 606 any hyperindices that should be notified when the process appends a new block. The nature of hyperindices and their operation will be described in more detail later. The list of hyperindices in the hyperindices field 606 will be filled from the union of the hyperindices explicitly specified by the stencil and by the tags, and may also include hyperindices based on attributes.

The attributes fields 608 include a specification of the input attributes (as specified by the keys for the key-value pairs) and the output function for generating the output attributes. The type of a value can be a primitive (integer, string, datetime, bytes, . . . ) or a composite and complex object (lists, array, maps, . . . ). Again, the attributes indicated in the attributes fields 608 are specified based on the stencil used to instantiate the process object used to generate the block 600.

The timing or eventual duration (between any two states) of the process can also be considered an attribute. For example, the process of running a marathon transitions to done when one crosses the finish line and the race time recorded is an attribute measured between the times of the underway and done states.

The schedule function fields 610 define how the expected timings of transition to future states are computed. Again, this is set by the stencil when the process object is initialized.

Finally, the provenance fields 612 describe the instruction that was sent to the process that caused this block 600 to be created.

It should be noted that the fields listed above in relation to the block 600 are given by way of example only and should not be considered to be limiting. Other data and fields may be provided, and certain fields may be omitted in accordance with the present disclosure. Indeed, in embodiments, the process object manager may further be configured to store in the blocks additional information relating to the process as a payload data.

In particular, there is no restriction on other data that can be stored in the block with its attributes, especially if it reduces the need for further joins or lookups to other data sources when extracting data. In principle such data does not have to be part of the state records. However such data would not benefit from the effect time dimension of bitemporality. While arbitrary data can be stored in the block, consideration must be given to balance the extraction speed and efficiency of denormalized blocks with the storage space requirements and I/O performance which will deteriorate should the block become bloated.

Once the block has been generated in step 214, the process proceeds to step 216 in which the block is stored in the store of Blocks 134 in the memory 104. It should be noted that the memory 104 for storing the Blocks 134 may be or include memory separate from the computing apparatus 100. For example, the Blocks 134 may be stored in a remote data centre.

After storing the block, the process may, in step 218, send a hyperindex notification, as will be described in more detail later. On the other hand, the sending of the hyperindex notification may occur alongside or after the generation of the block in step 214, or alongside or after the storage of the block. Indeed, the ordering of the steps in FIG. 2 should not be considered to be limiting.

Thereafter the business process monitoring method 200 loops back to step 206 to monitor for events in the stream or the queue for further event signals for triggering state transitions (or for triggering sending other instructions to the finite state machines representing the possible states of the process objects) in processes monitored by process objects 132, leading to the generation and storage of further blocks for the process.

It is worth noting some specific properties of state. Exceptionally, processes can go backwards in state. While inconvenient and ideally avoided, there will be occasions where instructions to move to the next state were premature and need to be reversed. Refinements can be made to the attributes and timing of the process, either at present or historically (in an append-only fashion). Note that even though a process may be in a known state it does not imply zero probability of future changes to attributes.

As may already be apparent, processes can skip states in their transitions.

For stencils which do not specify a complete mapping of real-world events to the n-system of states, the omitted states may be of zero duration, or not even present, and have no effect on the algorithms for querying processes and extracting inventory.

The operation of the process objects 132 to monitor events for generating an append-only contiguous chain of immutable blocks each providing a complete bitemporal view of the process $\rho_i$ in its evolution over information time through the sequence of states $S=(S_1, S_2, \ldots, S_n)$ will now be described in more detail.

Referring again to FIG. 6, as can be seen, when generating a block in step 214, if a block has previously been generated corresponding to a transition to an earlier effective state $S_e=(S_1, \ldots, S_{j-1})$ of the process $\rho_i$ (where the effect state of the current block is $S_j$), the block also includes a reference to the most recently generated and stored block. In the example, this is stored as a reference to the identifier of the previous block in the Prior Block ID field in the metadata fields 602 of the block 600. To allow validation of the chain of blocks, a hash of the prior block may also be included in the Prior Block Hash field in the metadata fields 602 of the block 600.

Thus, as each of the instantiated process objects 132 monitors the progress of a related business process, a sequence of (one or more) immutable, denormalised blocks is created and stored, each block linking to a previous block (if the block is not the first or only 'genesis' block) and thus creating in the store of Blocks 134 a backward linked list or chain of blocks for each instance of a business process. In this way, each block in the chain of blocks provides a complete bitemporal view of the progress of the monitored process at the time of the generation and storage of that block. As will become apparent, the successive blocks in a chain do not have to correspond to sequentially increasing information states, because states can be skipped, or refinement blocks can be added for the same information state, when more information becomes known about the process. When signal events have not been received to advance the process to the next (or later) effect state, a transition can happen automatically, and the created block can be additionally marked as 'quarantined'.

Figure 7:
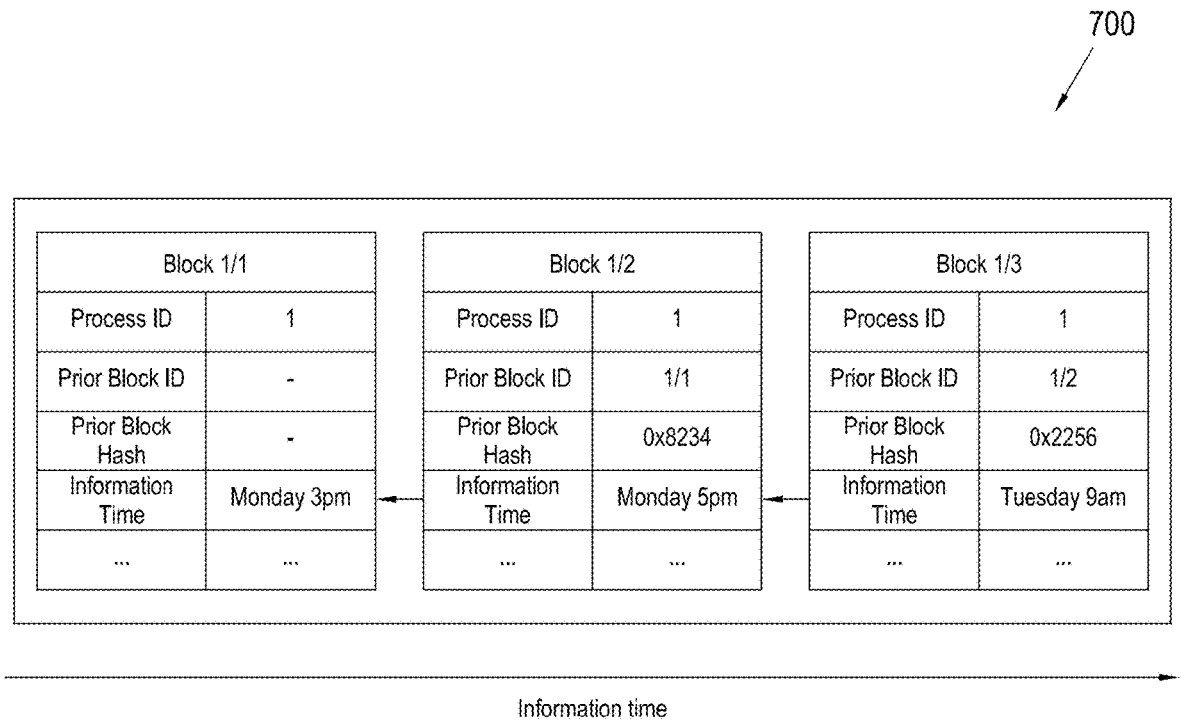
FIG. 7 illustrates a schematic of the structure of an example chain of blocks in accordance with aspects of the present disclosure.
Figure 8:
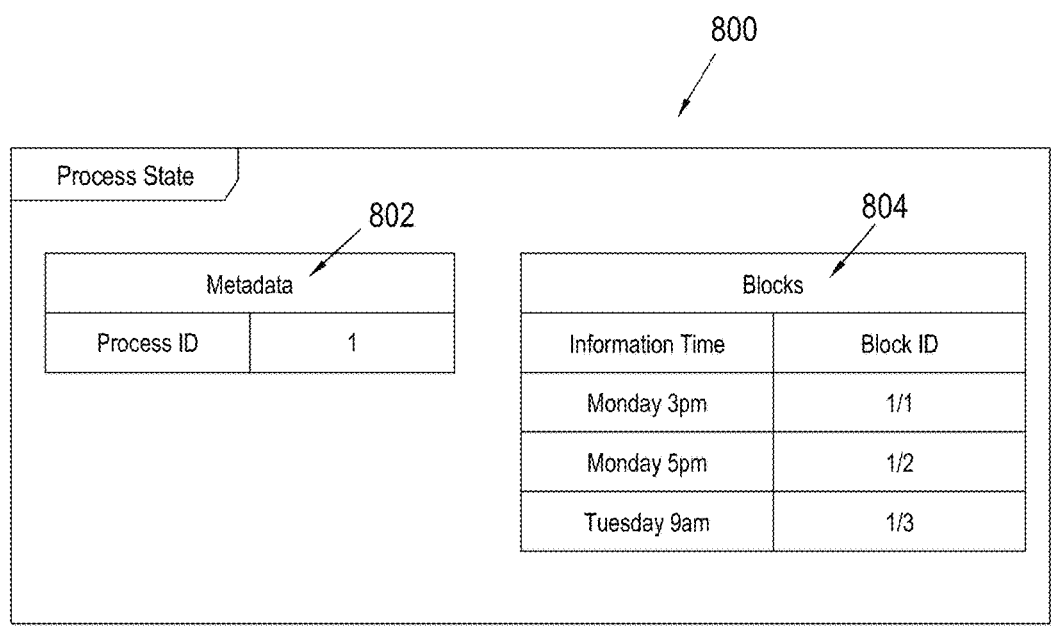
FIG. 8 illustrates a schematic of the structure of an example process in accordance with aspects of the present disclosure.

An example chain of backwards-linked blocks 700 is shown schematically in FIG. 7, advancing forward in information time, with each block header (except for the first block 1/1) including a reference to the prior block in the chain in the form of a Prior Block ID and a Prior Block Hash for form an immutable and verifiable chain. The data structure storing in memory 104 the state of the process object 800 that has operated to generate and store the blocks shown in FIG. 7, is shown schematically in FIG. 8. As can be seen, while instantiated, the process object maintains at least metadata fields 802 including the Process ID uniquely identifying the process object and the process being monitored, and a block list 804 including the Block IDs generated and stored by the process object and information times for their creation. The block list 804 may also include keys or references to provide a map to facilitate location and retrieval of the blocks. In this way, the process object 800 can be used to identify and retrieve blocks from the chain of backwards-linked blocks 700 as stored in the store of blocks 134, the blocks containing the complete view of the process as it has progressed to the current information time.

Thus the backward linking of the blocks already establishes a list that can be navigated backwards. The process object data structure does not have to contain the blocks within itself in memory 104. However the process object does contain a map of information times to block identifiers. The map can only be appended to with information times strictly greater than the latest entry. A process is therefore always aware of all the blocks that it has created. It is also the container of business logic that creates new blocks. Therefore the process appears to contain the blocks. From the point of view of writing data into the business management software system, the business process monitoring method 200 addresses the process object, not the last known block in the process.

The map of blocks (i.e. block list 804) stored in the memory 104 in relation to process object 800 allows the block (if any) prevailing at any given information time to be found more rapidly than traversing the list of blocks, which may incur an I/O penalty for loading each block into memory (we remark that although all blocks are kept indefinitely in memory, optimization protocols in implementations may keep recent blocks more readily available in so-called 'hot' stores, while retiring less recent blocks to colder stores such as disk). The keys in the map of blocks can be stored in a structure offering binary search of the keys, with complexity O(log n) for n the number of blocks, compared to O(n) for search by traversal of a singly linked list. However, the number of blocks for a given process is not large (of order 10) so even a simple array of tuples to support the map will suffice.

The first block of a chain of backwards-linked blocks 700 is created with the creation of the process (i.e. instantiation of the process object and the initialisation instruction sent thereto) at the information time corresponding to initialisation, i.e. $t_{init}$. With the exception of the first block, each block references the preceding block in the process (by way of the Prior Block ID field and Prior Block Hash validation field). A block prevails until a block succeeds it in the process. Structurally, each process object is thus a computational object combining (a) apparent internal object state consisting of the append-only contiguous backwards-linked list of immutable blocks and (b) logic in the form of a state machine to govern how the list is appended to (described below in relation to FIG. 9). When something new is learned about the business process being monitored by a process object, the process object may transition to the next effect state (or any subsequent if an event signal leads to one or more effect states being skipped)), and/or refine the current state record and the future ones. As will be explained below, a correction to a historic state may also be occasioned by receipt of information in the event stream. Also, as will be explained below, it is also possible for processes to transition backwards, to prior states. However, as the list is append only, and the blocks, once created and stored are immutable, no operation ever mutates existing blocks. Operations can only append new blocks incorporating new information.

Figure 9:
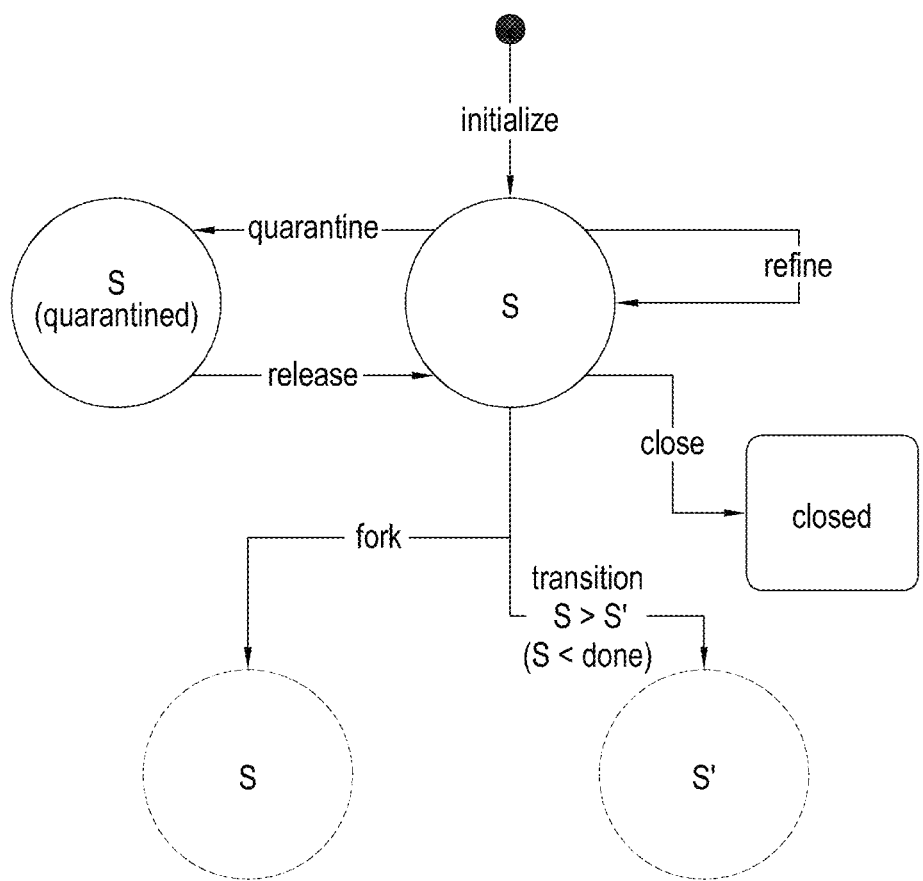
FIG. 9 illustrates a schematic map of how a process object acts as an event-driven finite state machine to transition between states in accordance with aspects of the present disclosure.

FIG. 9 shows the map of how each process object acts as an event-driven finite state machine to transition from one state S to the next (or later) state S' in the sequence of effect states $S=(S_1, S_2, \ldots, S_n)$ responsive to signal events (or automatically, when transitioning as a self-executing autonomous agent). That is, when information such as event signals is received updating knowledge of a business process to be monitored by a process object defined by a stencil, the process object will normally invoke the creation of a new block to be appended to chain represented by the process's backwards-linked list of blocks. The logic that governs the creation of a block is tightly regulated and managed by an event-driven finite state machine (FSM) in order to offer high levels of data integrity and consistency. The instructions that can be sent to a process object by a process object manager to cause the state transitions, as shown in FIG. 9, are summarised in Table 3 below. In FIG. 9, the S inside the circles refers to the information state $S_i$ of the block created as a result of executing the instruction.

TABLE 3

Summary of the effects that instructions given by the process object manager have on process objects. To transition normally implies the process increments in state.

| Instruction | Transitions to a later State S'? | Description |
| --- | --- | --- |
| initialize | yes | Initialize a process from a stencil |
| transition | yes | (Normal) Move to a future effect state<br>(Unusual) Move back to a prior effect state |

TABLE 3-continued

Summary of the effects that instructions given by the
process object manager have on process objects.
To transition normally implies the process increments in state.

| Instruction | Transitions to a later State S"? | Description |
| --- | --- | --- |
| refine | no | Incorporate improved knowledge |
| close | no | Remove the process from hyper-indices going forwards. The process no longer contributes attributes from this point in information time. No further blocks can be added to the process. |
| quarantine | no | Mark the process as suffering from degraded data quality |
| release | no | Resolve a quarantine condition |

Any of the above instructions causes the process object to generate and store a block. To summarise the block generation and storage steps generally, for example in response to receipt in step 208 of any event matching a signal event in a mapping of a stencil for a given business process $\rho_i$ for initialising the process in a state $S_j$ of that process, or transitioning to a state $S_j$ of that process, the process object manager 122 instructs a process object 132 instantiated for process $\rho_i$ based on the stencil for that process to transition to the state $S_j$, thereby causing the process object 132 to generate in step 214 and store in step 216 in an immutable, denormalised block a complete view of the state of the process $\rho_i$ at the time of state transition. Where an instruction is sent to the process object that does not involve a transition, the process object may stay in its existing information state, but still generate and store a block.

Generally, the generated block includes: a timestamp representing the information time for the transition to state $S_j$ or for the receipt of the instruction or for the generation of the block, and the current attribute values for the process based on information contained in the event and/or the stencil. If a block has previously been generated corresponding to a transition to an earlier effective state $S_e=(S_1, \ldots, S_{j-1})$ of the process $\rho_i$, the block also includes a reference to the most recently generated and stored block. The generated block further includes, for any and all previous effect states $S_e=(S_1, \ldots, S_{j-1})$ of the process $\rho_i$: a timestamp of the time the process transitioned to the previous effect state; and attribute values for the process as stored in the block for that previous effect state. The generated block further includes: for any and all subsequent effective states $S_e=(S_{j+1}, \ldots, S_n)$ of the process $\rho_i$: a timestamp of the expected time for the transition to that state; and the expected attribute values for the process based on the current attribute values.

The initialisation or transition instructions sent to the process objects may cause effect states to be skipped. When generating a block for the new state, the timings and attribute values for the skipped states may be taken to correspond to those of the new effect state. Thus in embodiments, when an event is received matching a signal in a mapping of a stencil for a given business process $\rho_i$ for transitioning to a state $S_j$ of that process, where the transition to one or more previous states in the sequence has not previously occurred, the instructions may be further to instruct the finite state machine instantiated for process $\rho_i$ to transition to the state $S_j$ and to generate and store in the block record for the state transition to $S_j$, for any skipped previous effect states of the process $\rho_i$: a timestamp of the time of the current state transition to the state $S_1$ at the time the process transitioned to the skipped effect state; and attribute values for the process as stored in the block for the transition to the effect state $S_j$.

The instructions leading to the initialising of a process by instantiating a process object, and for transitioning from a state S to a subsequent state S' have been described above. Processes may also transition backwards (perhaps due to the erroneous and premature transmission of a signal), and the description given can be reinterpreted for such occasions, provided for example that an attempt to transition backwards from the first state is not made. Reversing a transition does not delete any existing blocks; it simply causes the appending of another immutable block to the chain of blocks albeit with an information state less than the preceding block. The instructions to refine, quarantine and release, and close processes will be described in more detail below.

Regarding a refinement, this is where information or an event is received at the computing apparatus 100 that leads to improved knowledge about a process, but which does not itself lead to a state transition (e.g. where the event does not increase certainty about the progress of the process to completion, and where it does not correspond to an event signal mapped in the stencil for causing a state transition instruction to be sent to the process object to cause it to enter a subsequent effect state). However, the availability of improved data leads to a refinement instruction to be sent by the process object manager to the process object which leads to the generation and storage of another refinement block which has the same information state as the previous block, but which may include updated attribute values, for example based on the received refinement event or information.

Thus, in embodiments, the process object manager may further be to, in response to receipt of any event for the business process $\rho_i$ not corresponding to a state transition in the stencil for that process, instruct the process object $\rho_i$ to refine the stored information about the process in the current state S or a prior state, causing the generation and storage in an immutable, denormalised block record a refined complete view of the state of the process at the time of receipt of the event. The generated block may include: a timestamp of the time at which the block was created representing the information time for the refinement; updated current attribute values for the process based on the received event; a reference to the most recently generated and stored block. The generated block may further include, for any and all previous effect states $S_e=(S_1, \ldots, S_{j-1})$ of the process $\rho_i$: a timestamp of the time the process transitioned to the previous effect state; and attribute values for the process as stored in the block for that previous effect state. The generated block may further include, for any and all subsequent effective states $S_e=(S_{j+1}, \ldots, S_n)$ of the process $\rho_i$: a timestamp of the expected time for the transition to that state; and the expected attribute values for the process based on the updated current attribute values.

Although, in the above-described, the initialisation and transitioning instructions are sent by the process object manager responsive to event signals received in the event stream or queue, the process objects may also be configured to operate in a decentralised and automated manner, acting as self-executing autonomous agents, such that a transition may also occur automatically, not in response to an event signal received in a stream or queue. That is, as described above, a process object is both data structure and code. To bring further benefits of scalability and resilience, the process objects may thus be configured to facilitate a de-centralized model of computation and data storage. The model of processes and blocks as described is well suited to a de-centralized infrastructure but can be further enhanced by considering and implementing processes as self-executing autonomous agents. That is to say that the process objects, thus configured are aware of their environment and respond to it in an automated manner, for example, in the respect of the prevailing information time, or they may be aware of other processes or timeseries.

Where process objects are aware of the prevailing information time, they can be instructed to act autonomously when the next (per the latest block's state records) state transition time is reached. The autonomously generated instruction may be such that:

a. A process object may be configured to transition presumptuously (optimistic), by which the process object transitions to the subsequent state when the time passes (if the external event signal has not already caused the transition to happen). Here, a new block would be automatically generated and stored for the process, indicating the presumed transition to the next state. This could be used to define and implement normal, expected behaviour for a process, and this could then be used to make the computing apparatus 100 a prime source of data and a driver of the progress of the process and other processes. For example, the computing apparatus could emit a signal to other systems, such as an event signal indicating a presumptive transition of the event. In this respect, the process object would become an active actor in the business management software system, not a passive one.

b. Alternatively, a process object may be configured to transition but quarantine itself (sceptical), by which the process object transitions to the subsequent state when the time passes by which an event signal driving an instruction for the transition was expected to have been received but was not. Here, a new block would be automatically generated and stored for the process, indicating the presumed transition to the next state, but the process and the block could be marked as quarantined by using a 'True' value in the IsQuarantined flag in the metadata fields 602. An operator (manual or automated process) could then verify the situation to confirm that the transition has actually happened, or the process object could wait to confirm that the correct event signal is ultimately received. If the transition can be confirmed, or if the correct signal is eventually received, then the process object can release itself from quarantine by automatically generating and storing a further block for the process with the quarantine flag set to 'False', and with updated attribute and timing values for the transition to the state.

c. Alternatively, a process object may be configured to not transition but to refine and quarantine itself (pessimistic), by which the process object stays in its current state when the time passes by which an event signal driving a transition was expected to have been received, but was not. Here, a new block would be automatically generated and stored for the process, preserving the current state, and the block could be marked as quarantined by using a 'True' value in the IsQuarantined flag in the metadata fields 602. The timings of the future effect states are delayed (by a configurable margin, or grace period). The information state, given by the effect state that block was in at its moment of its creation, therefore remains unchanged. As such, the process can stay quarantined until the event signal is received, or the progress of the process can be verified by an operator or by an automated process. If the transition can be confirmed, or if the correct signal is eventually received, then the process object can release itself from quarantine by automatically generating and storing a further block for the process with the quarantine flag removed, and with the updated state (e.g. if the process has transitioned) and updated attribute and timing values for the transition to the state. This procedure may repeat as each grace period expires until rectified.

Thus, regarding the automated instructions leading to the quarantining and releasing of a process, in embodiments, the process object manager may further be to, when the current information time passes beyond the expected time stored in the current block process $\rho_i$ for the transition to a subsequent effective state $S_{j+1}$ for the process $\rho_i$: cause the process object $\rho_i$ instantiated for the process $\rho_i$ to automatically transition to the subsequent effective state $S_{j+1}$ for the process and to generate and store in a new block a complete view of the state of the process at the time of the deemed transition to state $S_{j+1}$. The block may be optionally marked as quarantined until a further event is received confirming or refining the deemed state transition. Alternatively or in addition, in embodiments, the process object manager may further be to, when the current information time passes beyond the expected time stored in the current block process $\rho_i$ for the transition to a subsequent effective state S for the process $\rho_i$: cause the process object $\rho_i$ instantiated for the process $\rho_i$ to generate and store in a new block a complete view of the state of the process at the time of the expected deemed transition to state $S_{j+1}$, where the timestamps of the expected times for the transition to the subsequent effective states $S_e=(S_{j+1}, \ldots, S_n)$ are updated to reflect the absence of the expected signal event to causing transition to the next state $S_{j+1}$. The block may be optionally marked as quarantined until a further signal event is received corresponding to the transition to a subsequent effective state $S_e=(S_{j+1}, \ldots, S_n)$.

Where process objects, are configured to be aware of other processes and timeseries and respond to them in an automated manner, the process objects may query other process objects or timeseries data for themselves. For instance, a process object that monitors a process that causes all fruit of a certain batch to rot will transition (to known or later state) when the expiry time is reached, but it may measure (by means of an extract, detailed below) the fruit that matches the criterion for expiry. A process can be capable of doing this itself rather than depend on a centralized and co-ordinated model. A process object could also inspect market data via a timeseries to obtain a price or a rate. The output functions and schedule functions of process objects allow for such a capability. By moving past the idea that process objects are essentially passive isolated data structures, a much richer range of functionality is possible, offering greater resilience, scalability, and less effort in building a centralized 'command-and-control' model.

Regarding closing a process, referring again to FIG. 2, while monitoring for signal events in the stream or queue, in steps 206 and 208, if no event is received matching a signal event for a monitored process, the business process monitoring method 200 proceeds to step 204 to determine whether any instructions have been received to close a process. If not, the business process monitoring method 200 continues back to step 206, and the process manager continuously loops to monitor the event stream and for instructions to close processes step 202.

A process or process object can be closed if it is cancelled or rolled up (described in more detail below in relation to FIG. 13). Interrogating a process $\rho_k$ for the block at information time $t_i$ normally yields one block $\beta_k$. However, the process yields no blocks after the point in information time at which a process is closed (i.e. $t_{closed}$). Thus the process yields exactly one block while $t_{init} \leq t_i < t_{closed}$ and no block otherwise. After a process is closed, the process object is such that no further blocks can be added to the chain of backwards-linked blocks 700 and instructions to operate on the process object from this point will be rejected. Closing a process object does not delete data from the system, and the system maintains append-only, immutable principles such that the created and stored blocks making up the chain of backwards-linked blocks 700 is retained.

The closing of a process object may normally happen after the process has transitioned to its final effect state in the sequence of states, i.e. after the block for the final effect state has already been generated and stored. In the example shown, this would correspond to the done effect state (i.e. $S_5$). As will be explained in relation to FIG. 13 below, the closing of processes may occur when they are deemed to have been in their final effect state for a suitable period of time (relative to the timescale of the process at large) such that their effects on attributes are settled and will not be subject to refinement. Then, a rolling up process may periodically close the settled processes and collect and aggregate their effects on attributes into a rollup block, such that the chain of backwards-linked blocks 700 no longer needs to be referred to for closed processes. Process objects may also be closed before they reach their final effect state if they are cancelled. In this situation, the process object manager may instruct a process object to be closed. For example, if a process is underway but not yet finishing or done, its effects will still be felt in the real world and will need to be taken into account if it is cancelled whilst underway. On the other hand, if a process is estimated, it will generally not yet have had an effect. In either case, these processes are not to be rolled up because they cannot be deemed to be in an effective stable monostate.

When a process object is closed, the process object may first generate and store a tombstone block appended to the end of the chain of backwards-linked blocks 700. Compared to a normal block, a tombstone block does not contain state records and yields no attributes for any given effect time. The reasons for closing the process may be recorded under the Provenance fields 612. The information state is closed. The block is recorded in the process' block list 804 map of information times to blocks, but it causes the process object to reject further instructions. As always, no data is deleted, the system remains append-only, and no prior blocks are mutated. Once a process is closed and the chain of backwards-linked blocks 700 stored in the store of blocks 134 is ended with a tombstone block, the process object 132 for the process may itself be removed from the memory. That is, the process code object may be torn down from memory.

In other implementations, the system can operate and be well-defined without introducing the closing of a process object and the appending of a final tombstone block. That is, a process object can remain indefinitely in any normal state (such as the done state or any other non-finished state). However closing a process enables certain optimizations to be performed for managing the overall volume of blocks that need to be handled and monitored as time progresses.

A process object and the created chain of backwards-linked blocks 700 thus shares features with blockchains because each block contains (a) a reference to the preceding block (which optionally may include a strong cryptographic hash), (b) a timestamp for the moment in time the block was created and (c) payload data (i.e. the fields stored in each block). The content of the block can be digitally signed to guarantee its integrity. Thus, in embodiments, the process object manager may further be configured to store in each block as the reference to the previous block a cryptographic hash of the previous block, the blocks thereby forming an immutable blockchain for each process. In embodiments, the process object manager may cause created blocks to be transmitted to a network of peer computing apparatus (such as a series of External systems servers 116 or Enterprise systems servers 110) each to validate and store copies of the created blocks, the network of peer nodes immutably storing the blockchain in a distributed ledger. This may further increase the integrity of the business management software system. It should be noted, however, that it is not required that the chains of blocks be managed on a peer-to-peer computer network where nodes on the network maintain replicas of the blockchain and agree by consensus that a block is valid, and that the existence of a multitude of nodes makes it practically impossible to mutate the content of a block across such a large number of nodes simultaneously. The other feature of conventional blockchains is that the security of historic blocks is reinforced by the growth of the chain. This feature would not apply without modification to the model described herein because the chains (processes) are relatively short and do not typically grow without bound. There is ample possibility for the implementation of the business management software system in the present disclosure to use distributed ledger technologies and cryptography to make the system robust to unwanted interference. This depends on the specific requirements of the use case and implementation.

Thus by the business process monitoring method 200 in FIG. 2, the computing apparatus 100 may continuously monitor for signal events indicating progress in knowledge of a business process $\rho_i$ toward completion, and thereby generate an append-only contiguous chain of immutable blocks each providing a complete bitemporal view of the process $\rho_i$ in its evolution over information time through the sequence of states $S=(S_1, S_2, \ldots, S_n)$. Each block in the chain showing, at that information time, the realized times at which transitions of the process to earlier states occurred, or refinements to information were incorporated, the values of the attributes at those times, the time the current state took effect and the current values of the attributes, and the expected times at which transitions of the process to later states are expected to take effect.

The append-only contiguous list of immutable complete blocks spans information time $t_i$ between the moment a process $t_{init}$ is initialised and the present moment to (provided the process is not closed so $t_i < t_{closed}$), while the states $S_e$ within the block span effect time $t_e$ from initiation to future infinity. The information state $S_i$ of the block corresponds to the effect state $S_e$ that the process was in at the time the block was created. The effect state $S_e$ is that state the process had, currently has, or is expected to have at any particular point in time, according to the knowledge contained in the block. Blocks and processes have homogeneous data structures but describe heterogeneous sequences of events and attributes expressed by stencils.

This data structure and system supports powerful, computationally efficient, and practical mechanisms for querying the blocks 134 which provide a single source of truth, to recover and reconstitute different views for the status of the business, its attributes, the constituent processes, from the point of knowledge at point in information time in the past up to the present moment, while still revealing information about how the business evolved to that information time and how it was then expected to evolve further to future effect times. This enables powerful and high integrity queries and analysis to be performed in a computationally efficient manner which is not practicable or possible using the relational database structures or document database structures and their related database management systems.

The processes for indexing blocks for retrieval, managing blocks by rolling up processes, and for interrogating a store of blocks responsive to queries will now be described. Given there may be a very large number of processes and blocks in the system, which to this point exist in free space, interrogating all of them would be an inefficient way to answer many business questions. As will be explained below, hyperindices are used to index the blocks relating to relevant process objects that are prevailing at any information time. From the indexed processes and blocks, the relevant blocks can be retrieved without having to search though all the blocks in a block store, many of which will not be relevant to a query. Within this, we implicitly assume that any block or process object can be retrieved (i.e. read) from the business management software system if its ID is given (e.g. obtained from a hyperindex). The process object contains a map of information times to block IDs (i.e. block list 804), and the ID is sufficient to act as a reference to read a block from the store of blocks 134 in memory 104. In this respect, the reference can be treated as a pointer.

Interrogating a process object for a process $\rho_k$ for the block at information time $t_i$ normally yields the block $\beta_k$. A maximum of one block can be returned. There will be no such block (returning the null result) if $t_i < t_{init}$ (i.e. the initialisation time for the process object), or if the process object has been closed. The process yields no blocks after that point in information time $t_{closed}$. Thus the process yields exactly one block while $t_{init} \le t_i < t_{closed}$ and no block otherwise.

Figure 10:
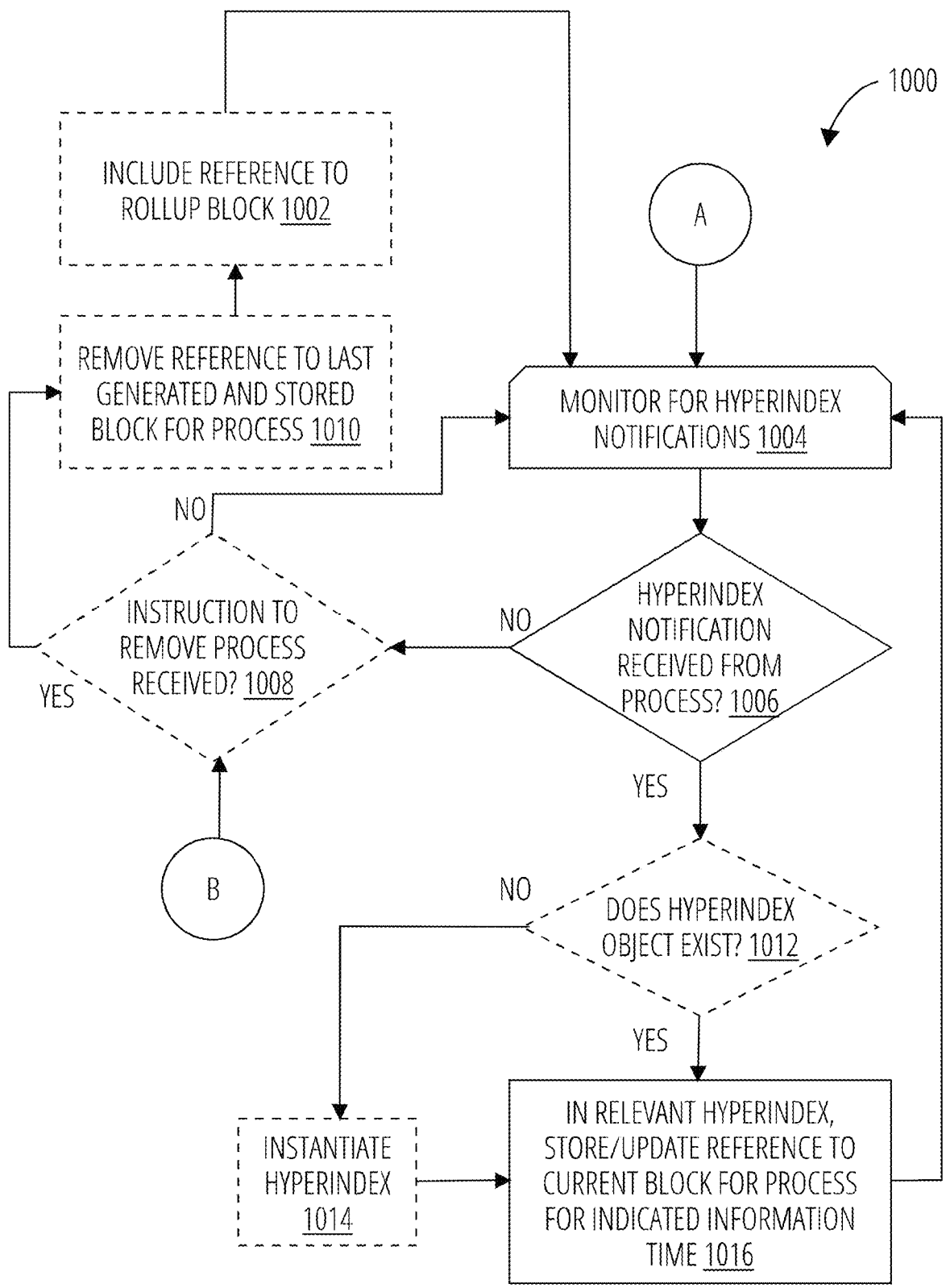
FIG. 10 illustrates a flow chart showing an example computer implemented block indexing method for the indexing and retrieval of immutable denormalised blocks storing data pertaining to a plurality of business processes using hyperindices in accordance with aspects of the present disclosure.

Thus, turning now to FIG. 10, an example computer implemented block indexing method 1000 for indexing for retrieval immutable, denormalised blocks storing data pertaining to a plurality of business processes $\rho = (\rho_1, \rho_2, \ldots)$ using hyperindices is provided. The block indexing method 1000 may be carried out primarily by the hyperindex manager 124 implemented in the computing apparatus 100 shown in FIG. 1.

As noted above, in relation to the description in FIG. 5 of the example stencil 500 providing template for an example Market Order process object for a market order business process, and the data structure of the example block 600 described in FIG. 6, storing data pertaining to a specific market order business process monitored by an instance of a process object, the memory 104 may further store, in relation to the stencil 130 for each process, tags for one or more hyperindices to be instantiated by a hyperindex manager to be notified by the process object on the generation and storage of a new block for the process. That is, the stencils 130 each define, directly or by reference to pseudocode that takes a value on instantiation, hyperindices that are relevant to the process, and are impacted by the process as it proceeds from initialisation to completion.

Hyperindices can be created for any useful reason: for each stencil, for the value of some process attribute, or contextual system information such as the user who created the process, by date the process was instantiated etc. At a minimum every process is indexed by its stencil. The [Tags] field shown in the stencil 500 and block structure for the example block 600 allows custom attributes to be recorded in the block (which may more often related to contextual system information rather than process attributes as already defined). Furthermore, the stencil also nominates the hyperindices that should be notified based on the key and value of attributes in the process. The union of these 606 allows the process object and generated blocks to notify relevant hyperindices when new blocks are generated.

Taking an example of the Market Order stencil 500 shown in FIG. 5, a hyperindex based on a pseudocode for the $Item is defined in the stencil 500, where the value for the $Item is defined for the process object when the specific market order process is initialized. This is an example of a hyperindex being defined based on process attributes, in this case the hyperindex Item (attribute key)=Widgets (attribute value). Furthermore, the tag of $User is defined, so the hyperindex corresponding to all processes where User=Jerry will be notified. Finally, a hyperindex corresponding to Stencil=Market Order is also to be notified.

Hyperindices can also be generated for combinations of attributes and fields. Extending the above example, a hyperindex could be defined to monitor all processes where Stencil=Market Orders && Item=Widgets.

As will be seen, the hyperindices record, for information time as it progresses, the blocks prevailing at that time for all relevant process objects giving notifications to those hyperindices as being relevant. Generally, process objects are only configured to notify a hyperindex if their attributes have effects relevant to the hyperindices.

Referring again to FIG. 1, as many different process object 132 instantiated from different stencils 130 specify many different hyperindices, many different hyperindices 136 are built up in memory 104 for indexing and keeping track of the relevant blocks and process objects 132 in an efficient manner. Hyperindices exist to meaningfully partition the pool of processes and blocks.

Hyperindices 136 are thus data structures and program code-objects instantiable in memory 104 that selectively index blocks and processes through time. Hyperindices facilitate rapid access to the subset of blocks in the store of blocks 134 when a query needs to be serviced. The term hyperindex is used because these indices are versioned in time, that is to say that they are used for a given information time to return the blocks of interest for that time, and they maintain internal state to deliver this requirement efficiently.

They can be constructed to monitor processes with particular attributes, based on keys or values. The hyperindices may be configured to index and monitor the relevant processes at a fine-grained level, or a coarse-grained level. The most fine-grained and ideal hyperindex makes it unnecessary to query each process object's block list or map of information times to blocks to find the block needed to serve a query. That is, the hyperindex may itself determine which blocks in the store of blocks 134 should be interrogated without going via the process objects. A coarse-grained hyperindex records the relevant process objects through information time, and then interrogates the process for the intersecting block when needed. Hybrid schemes are possible in which a hyperindex indexes either or both of the relevant process objects or the relevant blocks. Hyperindices can be thought of as orthogonal to processes.

As described above in relation to the business process monitoring method 200 shown in FIG. 2, in step 218, the process object manager 122 for a given process object may be further to cause the process object, on the generation and storage of a new block (in steps 214 and 216), to send a hyperindex notification to the hyperindices tagged in the stencil for the process $\rho_i$.

The hyperindex notification may include:
- a timestamp of the block creation in information time $t_i$ (or the time of the triggering event signal, or the time of the event),
- an identifier of the process $\rho_k$ (i.e. the Process ID—e.g. process 1),
- a reference to the generated and stored block $\beta$ (i.e. the Block ID—e.g. block index 3 of process ID 1 is Block ID 1/3),
- an indication of the current information state $S_i$ for the process, forming a tuple $(t_i, \rho_k, \beta, S_n)$.

Turning now to the block indexing method 1000 shown in FIG. 10, the process starts in step 1004 with the hyperindex manager 124 performing a monitoring loop for hyperindex notifications received from process objects 132. If, in step 1006, a hyperindex notification is received from a process object (from step 218, as indicated by the process connector 'A') the method proceeds to step 1006 to determine whether or not the hyperindex exists 1012 in the instantiated hyperindices 136 in memory 104. If not, the hyperindex manager 124 instantiates the relevant hyperindex as a process code object in step 1014, and the process then proceeds to step 1016. If the hyperindex does already exist, the block indexing method 1000 proceeds straight to step 1016. Here, the relevant hyperindices are passed their relevant hyperindex notifications for storage.

In step 1016, each hyperindex stores, at an information time corresponding to the timestamp of the block creation in information time, and in relation to the process $\rho_i$ corresponding to the identifier, the reference to the generated and stored block. From there, the process returns to step 1004 to continue its loop monitoring for hyperindex notifications.

For example, where, on the initialisation of a process object for a new estimated market order for bananas (Process ID 1), a block having Block ID 1 is generated and stored for information time $t_i$, a hyperindex notification is sent by the process object to the bananas hyperindex having a tuple in the form $(t_i, \rho_1, \beta^1, S_1)$, where $S_1$ corresponds to the estimated information state at that time $t_i$.

When the process object creates a subsequent block $\beta^2$ at some future information time $t_i+x$ when the process moves to the next information state of known, it notifies the bananas hyperindex with a tuple of the same form, $(t_i+x, \rho_k/\beta^2, S_2)$ implying a change in state concerning $\rho_k$ of $\delta(t_i+x)=/\beta^1 \rightarrow \beta^2$. Here, when the block indexing method 1000 loops around again, in step 1016, the hyperindex is updated for information times corresponding to $t_i+x$ to use the tuple referencing $\beta^2$ in place of the tuple referencing the block $\beta^1$. As can be seen, the step 1016 either stores a new tuple referring to a new block for a new process object, or, for a process object that has previously notified the hyperindex of an existing block, the hyperindex is updated to refer to the new tuple referring to the new block from that information time forward, discontinuing the reference to the previous block (albeit the reference to the previous block is retained for all times from $t_i$ to $t_i+x$).

In the monitoring loop in the block indexing method 1000, if after step 1004 and step 1006 no hyperindex notification is received, the block indexing method 1000 proceeds to step 1008 to check whether any instructions have been received to remove a process from a hyperindex. Generally, instructions to discontinue monitoring a process by a hyperindex may be received from a rollup process as described below in relation to FIG. 13 (see process connector 'B'). However, alternatively, or in addition, instructions to discontinue monitoring a process by a hyperindex may also be received from a process object or process object manager. The instructions to remove a process from a hyperindex are generally received when a process object is closed as described above, for example in a rollup, or in the event of a cancellation of the process. That is to say, the hyperindex should, from that point in information time forward, stop indexing the closed process object, and therefore no longer maintain any references to blocks generated and stored by the closed process object. Where a rollup has occurred leading to the process object becoming closed, the hyperindex will be instructed to store in place of the closed process object and its blocks, a reference to a rollup block in which the effects of the closed process on the attributes have been collected and aggregated with other blocks and processes also being rolled up.

Thus, in step 1008, if an instruction to close a process object is received at the hyperindex manager 124, the hyperindex manager is caused to send to the hyperindices instantiated by a hyperindex manager tagged in the stencil for the process $\rho_i$, an instruction to remove the closed process.

Then, the block indexing method 1000 proceeds to step 1010, with the hyperindices thereafter no longer maintaining any reference to the closed process $\rho_i$ for the notified information time onwards. Thus the updating of the hyperindex to remove at an information time corresponding to the receipt of the instruction for the closed process, the reference to the last generated and stored block for the process, is such that the hyperindex thereafter ceases to index the blocks of the closed process $\rho_i$. Where the instruction to remove a closed process includes a reference to a rollup block, in step 1002, the hyperindex may replace the removed reference to the last generated and stored block for the closed process with a reference to the rollup block. Noting that a rollup invariably affects multiple processes k simultaneously, the overall effect on the hyperindex is to replace k references with one reference to the rollup block.

For a process initialized at $t_a$ and closed at $t_b$, questioning the hyper-index at $t_q$ for known processes or blocks where $t_a \leq t_q < t_b$ will yield a result containing this process or its blocks, while outside of those times any result will not refer to the process or blocks within it.

If the value of a hyper-indexed attribute changes (due to a refinement or transition), then the process must notify the prior hyper-index to remove it and notify the new hyper-index to monitor it from that point forwards—i.e. a swap. For example, where an estimated market order for Gala variety apples proceeds to a next state of being known and the variety of apples being ordered changes to Pink Lady, the hyperindex monitoring Gala apples would have to remove the reference to the market order, and the hyperindex monitoring Gala apples would have to add the reference to the market order.

In this way, the hyperindices thereby selectively index the relevant subset of all prevailing blocks and/or processes current for that hyperindex at that information time, for all information times.

A hyperindex can be pictured as an append-only map of information times to lists of which block and process were prevailing at that time, recorded as a complete snapshot. Each time a hyperindex receives a notification from a process object $\rho$ it clones the current list, updates the indexed block (i.e. $\beta^1 \rightarrow \beta^2$) for the given process, and appends this new list to its internal state with a key of $t_i$. We note that there may be multiple processes notifying any given hyperindex at a single point in information time, so these updates may be batched together. This data structure can be maintained as a map of information times to the list of blocks prevailing at those times.

In the following example, a hyperindex notification has been received at $t_{a+1}$ that causes the indexed block associated with process object $\rho_p$ to change, followed by a hyperindex notification at $t_{a+2}$ that causes the indexed block associated with $\rho_q$ to change:

$[t_a \to (\{\rho_p, \beta_p\}, \{\rho_q, \beta_q\}, \{\rho_r, \beta_r\}),$
$t_{a+1} \to (\{\rho_p, \beta'_p\}, \{\rho_q, \beta_q\}, \{\rho_r, \beta_r\}),$
$t_{a+2} \to (\{\rho_p, \beta'_p\}, \{\rho_q, \beta'q\}, \{\rho_r, \beta r\}), \ldots ]$ For a more coarse-grained approach, a hyperindex that tracks only processes that are current and not yet closed and ignores block updates that occur as processes progress, suffers much less churn. In this example of such a process-tracking coarse hyperindex, the first block of a process $\rho_y$ appears at $t_{b+1}$ and the process $\rho_x$ leaves the hyper-index at $t_{b+2}$ (within these process additions and removals, a number of block updates will have occurred):

$[t_b \to (\rho_x), t_{b+1} \to (\rho_x, \rho_y), t_{b+2} \to (\rho_y), \ldots ]$ The use of coarse- or fine-grained monitoring hyperindices in this way provides a snapshot that allows the direct identification of the prevailing blocks or processes relevant to a given hyperindex at any given $t_i$.

To optimise hyperindex performance, a mixed strategy of coarse- and fine-grained monitoring may be adopted. While it will vary with use case, most users and queries are expected to most often want to query data at the latest available moment, i.e. $t_i=t_0$. This implies that each hyperindex considers its most recent state, captured at $t_i$. In this case, a possible optimization is to store the indicated blocks for the most recent state (i.e. store the current blocks of the relevant processes for fine grained monitoring), but only store the processes for prior times (i.e. the relevant processes would be stored in a coarse-grained manner for prior times, meaning that the processes would need to be referred to find the individual blocks relevant at an 'old' given information time). That is, in this mixed strategy, if $t_i \leq t_i$, the hyperindex knows the blocks directly, while for $t_i < t_1$, the processes are interrogated as intermediaries.

Alternative optimisation approaches to partitioning coarse- and fine-grained monitoring by the information state of a process can be used. By including the latest information state $S_i$ of the block in the notification to the hyperindex, so the hyperindex may partition the list of open blocks and processes accordingly, as each state will have different churn rates. While processes are in the estimated state, there may be several refinements (causing high churn frequency). This implies the coarse-grained process-based monitoring approach is better for processes in early information states. Once processes are in the done state, the churn frequency is much lower, and so fine-grained block-based monitoring may be more advantageous for processes in later information states, however the count of processes may high (as all processes eventually end as done). As a given process transitions through the information states, it may move through the corresponding partitions in the hyper-index, each using the most appropriate coarse- or fine-grained monitoring strategy.

Figure 11:
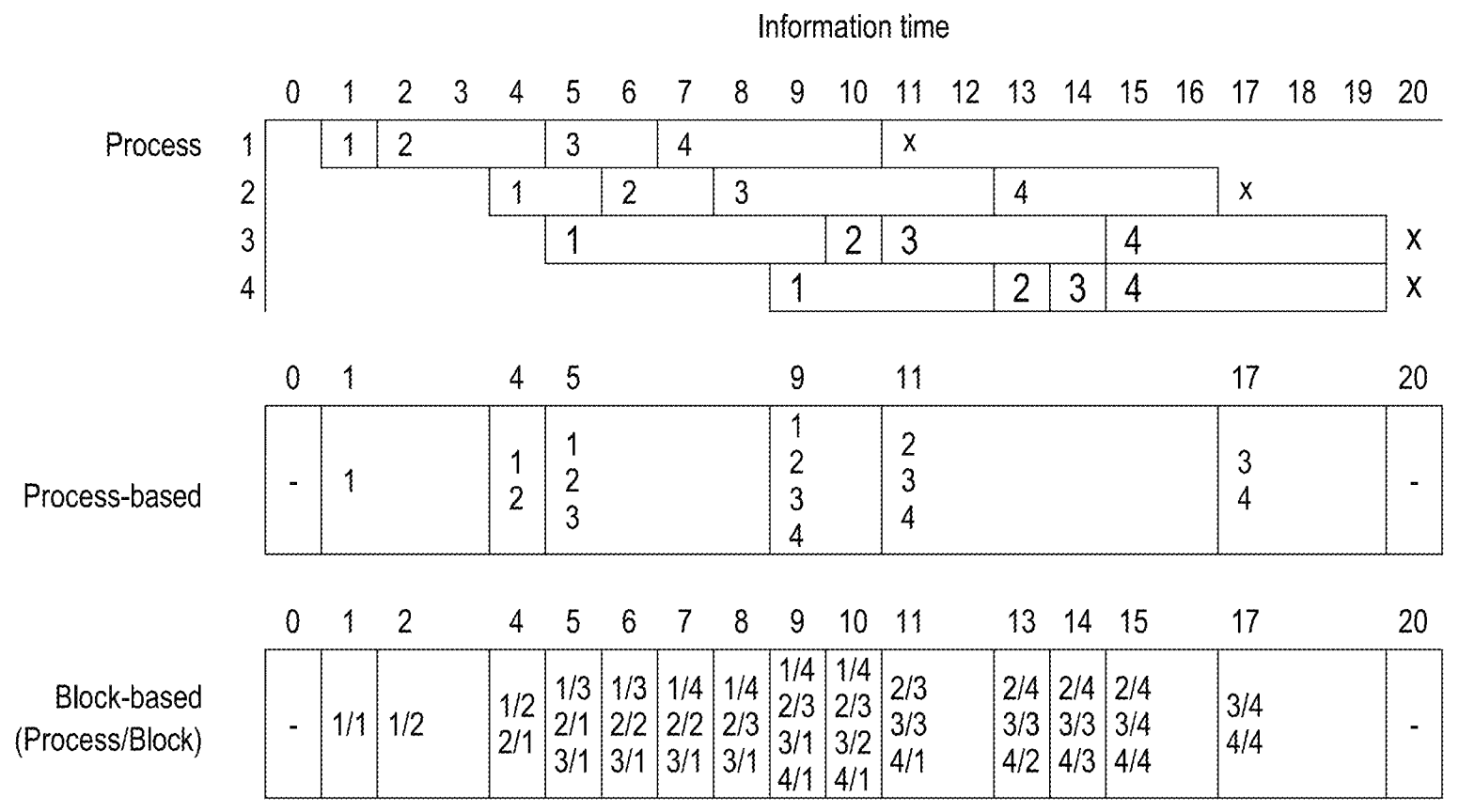

An example showing the operation of hyperindices in the coarse- and fine-grained approaches to monitoring prevailing processes and blocks is shown in FIG. 11 for four processes 1, 2, 3 and 4 as each creates four blocks P/1, P/2, P/3, and P/4 over information time before closing (indicated by 'x').

In terms of management of the blocks in the store of blocks 134, two techniques will now be explored by which the long-term performance of queries and extracts against the store can be maintained despite a store size that continues to grow (albeit linearly) as information is accrued.

The growing spatial footprint is not a problem: durable storage space is cheap and not a concern, and the fundamental tenet of the business management software system is append-only immutable data. However, even if an extract or query could be performed against the store of blocks arbitrarily quickly, the size of the result (when disaggregated) would become larger and larger, creating problems for I/O and downstream systems. In any case, while distributed and scalable computing power is widely available and relatively cheap, to minimise the computing effort, time and energy needed to process a query, the scope of the computation needs to be managed where possible.

The first technique, matching, exploits the natural jigsaw-fitting together of one process with another, in the sense of, for example, what goes up in terms of a flight departure, must come down in terms of a flight arrival. What gets bought in terms of inventory, eventually gets sold. The second technique, i.e. rollups, described below in relation to FIG. 13, effectively reduces the number of live processes and blocks.

First concerning matching, to match a process with another process is to logically associate the two processes in some contextually meaningful way whereby the impact of one process is to effectively reverse the impact of the other. As such, the set of processes taken together has zero impact on an asset of interest. The instruction to match creates a meta lineage between the processes.

Figure 12:
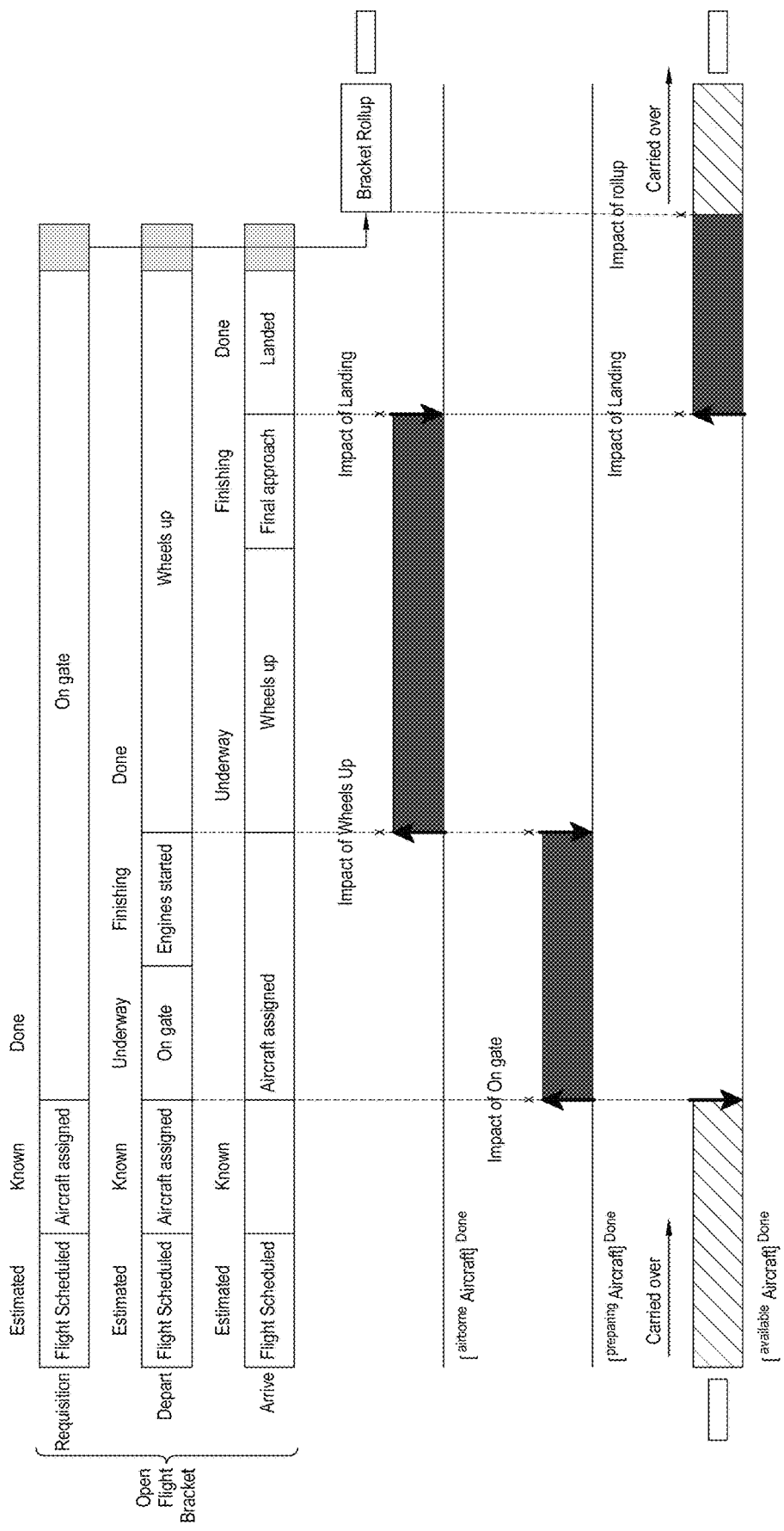
FIG. 12 illustrates a schematic showing the progress at the level of an aircraft for the three example matched processes (together defining the opening of a 'bracket') consisting of: requisition of the aircraft for the flight, the departure of the flight, and the arrival of the flight in accordance with aspects of the present disclosure.

An example of this is shown in FIG. 12 which shows the progress at the level of an aircraft for the three matched processes (together forming a 'bracket') for an open flight of, requisition of the aircraft for the flight, the departure of the flight, and the arrival of the flight. At the bottom of FIG. 12, the results of three queries against the blocks for the bracketed matched processes are shown for the done state for inventory in nodes for the aircraft being 'available' for requisition (bottom query), the aircraft 'preparing' for departure (middle query), and the aircraft being 'airborne' (top query). The solid shaded states are settled, whereas the line shaded states may indicate the aircraft is available, but is subject to being assigned to a flight. As can be seen, the open flight matched bracket of processes has a net zero contribution to the number of airborne aircraft. The match can be ongoing, so that the subsequent take-off can match with the landing, and so on.

Regarding rollups, the design articulated so far is of a system of processes and blocks whose number grows in linear proportion to the information accrued. This is a very pleasing characteristic. Like many other computing systems, the system can grow and distribute itself across compute resource accordingly.

Nevertheless, as time proceeds the business management software system ends up with an ever-increasing number of blocks, and it is reasonable to assume that in most circumstances these blocks are in the final done information state.

Once a process evolves into the final state, it is interpreted as finished and irreversible. Its attributes are not expected to change. They may change (for example, perhaps there was some error in the event signal message that invoked the transition to the final state), and that is acceptable and can be achieved with a refinement. However after some reasonable period of time, the data can be deemed a settled matter. Also, at this time, the vast majority of user queries (i.e. extraction requests) will typically be using bitemporal pointers far after the transition to the final state. As will be seen below in relation to the discussion of extracts, these blocks are delivering the same done attributes to these extracts repeatedly, for these extracts to then accumulate them with other more recent blocks in the same time context to arrive at the same partial contribution. At this point in information time, these processes are, in fact, in a monostate.

Figure 13:
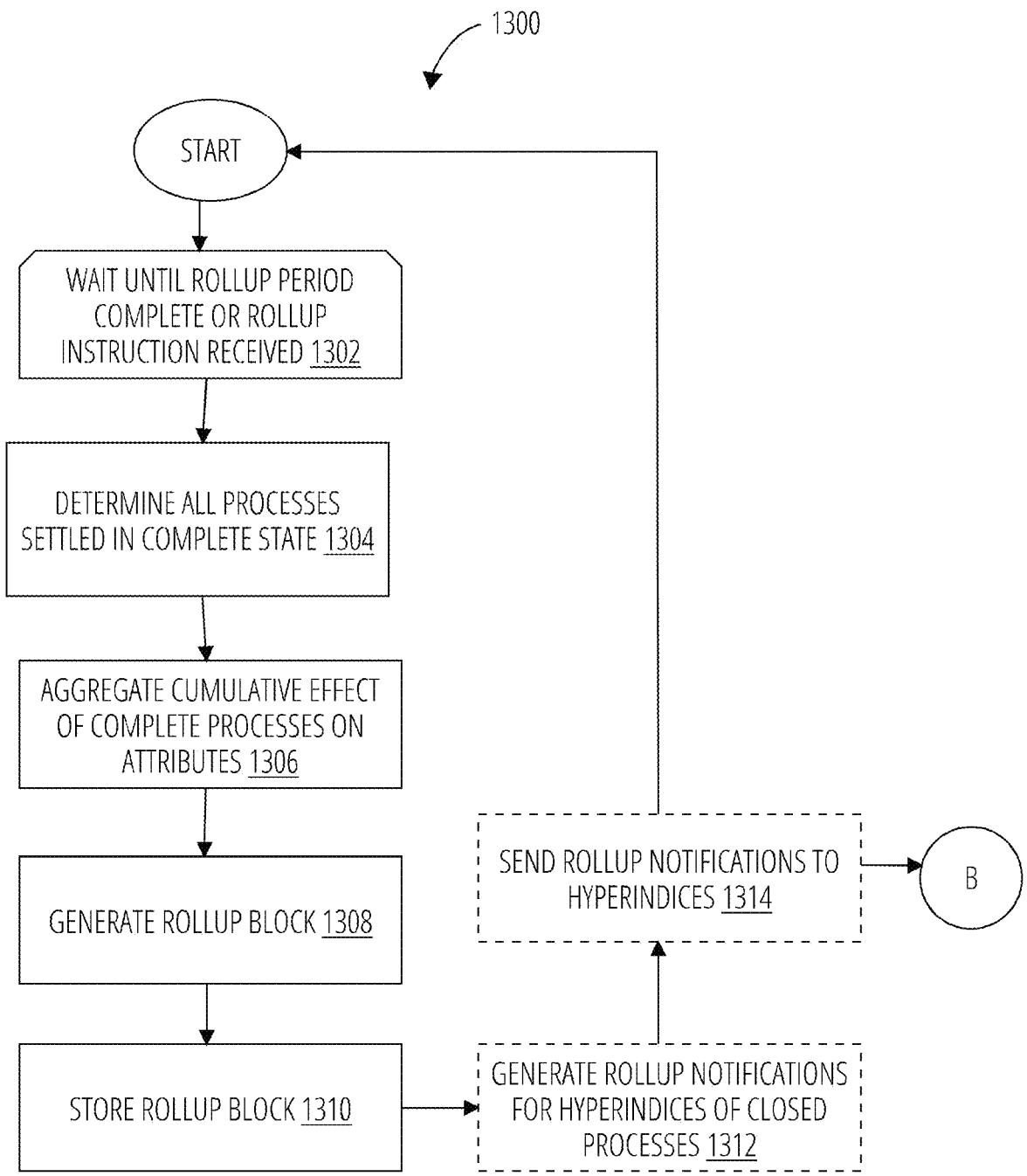
FIG. 13 illustrates a flow chart showing an example computer implemented method for rolling up processes deemed complete to reduce the number of live processes and blocks monitored by hyperindices, through the creation of rollup blocks in accordance with aspects of the present disclosure.

To reduce the computational load arising from running queries against large numbers of blocks, a rollup method 1300 of the type shown in the example of FIG. 13 can be used to compress (but never delete) these long-term stable blocks and processes into a single meta-block and meta-process. The rollup method 1300 is operated by rollup manager 126 and, as has been suggested above in relation to FIG. 2 and FIG. 10, it has the effect of closing the process objects being rolled into it, and unsubscribing hyperindices from the rolled-up processes and subscribing them instead to the rollup.

Figure 14:
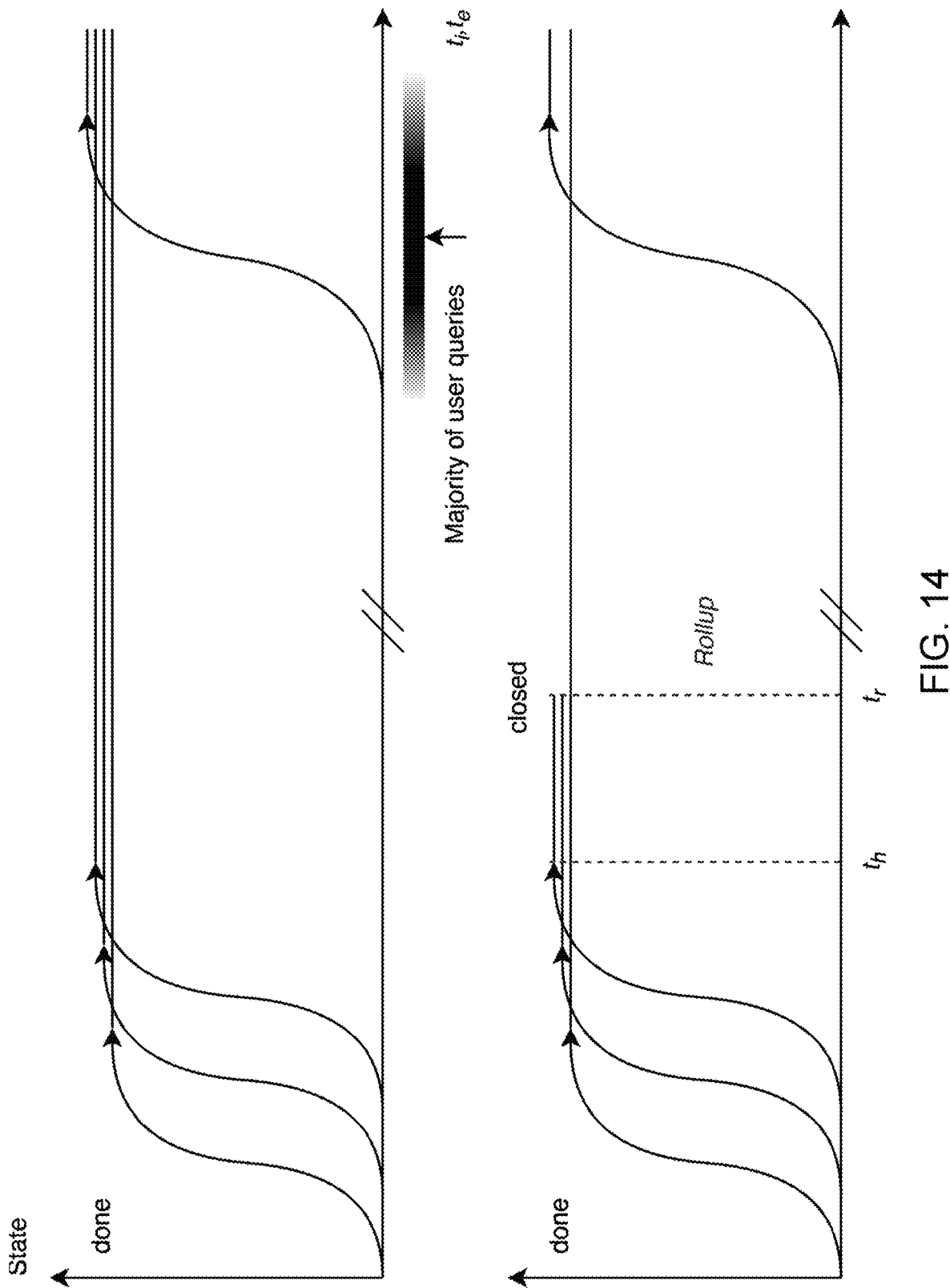
FIG. 14 illustrates a schematic showing an example of the effect of rollups in reducing the number of historical processes and blocks that need to be indexed by hyperindices and queried in order to respond to the majority of user queries in accordance with aspects of the present disclosure.

This effect of rollups in reducing the number of historical processes and blocks that need to be indexed by hyperindices and queried in order to respond to the majority of user queries is illustrated schematically in FIG. 14. As can be seen, in the top timeline, in absence of a rollup, in order to respond to a user query against a hyperindex affected by four hyperprocesses, three of which are done and settled, the query has to consult all the settled processes (if coarse-indexed), retrieve all the blocks, and aggregate all their effects, resulting in a high computational load. In contrast, in the bottom timeline, after the three historical processes are done at time $t_h$, a rollup process closes the process objects at time $t_r$, compresses their effects into a single rollup block, and causes the hyperindex to subscribe instead to the rollup process and rollup block which aggregates their effects. At the time of the query, the business management software system then only needs to query against the currently non-rolled up 'live' processes and the rollup block. In many cases this will substitute a large number of subscriptions corresponding to multiple processes being rolled up with just one.

Only processes deemed to be a long-term stable done state are rolled up. The rollup block is created at information time $t_i = t_r$. The horizon $t_h$ of the rollup corresponds to the latest effect time of the blocks being rolled up, and $t_h < t_r$. When a query specifies $t_i < t_r$, the original blocks are resolved directly by the hyperindices (corresponding to append-only immutable behaviour, as expected). That is, the original rolled up blocks were never deleted, nor was their historic indexation within hyperindices changed as an effect of closing and rolling up.

As will be understood from the description of FIG. 16 below in relation to queries, when a query specifies an information time $t_i \geq t_r$, as we expect the majority of user queries to do, the rollup block is retrieved instead. If the effective time of the query $t_e \geq t_h$ the rollup returns its content (i.e. interacts with the extract as a normal block would). However, if the effective time of the query $t_e < t_h$, the rollup redirects the query to the blocks which were rolled up (to reveal the bitemporal information stored therein about the processes as they evolved).

Figure 15:
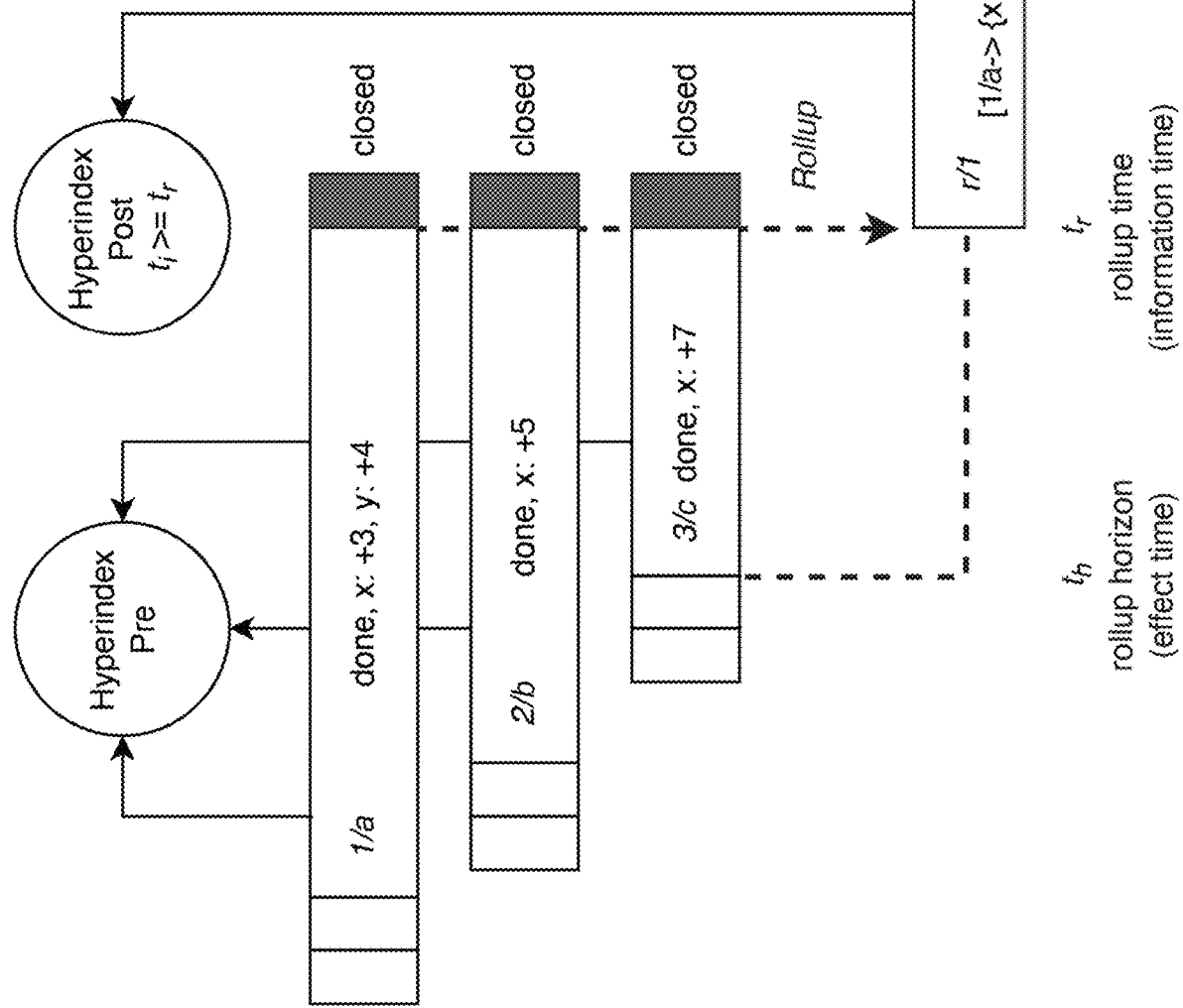
FIG. 15 illustrates a schematic showing an example of the aggregation of the effects of processes being rolled up into a rollup block in accordance with aspects of the present disclosure.

By collecting the constituent attributes (as a list) in the rollup block, the full level of detail can be maintained and the scope of map/reduce operations on the data is not diminished. However, a rollup block may maintain a set of materialised aggregates to facilitate rapid extraction when only summary level statistics are required. An example is shown in FIG. 15. Here, the effects of three processes being rolled up into one is shown. The references maintained by a hyperindex before and after the rollup are shown. Note the rollup contains the collected attributes and pointers of the blocks being rolled up. That is, the effect of the three 'done' processes is on the attributes x and y is:

Process 1: x: +3, y: +4
Process 2: x: +5
Process 3: x: +7

As can be seen, the rollup block aggregates these effects on x and y to return to any queries at $t_i \geq t_r$, the following attribute values: x: +15, y: +4.

Thus referring again to FIG. 13, a rollup method 1300 starts and proceeds to step 1302 in which the rollup manager 126 waits until a rollup period is complete before proceeding to step 1304, such that a rollup is performed periodically. Alternatively the rollup manager 126 may proceed to step 1304 responsive to receipt of a rollup instruction. This may occur, for example, after a previous rollup has been unstitched (e.g. to account for a refinement) and needs to be rolled up again.

Then, in step 1304, the rollup manager 126 determines all the instantiated business processes that have transitioned to and settled in the final state $S_n$ such that these processes are deemed completed. It may be with reference to the hyperindices that a decision is made as to which processes have been settled for long enough to be deemed complete, such that they can be rolled up.

Then, in step 1306, the rollup manager 126 collects and aggregates, based on the stored blocks for the final state $S_n$ of the complete processes (i.e. those to be rolled up), the cumulative effect of the complete processes on the each of the attributes indicated in the final blocks.

Then, like the process objects, in step 1308, the rollup manager 126 generates a rollup block containing, for each of the attributes indicated in the final blocks, the collected and aggregated cumulative effects of the complete processes, as key-value pairs.

In embodiments, the rollup block may be denormalised. However, in other embodiments, possibly-normalised and relational, columnar structured tables may be used for storing the key-value pairs gathered from the multiple contributing processes, unlike the denormalised blocks monitoring 'live' processes, and this can be stored and managed in a database supporting columnar data tables, however guarantees must be given that the data is immutable. This illustrates the potential to create a hybrid of relational and non-relational data structures and OLAP-like behaviour.

Thereafter, the rollup manager 126 may store the rollup block in the store of blocks 134.

Thereafter, in embodiments, the rollup manager may generate, for all hyperindices indicated in the stencil for each process deemed complete and rolled up in the rollup block, a rollup notification including: a timestamp of the rollup, an identifier of the complete process $\rho_i$, and a reference to the generated and stored rollup block step 1310 aggregating the effects of the complete processes. In step 1314, the rollup manager 126 may send the generated rollup notifications to the hyperindices step 1312 (see process connector 'B'), to thereby cause the hyperindex to remove the references to the final generated and stored blocks for the final state $S_n$ of the complete processes $\rho_i$, and to include the reference to the generated and stored rollup block step 1310 aggregating the effects of the complete processes.

In embodiments, the rollup manager may further be to cause the instantiated process objects deemed complete to be closed. That is, the rollup manager may send instructions to the process objects to cause them to be closed in step 204 of the business process monitoring method 200 of FIG. 2.

The rollup block behaves like a normal block to extraction and hyperindices although in general it yields a list of values for any given attribute, one item for each contributing process, unless a summary statistic from the optionally maintained materialized aggregate is sufficient. However, and as mentioned above, the rollup block appears transparent and redirects to the blocks which were rolled up when $t_e < t_h$, but opaque for $t_e \geq t_h$.

A rollup is not a singleton, in that there may be many rollups in time, over many stencils of processes. Rollup blocks are recursive and can include other rollups.

Rollup blocks are time-atomic, in that, just like streaming data in causing processes and blocks to be created and hyperindices to be updated in one timestep, so the action of compressing blocks into a rollup block, closing processes, and notifying hyper-indices happens as one at a single information time.

A rollup may operate at the attribute level, rolling up the impacts to the same attribute arising from varying stencils. Alternatively, it may operate at the level of processes using the same stencil.

It should be reiterated that a rollup substitutes many blocks and similarly structured impacts for one single block, when the bitemporal pointers of $t_i$ and $t_e$ of a query are after the rollup. When the bitemporal pointers of a query are placed before the point of rollup, the query behaviour is as before. No information has been lost, nothing has been deleted. The system does not shrink in size, but as the rollup takes over from constituent blocks and processes from $t_i \geq t_r$, $t_e \geq t_h$. This may enable these closed blocks and processes to be retired to colder, cheaper storage while improving quality of service and performance for the majority of users.

Regarding queries against the store of blocks reference will now be made to FIG. 16 which shows an extraction method 1600 carried out by the extraction manager 128 in computing apparatus 100.

The business management software system is intended to support near-real-time queries on continually updated data. In contrast to systems using batch processing, data is inserted into the system of blocks and processes via a continuous stream, thus offering low-latency access to the latest data. Because the system is append-only, and processes and blocks exist independently of other processes and blocks, new blocks and processes can be inserted into the block pool without locks or mutexes. Data can be extracted from the system up to the latest ready information time (or frontier) knowing that the blocks that are required to deliver that data are 'at rest' and we are not waiting on new data to arrive or writes to finish to service the query.

Figure 17:
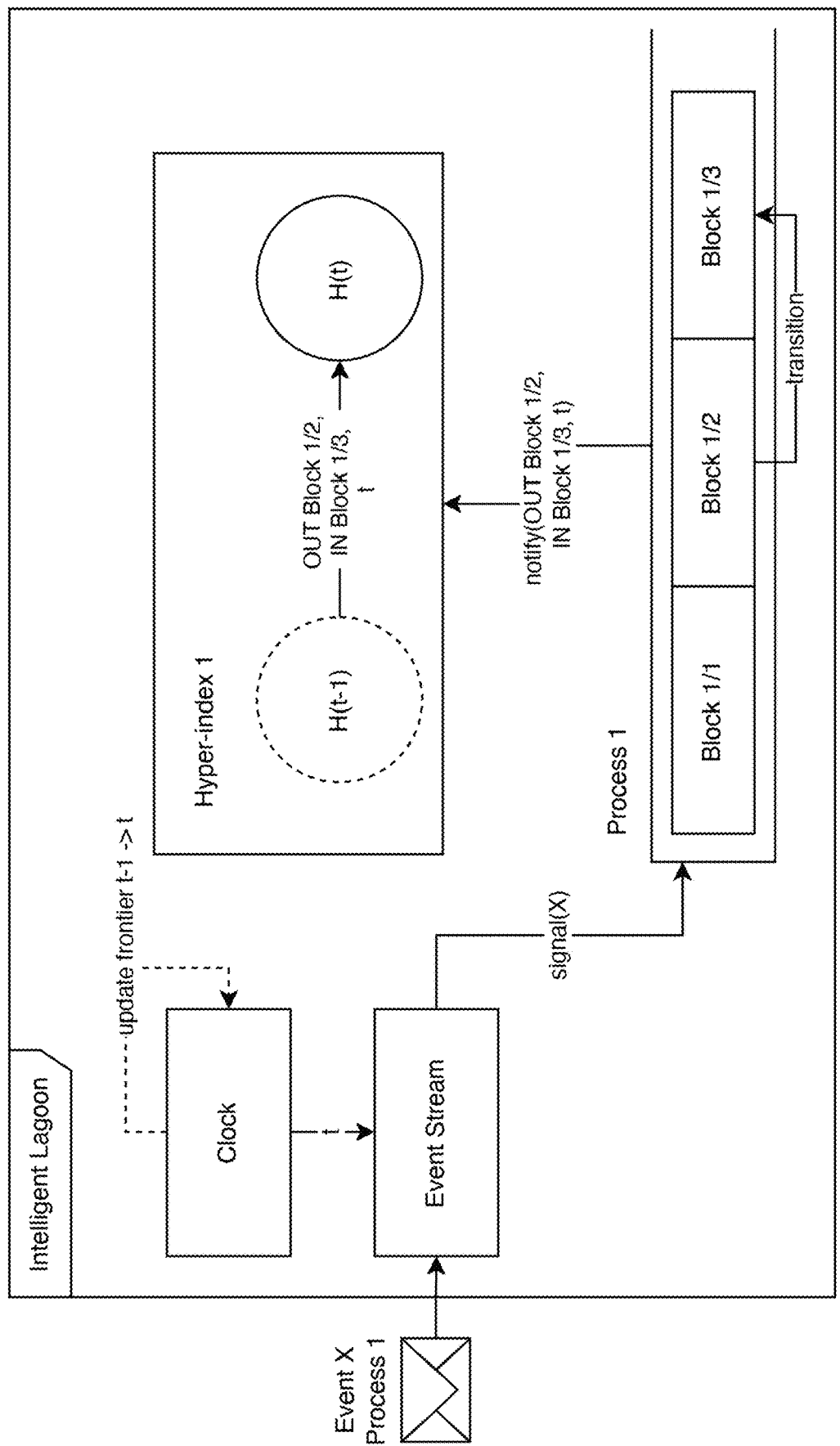
FIG. 17 illustrates a schematic simplified example, from a logical viewpoint, concerning data ingestion and processing by a computer apparatus providing a business management software system in accordance with aspects of the present disclosure.

In this respect, FIG. 17 represents a simplified logical view of data ingestion. Here, as can be seen: new information (event X in process 1) is received on an event stream, it is timestamped by the clock and sent on by the event stream where is it treated by process object manager as an event signal for a process 1, which causes a process object for process 1 to transition from block 1/2 to block 1/3, resulting in the update of hyperindex 1, and the clock information time frontier to increment. These operations must be collectively atomic. Real-world implementations may differ, and in a distributed system, there are considerations to be made for distributed timing and efficient use of computational resources. To guarantee bitemporality asking a question of the business management software system at some specific $t_i$ up to the present frontier cannot produce a response in the future that will be different, which is to say that queries are idempotent.

The streaming model of computation is not restricted to the ingestion of data either. The same model can be applied when extracting data from the system, i.e. state records and their attributes, followed by further processing (operators and reductions) can also be streamed as output to consumers.

Regarding data extraction, as will become apparent, the business management software system as disclosed herein enables the interrogation of a single process with four degrees of freedom as shown in the table in FIG. 18. The table describes the levels at which these degrees of freedom operate in the context of processes, blocks, and hyperindices and how they may be used. "Now", the information time frontier, corresponds to $t_o$. Queries using these four degrees of freedom are thus available to all applications and users that can send extraction requests to the computing apparatus 100 for handling by the extraction manager 128. Interrogating a process yields a bitemporal and stateful view of its attributes (i.e. the query returns information about how the expected attribute values and expected state transition times evolved with increasing certainty and the process evolved from initialisation to completion).

While looking at individual blocks and processes is an excellent source of highly granular information corresponding to a transactional view shared with Online Transaction Processing systems (OLTP), the system is equally designed to work across all processes corresponding to an analytical view shared by Online Analytical Processing systems (OLAP).

Referring again to FIG. 16, the extraction method 1600 begins and proceeds to step 1602 in which the extraction manager receives a query specifying at least one attribute $a_i$, the query information time $t_i$; the query effect time $t_e$; one or more acceptable information states $S_i$, and one or more acceptable effect states $S_e$. The acceptable effect and information states may be expressed as Boolean filter conditions. We may represent the enumeration of some attribute a in some effect state(s) $S_e$ and information state(s) $S_i$, with information time $t_i$ and effective time $t_e$ as $$\{a\}_{S_i}^{S_e}(t_i, t_e).$$

From this, the extraction manager 128 acts as a worker to handle the query, identifying the hyperindices relevant to the attribute, and from there extracting the blocks from the store of blocks 134.

The query may include further limitations that need to be handled by the extraction manager 128. For example, a query may additionally specify a sub-selection of processes $\rho = (\rho_1, \rho_2, \ldots)$ or blocks $\beta = (\beta_1, \beta_2, \ldots)$ when considering contributions to the attributes, which may be explicitly referred to in the query thus: $\{a, \rho\}$, $\{a, \beta\}$. For example, only processes which decrement or increment some attribute should be considered.

As explained above, the hyperindices selectively index the subset of all prevailing blocks relevant to the attribute across information time, and so they imply a selection of processes $\rho^0$ and their blocks $\beta^0$. Specifications in the query further narrow the scope of the selection of processes and blocks.

From there, in step 1604, the extraction manager 128 sends a request to all identified hyperindices to return to the extraction manager from all blocks indexed by each hyperindex at the queried information time and satisfying the queried information state, all values for the attribute prevailing at the queried effect time and effect state (and satisfying any other limitations applied to the query). That is, the extraction manager 128 fans the extraction request out to relevant hyper-indices in parallel and waits on their response.

For a given $t_i$ a hyper-index interrogates the blocks indicated at that time: blocks are excluded if they do meet the requirements for information state $S_i$. An accepted block is then interrogated for the state record prevailing at the specified effect time $t_e$ with the requisite effective state $S_e$. If such a record exists it yields its attribute. Repeated over all acceptable blocks, the collection of attributes is delivered to the requesting worker labelled with the identifier of the block. As more than one hyperindex may be used, the same block may be interrogated more than once but the result will be identical in each case. When the resulting attributes are gathered the duplicates (known from the block identifiers) are eliminated.

Although, as described above, the hyperindices 136 may operate to query the blocks and return the attribute values, in other embodiments, the hyperindices 136 may operate to return to the extraction manager 128 the blocks (or the block IDs thereof), and once the blocks satisfying the query are determined, the attribute values can be gathered from all of the blocks by the extraction manager 128 itself. In other embodiments, the extraction manager may directly interrogate the processes and/or blocks if their identifiers are directly specified.

Then, in step 1606, in response to receipt of the attribute values satisfying the query from the identified hyperindices or blocks, the extraction manager 128 aggregates the values for the attribute, and in step 1608 returns the results to provide an answer to the received query. The extraction manager 128 may further reduce (filter, group, summarise, aggregate) the results before returning them to the user. The model is amenable to the map-reduce algorithm.

The enumeration of the attributes in blocks is the basis for standard computations on datasets and the hyperindices or extraction manager are free to perform filtration, map operations (also called projections) and reduction operations on this dataset just as with any other data source, but with these new degrees of freedom. The hyperindices and extraction managers can perform calculations with the usual operators of data science (map, sum, avg, stdev, max, min, percentile . . . ) over all attributes associated with blocks.

The specification of the parameters necessary to perform an extract is called an extract definition. Importantly, the complexity of the extract does not vary with the specification of the degrees of freedom: all questions of attributes as a function of time and state are equally complex, be they retrospective forecasts or a view of the present given the latest knowledge in the information stream. This is unlike queries in relational databases and their management systems, where these queries simply could not be evaluated as the information (such as the temporal evolution of state) is not stored, or whose integrity may be suspect, or where significant additional processing (which may be manual or automated, to gather historical snapshots for example) requires significant additional computational effort to provide answers to particular queries.

By making these new degrees of freedom available when specifying extracts that can be performed automatically and with constant computational complexity, new operation paradigms are available. For example, it is insightful to consider what value can be derived from performing multiple extracts while iterating the extraction process over possible values of an extraction parameter and comparing the results. This can unveil previously hidden information about how the processes of a business evolve, interact, and are managed. This can unlock new possibilities of data analytics and insight that were not previously achievable.

For example, in relation to iterating extracts over information time $t_i$, this allows the evaluation of the contribution of information received over time up to the present moment to the present position. This can arise from unforeseen new processes through to the effect of adjustments and corrections. If we find ourselves overdrawn today, we can compare our present position in relation to certain attributes with the position we expected we would have for them today given what we knew a week ago. This can help with understanding and improving the accuracy of budgets. Again, in comparison to existing systems, the user is free to position the bitemporal pointers as they wish (subject to $t_i <= t_0$ of course).

In relation to iterating extracts over information state $S_i$, this allows the evaluation of the quality and certainty of the information contributing to the position. This has application in understanding what contributions (and withdrawals) to a past, present, or future business position are driven by highly certain impacts (in the done state) relative to provisional impacts in the estimated state.

In relation to iterating extracts over effect time $t_e$, by scanning the effective time while holding other parameters fixed we see the accumulation of impacts on the business through time as processes and their attributes evolve according to historical fact or future stencil-programmed evolution. This is the key feature which allows the business management software system to 'look through time' in a way that was unachievable with previous data structures and database systems.

In relation to iterating extracts over effective state $S_e$, this allows the evaluation of the effect of recognising the impact earlier or later in its lifecycle. The use of this parameter will depend on the nature of the process and the asset or resource (i.e. attribute) in question. The effect states may map to the transit of an event through departments and teams in the enterprise, currently handled with crystallized snapshots and reconciliations between them.

In addition to iterating the extraction process using discrete sampling intervals for the temporal parameters (+1 day, +2 days . . . ), it is also possible to examine the processes (either by inspecting the map of information times to blocks or from fine-grained hyperindex data) to assemble multiple extracts based on when the underlying process and block data change.

If the attributes returned by a query are further labelled with $S_i$, $S_e$, $t_i$, $t_e$, the results can be pivoted, (filtered and aggregated), which brings even more flexibility to the user.

Figure 19:
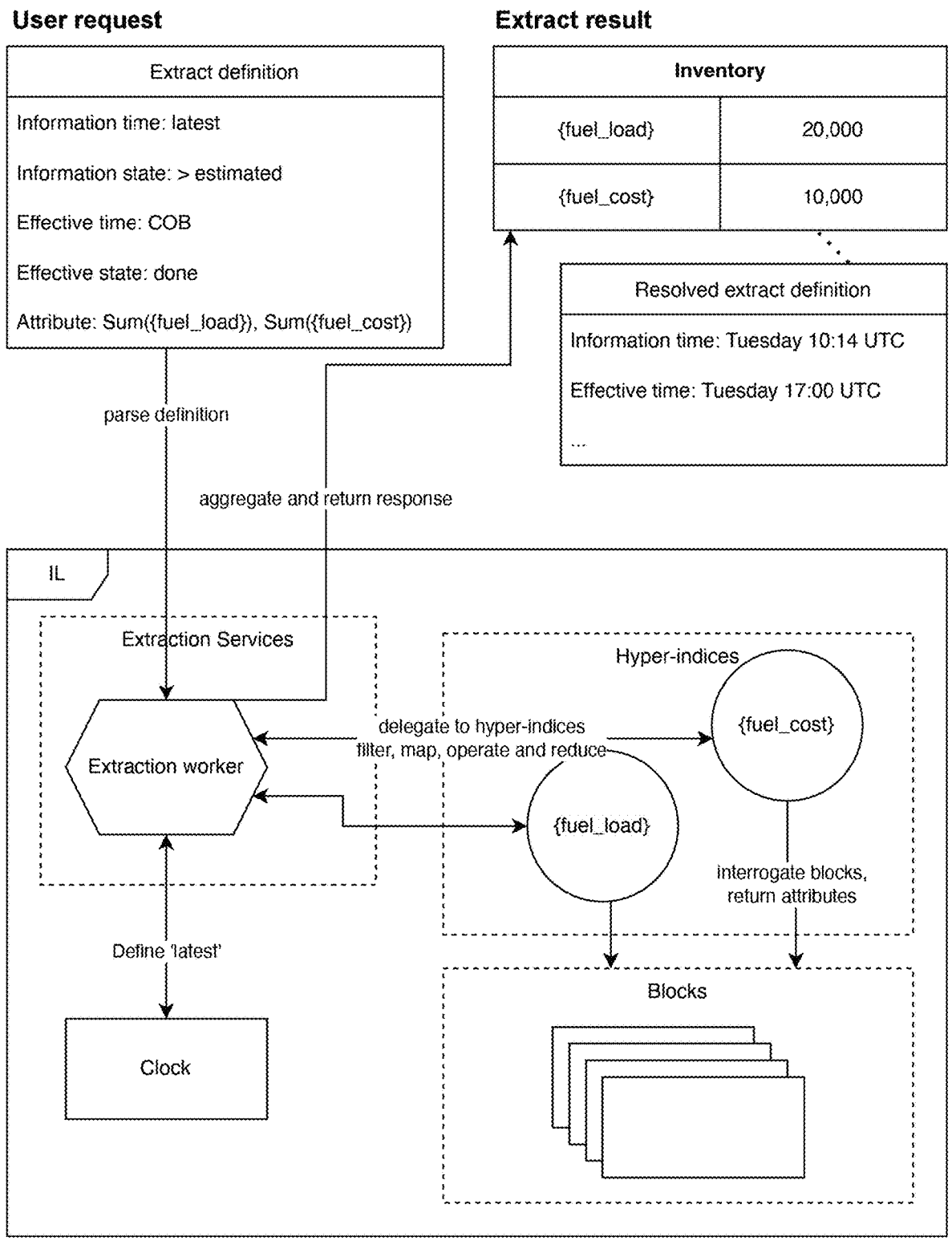
FIG. 19 illustrates the schematic example operation of an extract managed by an extraction manager in accordance with aspects of the present disclosure.

An example extract is shown in FIG. 19. Here, a query is sent to the extraction manager 128 which handles extraction services and instantiates an extraction worker to handle the query. The query specifies that the user would like to know, based on the latest information time frontier available in the business management software system, the total fuel_load and fuel_cost resulting from processes (which may be matched openflight bracket processes) expected to be done by close of business today, for all processes currently having an information state greater than estimated (i.e. they are at least known processes). As can be seen, the extraction manager 128 defines the ambiguous query values such as the latest information time, and the close of business from the perspective of the user, then queries the fuel_load and fuel_cost hyperindices to interrogate the blocks and return the attributes, then filter, map, operate and reduce the results, before the extraction manager 128 returns the extract result to the user.

In FIG. 19, scanning through the information states would reveal the nature of contributions of different current blocks to the forecast attributes. There may be a totality of $S_i$=done blocks in the result, in which case their contribution to the attributes is certain. On the other hand, there may exist blocks of $S_i$=known state in the result, in which case their contribution to the attributes is relatively uncertain (the processes may all be expected to complete by COB, but their attribute values and timings may yet change significantly).

These are hugely powerful insights, especially valuable in their holistic combination, unlocked by the state and bitemporality information that is stored and is efficiently retrievable and interrogatable in the business management software system disclosed herein. It facilitates the transparent yet explicit integration of first sight information with more certain data and allows users to operate on business data without the fundamentally constraining assumptions embedded in conventional systems.

While state reflects the maturity of the process in its lifecycle, it also reflects the certainty of the attributes of the process (prices, quantity, rates, . . . ). The two are coupled in the sense that a block whose information state $S_i$ is estimated expects the process to be more definite once the time corresponding to the $S_e \rightarrow$known state is reached.

These new degrees of freedom of information and effect state are general, to all processes and attributes, and allow us to serve multiple use cases from one source of information. By adopting a fixed set of discrete states that are universally comprehensible, we can help different sets of users find alignment, cooperate, and break down silos.

Figure 20:
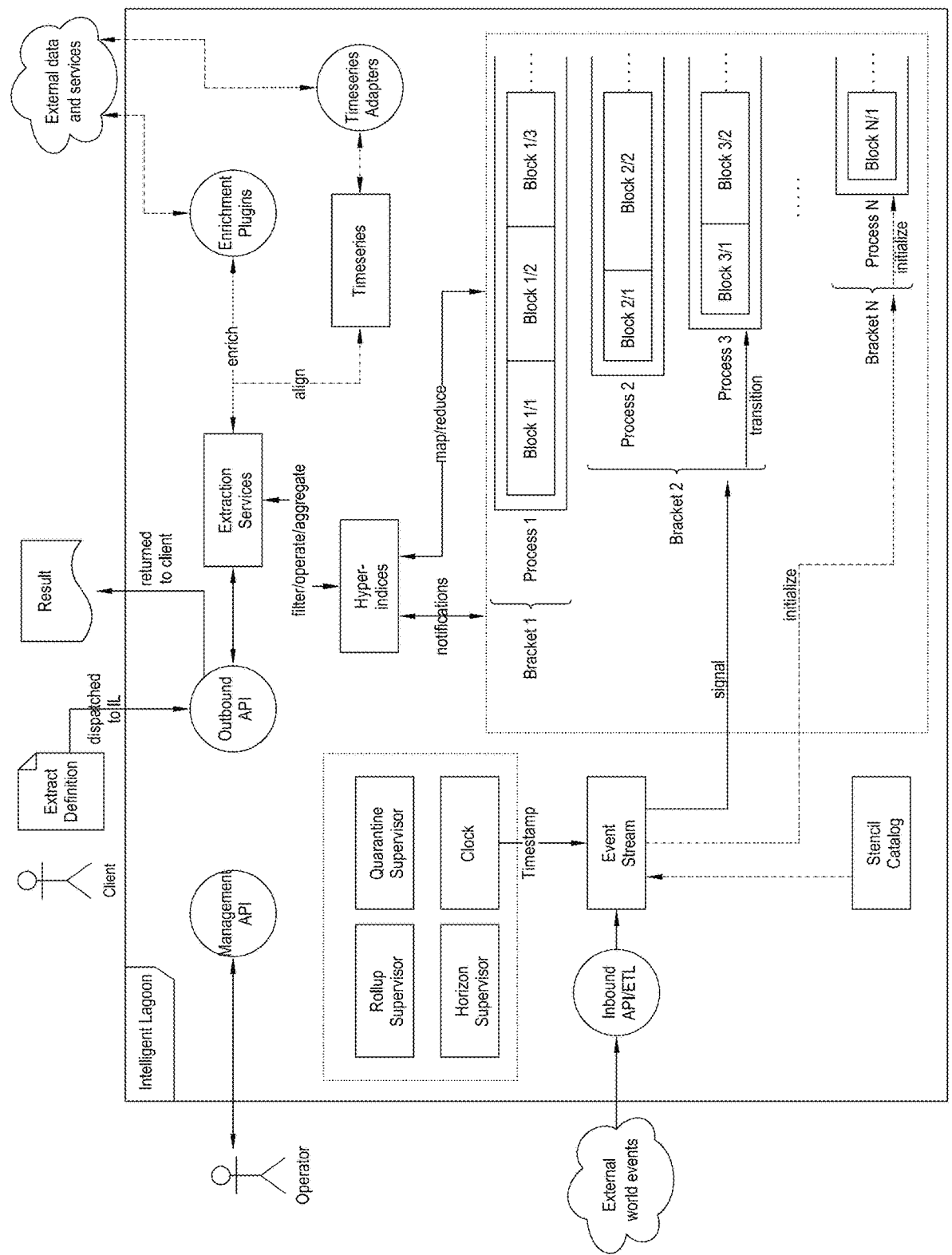
FIG. 20 illustrates a schematic example global overview of the business management software system for monitoring data pertaining to processes in blocks, indexing and managing blocks, and efficiently handling insightful extracts in accordance with aspects of the present disclosure.

The generality of this approach to storing and retrieving information about heterogeneous business processes in a way that captures state and bitemporal information about the evolution of those processes is illustrated in FIG. 20, which shows an overview of the business management software system as a whole for monitoring data pertaining to processes in blocks, indexing and managing blocks, and efficiently handling insightful extracts.

The business management software system described herein provides a model of data which captures processes as bitemporal and stateful objects carrying arbitrary attributes which evolve as events occur. This is as general a view in scope and application as a row in a database table whose columns are considered as attributes, but now imbued with bitemporal and stateful characteristics and improved data integrity. Considering a stream as an infinite table, and where we normally only perceive rows as they strictly transition from 'off' (and wholly invisible) to 'on' (and visible), the invention allows for the perception and preemptive integration of rows in the future of the stream while making their character obvious and explicit at all points. This addresses many of the shortcomings of the data structures and database management systems given in the summary section above.

Unary binary treatment of timing and certainty: By making assumptions of state and bitemporality explicit in the processes and data structures, the business management software system disclosed herein offers new degrees of freedom. Blocks and processes manage multiple views of timing and certainty.

Snapshots: Monostate monotemporal crystallized views: The business management software system disclosed herein offers two continuous dimensions of time and multiple discrete states. This provides views on demand, so that users and applications (functionality) can extract the view they need when they need it, thus removing the drawbacks of crystallized views and the need for functionality to maintain its own particular state, and for the overall architecture to be concerned with the management of state through time and between constituent entities.

Reconciliations: Multiple partial views: The business management software system disclosed herein offers a single source of truth, not a single version of the truth. Dispensing with multiple partial snapshots eliminates the need for reconciliation, and indeed, multiple databases.

Compromised data integrity: The system of processes and blocks provided by the business management software system disclosed herein is composed of append-only lists of immutable data structures. State allows multiple perspectives to be catered for simultaneously, so data does not need to be exchanged and manipulated between systems which provides high data integrity. Append-only immutable data structures enable the system to be idempotent and suitable for book of record and regulatory applications.

Inconsistent computational performance and restricted temporal views: The computational complexity of the extraction process in the business management software system disclosed herein does not vary with the specification of the four new degrees of freedom in different queries. The availability of data does not depend on the frequency of snapshotting and latency is reduced. Forecasting and historical views are served equally easily. The system grows linearly with time as information is received and is very well suited to a distributed scalable implementation.

Monolithic architectures and inflexible systems: Streaming and event-driven architectures appear to be more flexible compared to relational database-centric monoliths, although it is not clear if they are materially less complex to design and manage. As discussed above in the summary, much of the inflexibility in monoliths, and complexity in microservices, arises from a tight coupling of state with functionality, especially when that state is a snapshot of time-evolving events. In contrast, the business management software system disclosed herein can operate at the level of detail available in data and gather diverse incoherent processes with a general approach giving great flexibility. It also reduces the architectural complexity arising from the burden of managing temporal state evolution.

The business management software system disclosed herein is universal, highly generalised and can support a variety of applications. It is designed to offer a view of state on demand according to the view required of the functionality, and even more ideally, the view required by the user, enabling the functionality to operate on whatever view of data (in terms of timing and certainty) the user wishes. The business management software system disclosed herein offers a lightweight set of data structures and coordination without opinions but rather than being just event-driven, the system is event-aware. The homogeneously structured processes and blocks can capture heterogeneous business process behaviour, making the system agile, general, and flexible. This facilitates the essential decoupling of state from functionality illustrated in FIG. 21 and new a new kind of architecture shown in FIG. 22, offloading the burden of temporal evolution of state to the business management software system disclosed herein.

The technical benefits aside, the business management software system disclosed herein offers a platform that fundamentally understands the nature of evolving events and can enable us to be more prepared to answer the questions:

what, who, where, how, when and why? A use case of the business management software system disclosed herein showing how inventory management (what, where, when) can be addressed will now be described.

Inventory Management

An application of the preceding concepts to the broad field of inventory management, will now be described, where software exhibits the flaws described in the summary section, and users and applications would benefit from views of inventory data that correctly recognised the action of time-evolving and uncertain processes. Here, the notion that a process must affect something is introduced, that is to say it impacts some aspect of a business.

Consider an organization as a multitude of assets and resources with processes adding to and subtracting from inventory of those assets and resources. Furthermore, these assets move between being busy, available, invested, rested, defective and such like. In the business management software system disclosed herein we consider them as residing at 'nodes' where different users in a business have responsibility for or interest in them while they are in those conditions. For example, an asset could be a widget, and the widget nodes could be in stock and shipped. Processes move assets from the in stock node to the shipped node. The nodes do not have to correspond to physical locations, they can be accounts or qualities like tired, rested or defective. Graphical depictions of these concepts are shown in FIG. 23 and FIG. 24

Figure 23:
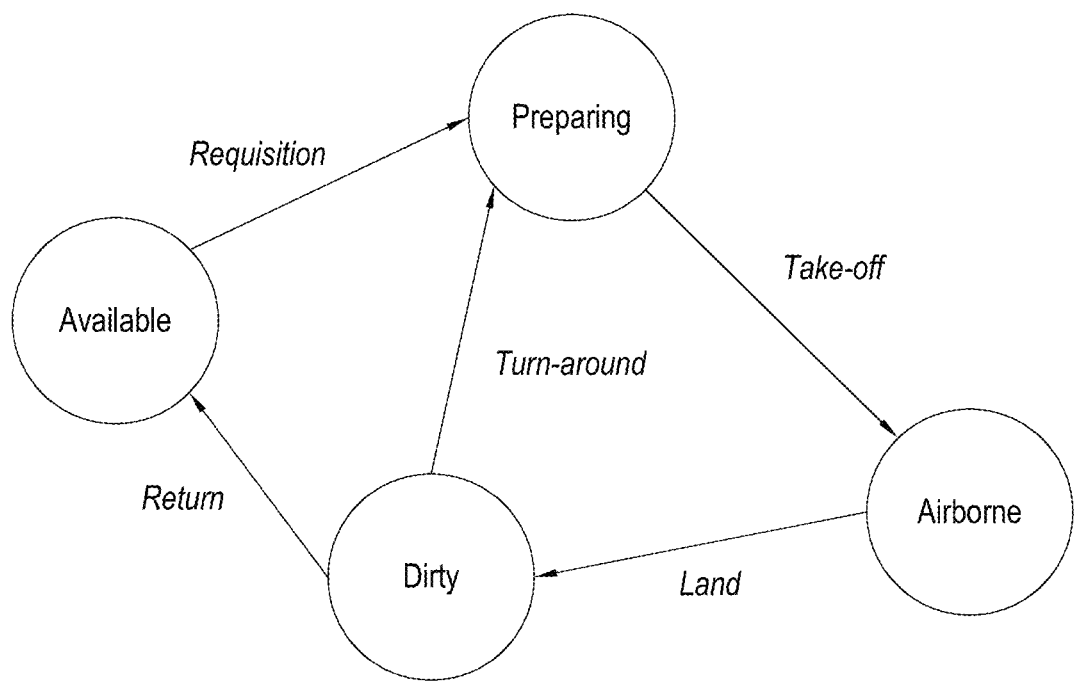
FIG. 23 illustrates a schematic example of an aircraft asset moving between nodes (circles) with processes (line labels) in accordance with aspects of the present disclosure.
Figure 24:
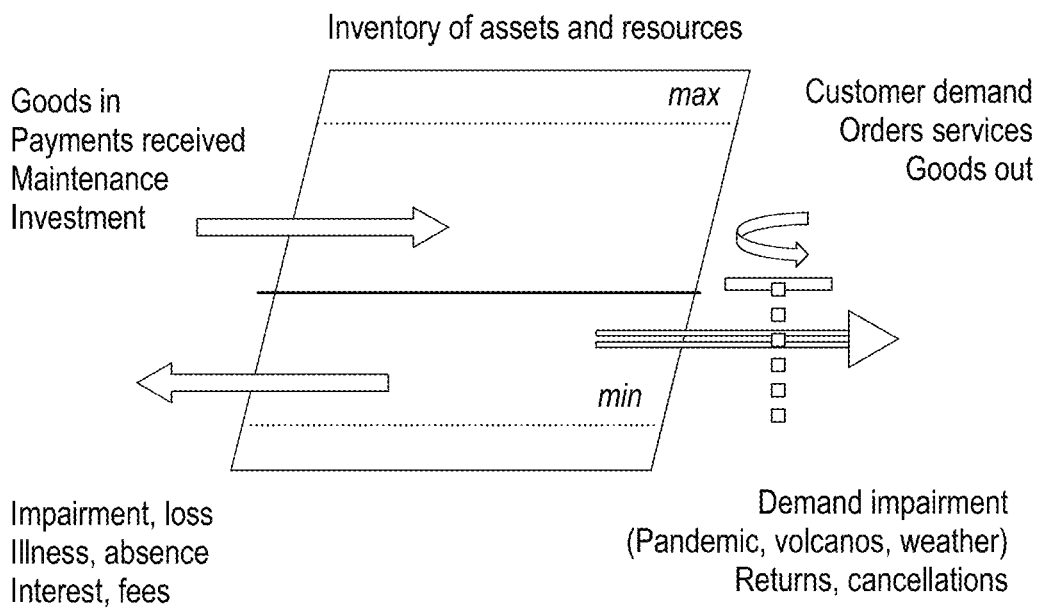
FIG. 24 illustrates a schematic stylized view of maintaining inventory (assets, resources) at optimal levels, between a minimum and maximum level (which may be soft or hard constraints) in accordance with aspects of the present disclosure.

FIG. 23 shows an illustration of an aircraft asset moving between nodes (circles) with processes (line labels). FIG. 24 shows a stylized view of maintaining inventory (assets, resources) at optimal levels, between a minimum and maximum level (which may be soft or hard constraints). There are processes topping the levels up (investment, left-hand input arrow), processes draining the level but not servicing demand (depreciation, left-hand output arrow), and demand-driven processes (represented by the output arrow and tap at the right-hand side) affecting how much customer demand (a) theoretically exists and (b) can access the business in order to drain inventory. Of course, draining by customer demand usually means some other asset (e.g. cash) is being topped up (return on investment). These arrows are not driven by on/off events. In reality, as we have seen, they have state and they do not transition from being completely invisible to completely done in an instant. Oftentimes they can be anticipated too. The business management software system disclosed herein models the evolution of these processes managing inventory using state and bitemporality, meaning that they can be better tracked and managed.

For an organisation to run efficiently and to service demand smoothly, it must keep inventory at each node within acceptable levels, not just for today but tomorrow too, while subject to ever-present uncertainty and evolving events.

We may even want to deeply interrogate historical situations too, for example to reconstruct and understand why a poor business outcome occurred. By offering a complete picture of these resources to a business (complete not just in terms of coverage but also past, present, and future), in the presence of evolving events in an ever-changing world, then the business can begin to:

optimize its use of assets and resources,
  anticipate mismatches of supply and demand,
  test and stress assumptions,
  prevent disruptions by taking proactive actions, and
  correct and stabilise situations rapidly when external and internal disruptions inevitably occur.

Assets and resources are largely synonymous in the system and are best defined by example. Inventory is usually used to represent a count or a quantity of some asset or resource. In finance, inventory is often referred to as positions. The business management software system disclosed herein is designed to handle a wide variety of assets and resources:

Animal, vegetable, mineral, . . . financial, human, data
  Real or abstract, physical or virtual:
    Real/physical: cars, aircraft
    Real/virtual: dematerialized cash, bonds, flights
    Abstract/virtual: supply, demand
    Abstract/real: mileage, hours-until-maintenance
  Fungible, semi-fungible, or not fungible
    Fungible: a narrow-bodied aircraft
    Semi-fungible: an Airbus A320
    Not-fungible: the aircraft with tail number G-EZRZ
  Continuous or discrete
  Permanent, degrading, regenerative Permanent: gold, parking spaces
    Degrading/perishable: oranges, parts
    Regenerative: Flight crew (after rest)
  Asset or liability (simply an asset with negative connotations)
  Single use, time-limited, or reusable
  Financial, non-financial
  Throttled, constrained or infinite For example, a typical asset (resource) that we want to model with the business management software system disclosed herein a Boeing 787-8 (Dreamliner) operated by British Airways with tail number G-ZBJB. This is one of approximately 20 in BA's fleet of this type. It has a number of qualities that make it fungible with other aircraft in the fleet, yet distinctive: the Boeing 787-8 is a long-haul, wide-body machine, the '-8' specification indicates the shortest version. And like many physical assets, this particular aircraft G-ZBJB can only be in one physical location at a time. As a resource, it can carry approximately 240 passengers in two classes but requires a crew of 10 to fly. And for every hour G-ZBJB is in operation the number of hours it can fly before its next scheduled maintenance decreases. All these facts (and more) must be captured by the model for managing the business processes needed by BA to effectively use G-ZBJB servicing passenger demand efficiently.

Certainty does not just concern the timing but also the numerical impact of the process on inventory, and the terms on which those impacts depend, or indeed which specific asset from a pool is being affected. Thus, in embodiments related to inventory, the intended effect the process has on a resource indicated by the attributes may comprise one or more of: an availability of a resource; a physical location of a resource; a virtual location of a resource; a count of a resource; a status of a resource; a condition of a resource.

Taking some examples, at the initiation of a real-estate transaction, the prospective purchaser may not have even identified the particular house she wants to buy, but has a view as to the timing and pricing of the eventual transaction. That view will become more precise as information is accrued. Likewise, when planning flight schedules the specific aircraft used to service the flight may only be assigned closer to the operational date.

In another example, to be entitled to receive a dividend from a stock, being in contractual possession (but not yet settled possession) of the stock at the dividend's ex-date is sufficient. The business management software system can therefore project dividends (whose cash impact is the position in entitled stock multiplied by the dividend rate) based on a view of inventory in the finishing effect state. When the ex-date arrives the dividend process can accurately and precisely measure the inventory meeting the entitlement requirement (applying an information state requirement of $S_i \geq$ finishing too), and transition to the underway state automatically.

To apply the model to counting inventory, there are many possible assets for a given organisation (A1, A2, ... ) and many possible nodes for each asset ($n_{1,1}$, $n_{1,2}$, ..., $n_{2,1}$, ... ). The objective is to count the number of assets at any given node.

A process $\rho$ is a series of business events that moves the inventory of the asset $A_a$ at the node $n_k$ to another node $n_j$. The inventory of the asset $A_a$ at the node $n_k$ is denoted as: $[^{n_k}A_a]$.

Assets remain at nodes unless and until moved on by some process. A process could be the departure of a flight (moving an aircraft from the ground to airborne), the purchase of some asset (such as a house), or the perishing of some item (such as fruit available to make juice to sell). Recognising that few real-world business processes are instantaneous, the effect of the process generally (but not always) becomes more certain as time progresses in direct correspondence to the critical business events that make it more likely that the process will complete. We align these critical business events with the discrete states described in Table 1. above, which may now be revisited to understand the sentences marked with a (*).

For completeness-sake, it should be noted that this model does not insist on a law akin to a conservation of assets and that there implicitly exists the concept of a null node, p. A process may inject (add) assets into the system without accounting for where the asset originated. Likewise assets can be withdrawn without specifying a destination node.

The business management software system disclosed herein enables transparent, precise, yet flexible calculation of inventory for any asset and node that has been configured in the system. In the following (and generally throughout this document), the notation of inventory will be elaborated on to represent inventory of assets at nodes in states of certainty and bitemporality:

The inventory of an asset A at a node n is the sum of the impact attributes a impacting it and is written: $[^n A] = \Sigma\{a\}$.

The inventory of an asset A in some effect state $S_e$ and information state $S_i$, with information time $t_i$ and effective time $t_e$ at some node n is written:

$$[^n A]_{S_i}^{S_e}(t_i, t_e).$$

Turning now to the processes, a process affects inventory of one or more assets at a node by expressing one or more impact attributes. An impact is simply an increment or decrement of the count of inventory at the node. We define an impact function in the process to compute the impacts from the input attributes, which may correspond to things like price, quantity, rate, etc. The impact attributes are not distinctive from previously described output attributes, other than that they correspond to increments and decrements in the quantity of some asset in the system.

Figure 25:
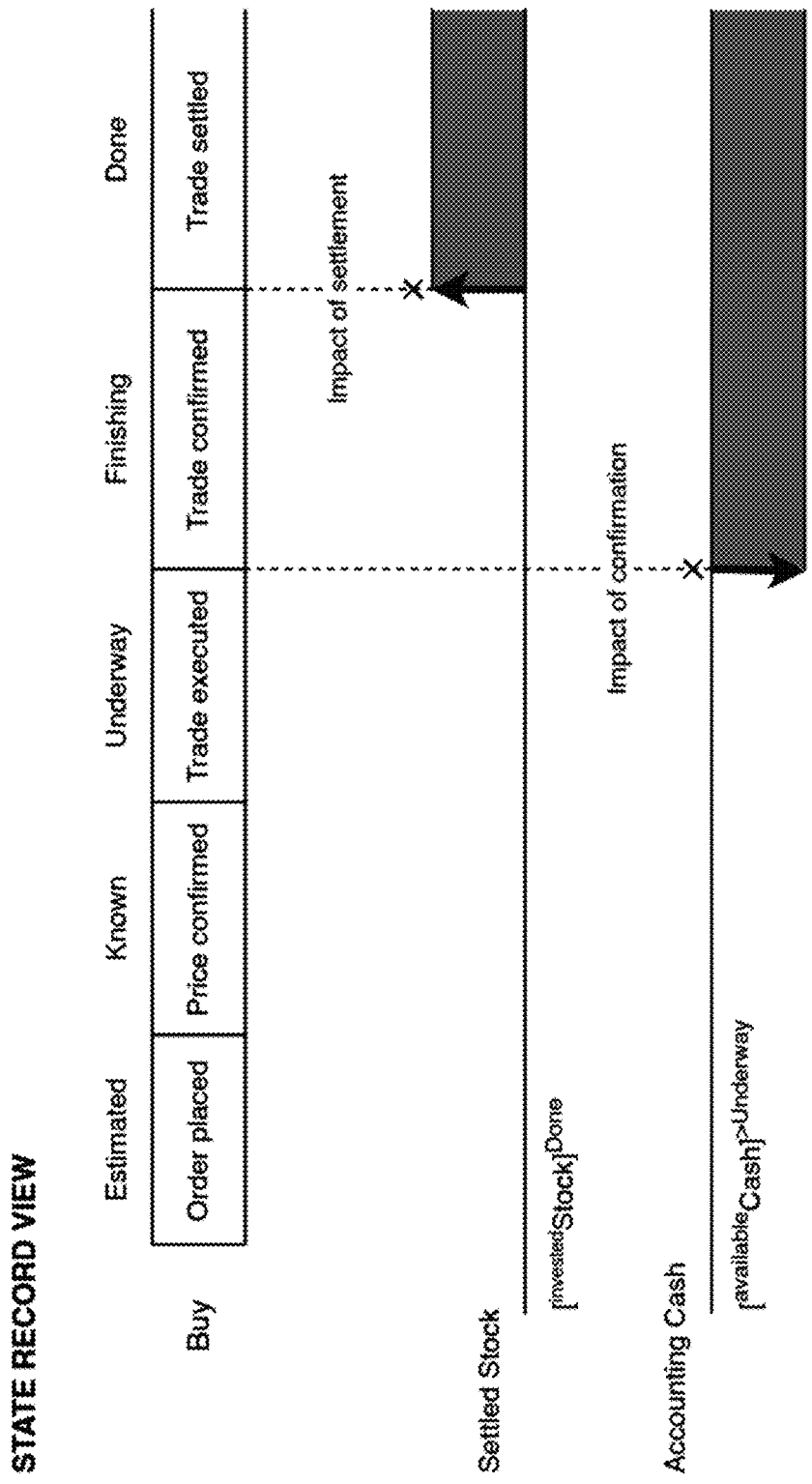
FIG. 25 illustrates a schematic state record view showing how a process can affect more than one item of inventory in the example lifecycle of purchasing a stock in accordance with aspects of the present disclosure.

A process can affect more than one item of inventory: for example in a simple stock purchase illustrated in FIG. 25, $[^{invested}$Stock$]$ increments while $[^{available}$Cash$]$ decrements. The diagram illustrates, for a given block's state records ('State record view') the impacts the process has on inventory of cash and stock as a function of effect state $S_e$ and effect time $t_e$. As state increases so the certainty of the attributes increases too, whether inputs, outputs or impacts. We note in this diagram that the effect state can be used to perceive the impact of the transaction at different stages. Accounting cash may be perceived once the transaction is confirmed, while physical inventory is only perceived once the asset is settled in custody, or placed in the warehouse.

In the example shown in FIG. 12 and FIG. 23, an aircraft taking off increments the number of $[^{airborne}$Aircraft$]$ and decrements $[^{preparing}$Aircraft$]$.

Next we revisit the hyperindices. Suppose that a hyperindex exists for each asset-node and is aware of all and any process and blocks that impact the $[^{node}$Asset$]$. To compute inventory, we follow the description given earlier: the relevant hyperindex calls on relevant blocks to yield their attributes, specifically the impacts to the asset/node in question. The impacts are filtered and aggregated to create view of qualifying inventory.

Figure 26:
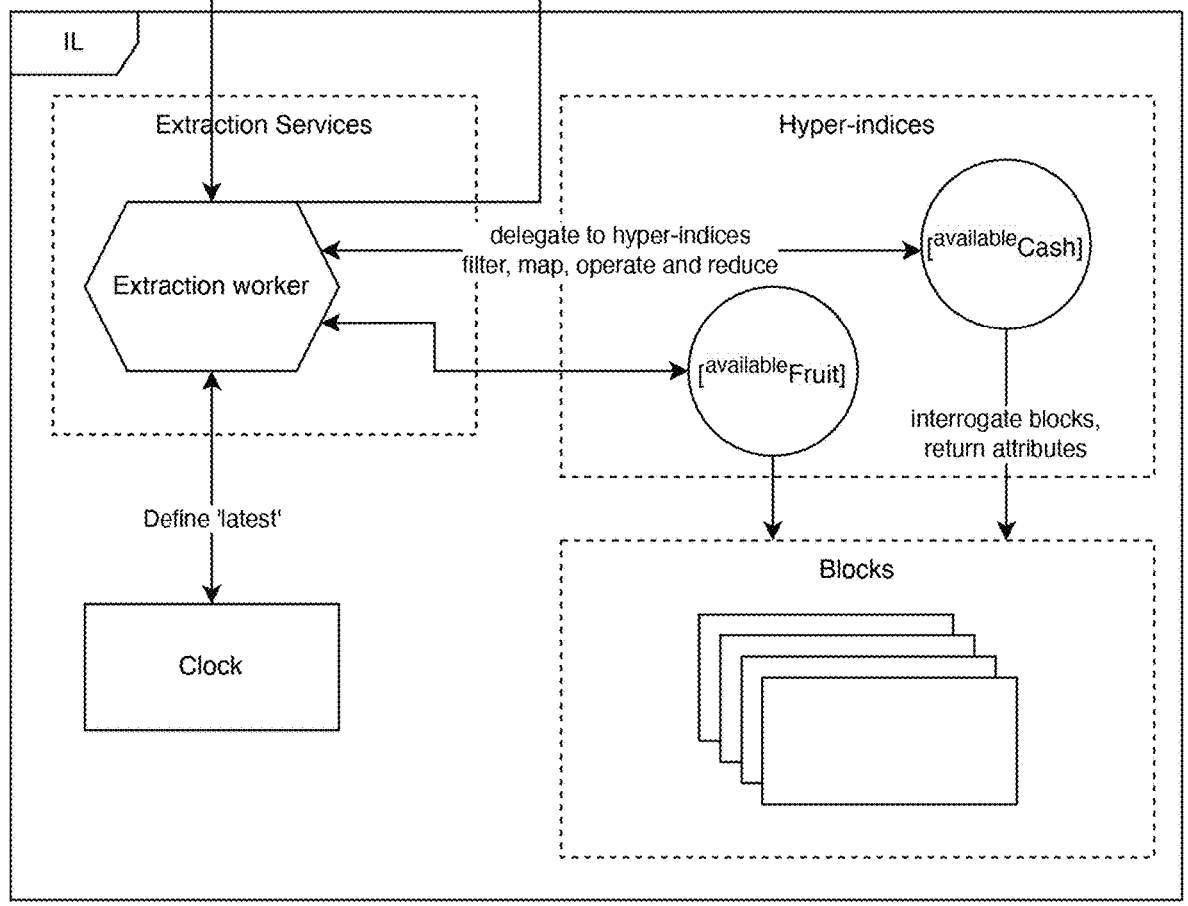
FIG. 26 illustrates a schematic block diagram showing an example of an extraction in the context of inventory management in accordance with aspects of the present disclosure.
Figure 27:
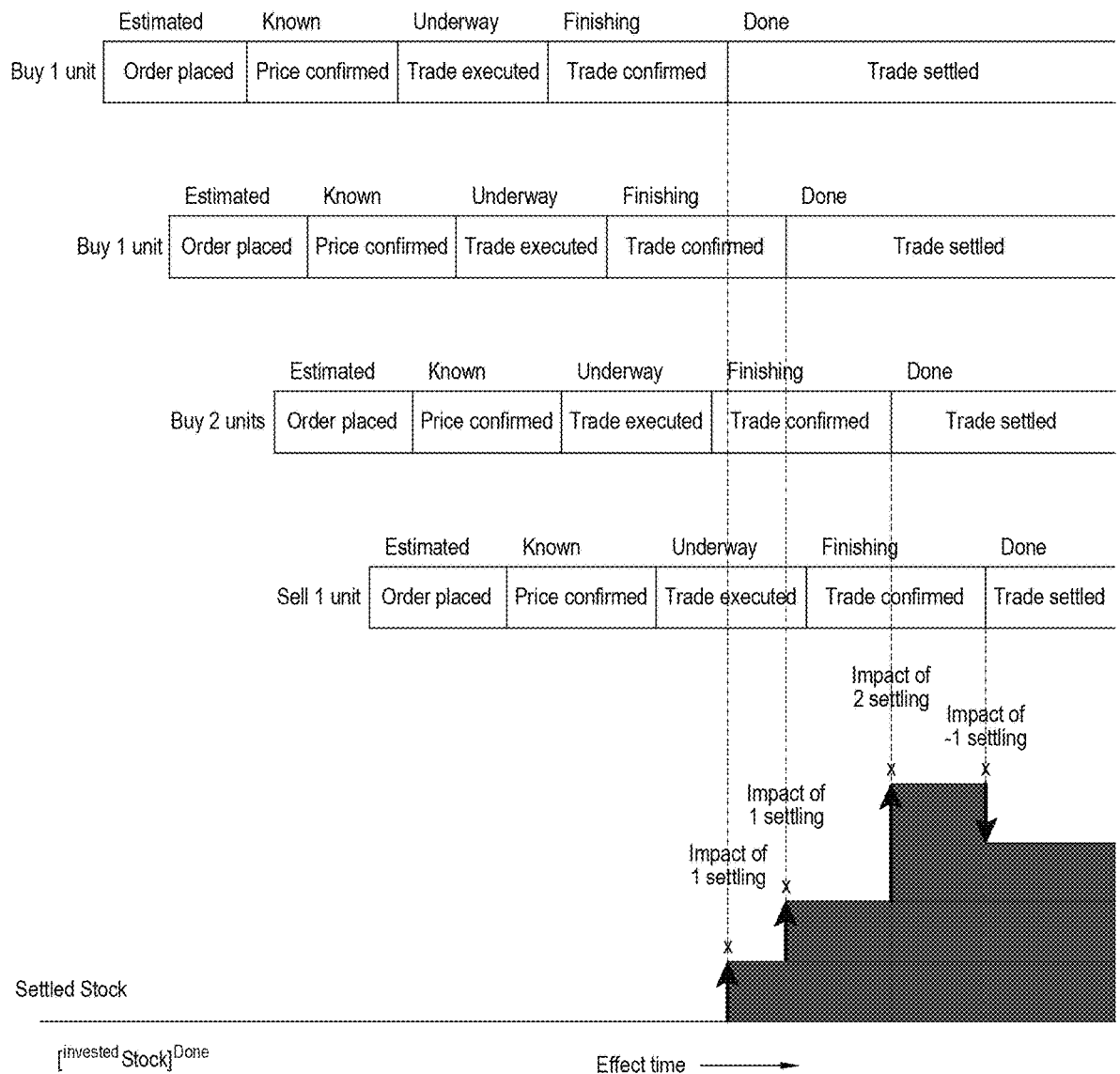
FIG. 27 illustrates a schematic state record view showing an example of how impacts contribute to computed inventory in accordance with aspects of the present disclosure.

FIG. 26 is a block diagram of extraction in the context of inventory management. An example of how impacts contribute to computed inventory is shown in FIG. 27. As with FIG. 25, this diagram presents a state record view, so we are examining the situation from a given information time, and hence within each block yielded by each of the four trading processes. Here, impacts are accumulated with a done effect state from four trading processes (i.e. buy 1 unit; buy 1 unit; buy 2 units; sell 1 unit), to generate a position in settled $[^{invested}$Stock$]$ as a function of effect time $t_e$.

Figure 28:
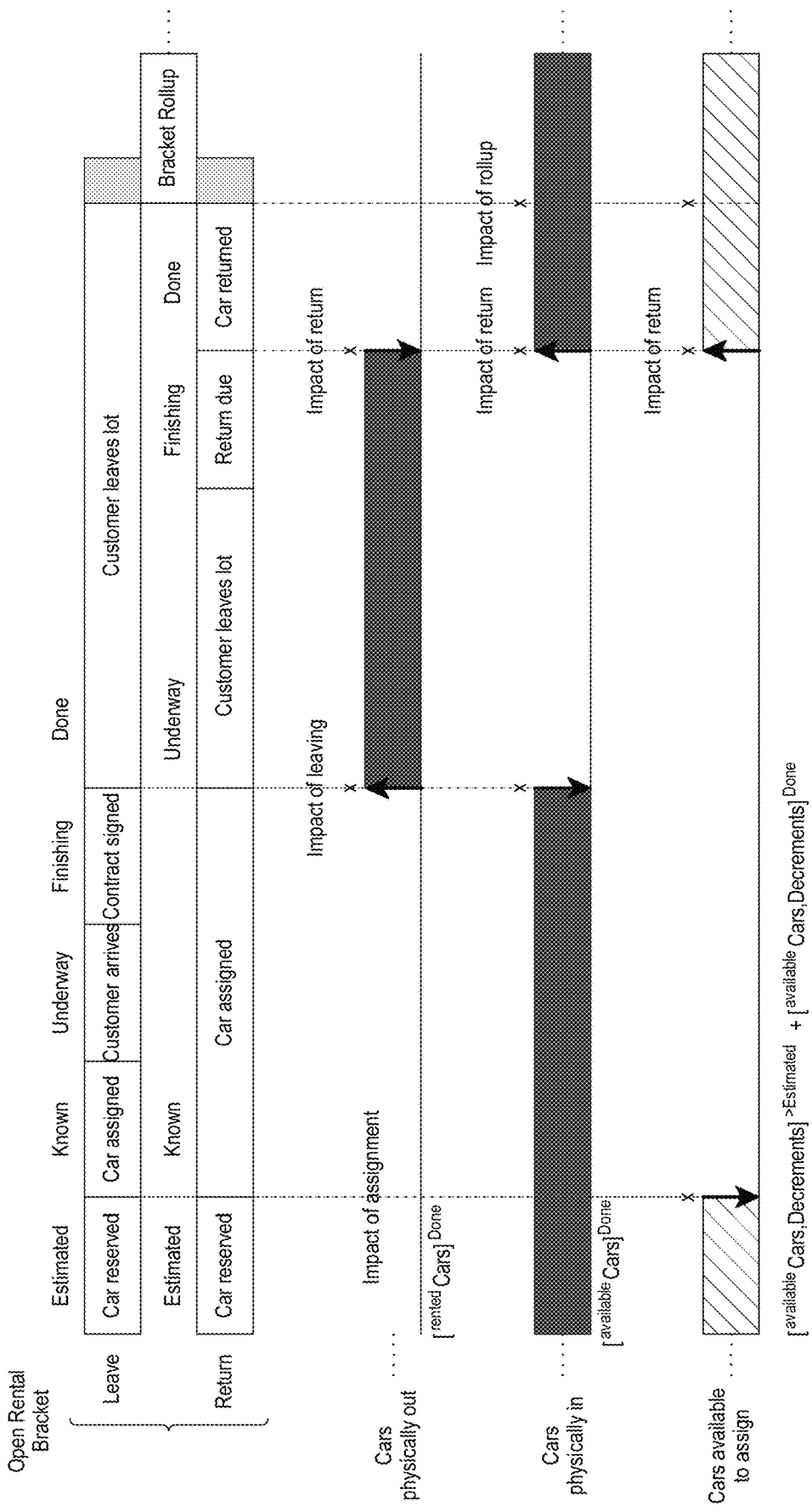
FIG. 28 illustrates a schematic showing a further example for monitoring inventory for a car rental agency for monitoring the effects of rental car leaving and returning processes on inventory in accordance with aspects of the present disclosure.
Figure 29:
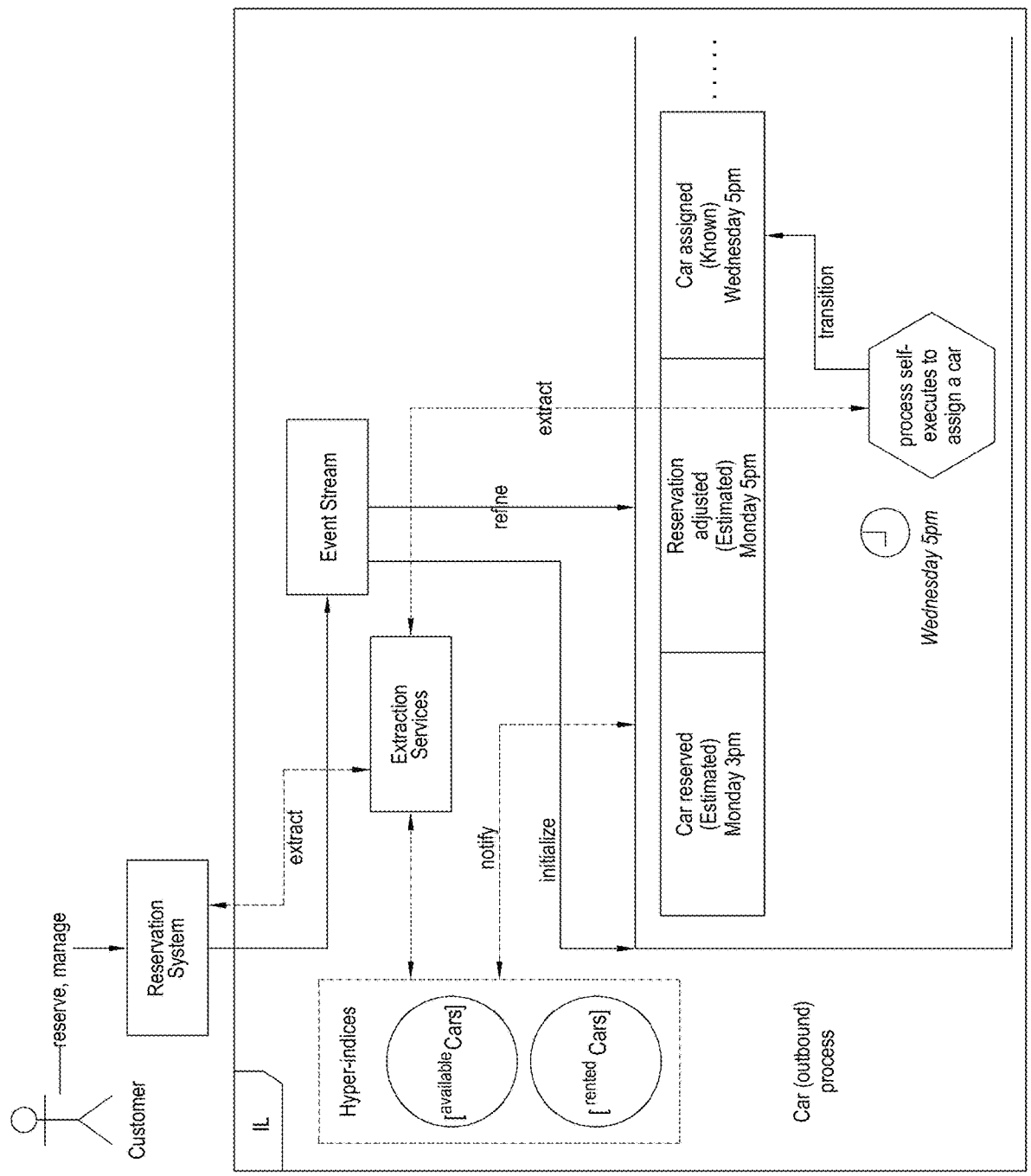
FIG. 29 illustrates a schematic showing an example operation of the business management software system in monitoring the inventory for the car rental agency in accordance with aspects of the present disclosure.

A further example is shown in relation to FIG. 28 and FIG. 29 for monitoring inventory for a car rental agency. This simplified example in FIG. 29 of a car rental agency considers how a customer first reserves a car, which causes the reservation system to extract inventory from the business management software system. The user later adjusts their reservation which causes a refinement to the process. At some point closer to the time when the customer requires the car, the process (having capability and responsibility delegated to do so) assigns a specific car to the booking. The diagram shows how processes and blocks are created in response to internal and external events, and where the process exhibits characteristics of a data structure, an event-driven state machine, and as an object with self-executing autonomy. In relation to FIG. 28, note that, of the three inventory diagrams ("position views") shown for the extractions in the bottom half of the diagram, the top position view concerns the position in $[^{rented}$Cars$]^{Done}$ whereas the middle position view is for the extracted inventory position in $[^{available}$Cars$]^{Done}$ Note that the bottom position view is a combination of selected increments and decrements in particular states, representing cars available to assign (more widely, available to promise, or ATP). This illustrates the power of the system, whereby ATP can be computed from the aggregation of processes which are pessimistically decrementing inventory $[^{available}$Cars, Decrements$]^{>Estimated}$, with processes which are pessimistically incrementing inventory $[^{available}$Cars, Increments$]^{Done}$. A user can view these positions as a function of current information state and effective time to see which cars are likely to be available to assign within their time window of interest.

State is useful for counting inventory for the following reasons. A process groups together key events which otherwise, looked at individually, are noisy relative to the ultimate business objective and difficult to manage. Why does an aircraft push back from the gate? The event is a means to an end, at least as far as the airline is concerned. The airline wants aircraft to depart on-time and full of passengers making the best use of resources available to maximise revenue and minimize cost. The aircraft pushing back is simply an indicator that this objective is more likely to happen. The design and mapping of events to processes will depend on the customer's preferences and objectives. However, the aircraft pushing back from the gate liberates a gate for the airport to use and the bracketing of aggregated matched processes can be advantageous from an operational perspective. Nevertheless, additional processes can be specified at finer levels of detail as required, so that the transition of the larger scale process between two states corresponds to the complete evolution of a smaller scale process from estimated to done (or any other pair of states). For example, pushing an aircraft off the stand requires summoning, using, and dismissing a tug, which itself is a pair of processes moving inventory of tugs between two states and back again (available, busy, available).

While estimated and known, there is no discernible or manifest change in or at the asset's original node. Nonetheless, it is already encumbered by the process set to take place. Any effect on the asset is virtual. Once underway and finishing (which can be considered a checkpoint on progress), work is being done on the asset to move it to its new node. Work needs to be done to finish the job, and work would have to be done to put it back where it's coming from. So the final state of the asset is being realised. And once done, it is unambiguously at the new node and the transformation is complete.

Some business management system may employ the concept of a state machine where the asset moves between states perhaps similar to those laid out here. But that is not the approach taken in the business management software system disclosed herein. We have described inventory of assets as moving between nodes of a customisable graph. Unlike a state machine view, where transitions between states are instantaneous, the transition from one node to another is via a process which takes the above described states and takes time. Further, the states of certainty in the progress of processes are homogenous to heterogeneous processes. In the case that there are more user views of what is complete relative to the number of states available, it is always possible insert an intermediate (possibly virtual) node between the existing nodes and configure a pair of processes, one either side of the inserted node.

Further, it should be noted that introducing more nodes to a state machine representing an asset creates excessive and useless complexity even though computationally it may be attractive. Conventional systems would do such a thing, adding more nodes, or more columns to tables, and still presenting an on/off view, with even whole systems dedicated to one node, with a need to reconcile with others (etc). Instead the approach taken to modelling the state of different processes in the business management software system disclosed herein universally characterises the attributes in terms of their certainty.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. Computing apparatus for monitoring and storing data pertaining to business processes, comprising:
one or more processors; and
memory storing:
a plurality of stencils, each stencil being for one of a plurality of business processes $\rho=(\rho_1, \rho_2, \ldots)$, each stencil being a homogeneously structured program-code template by which a processor may instantiate a process object to monitor progress of a process $\rho$, the process object to operate as a finite state machine able to advance through a sequence of a predefined number of at least two discretized states $S=(S_1, S_2, \ldots, S_n)$, the states universal to each stencil for all modelled processes, the stencil defining:
one or more attributes for the modelled process $\rho_i$, each attribute having a specified data type, to be instantiated as key-value pairs; and
for the sequence of states $S=(S_1, S_2, \ldots, S_n)$, a mapping specifying, for each of the states in the sequence, at least:
a signal event taken to cause a transition to that state, the signal events including information updating knowledge concerning the process $\rho_i$ defined by that stencil; and
an instruction for determining an expected timing for the transition to that state;
wherein the states $S=(S_1, S_2, \ldots, S_n)$ in sequence represent indicators of increasing certainty about the progress of the processes and their attribute values from initialisation to completion;
the memory further storing instructions which when executed cause one or more of the processors to implement a process object manager to:
monitor events received as messages in a stream or queue, wherein at least some of the events include or infer information updating knowledge concerning one or more business processes $\rho=(\rho_1, \rho_2, \ldots)$; and
in response to receipt of any event matching a signal event in a mapping of a stencil for a given business process $\rho_i$ for transitioning to a state $S_j$ of that process, instruct a process object instantiated for process $\rho_i$ based on the stencil for that process to transition to the state $S_j$, thereby causing the process object to generate and store in an immutable, denormalised block a complete view of the state of the process at the time of state transition, the generated block including:
- a timestamp representing the information time for the transition to state $S_j$;
- the current attribute values for the process based on information contained in the event and/or the stencil;
- if a block has previously been generated corresponding to a transition to an earlier effective state $S_e=(S_1, \ldots, S_{j-1})$ of the process $\rho_i$, a reference to the most recently generated and stored block;
- for any and all previous effect states $S_e=(S_1, \ldots, S_{j-1})$ of the process $\rho_i$:
  - a timestamp of the time the process transitioned to the previous effect state; and
  - attribute values for the process as stored in the block for that previous effect state;
- and, for any and all subsequent effective states $S_e=(S_{j+1}, \ldots, S_n)$ of the process $\rho_i$:
  - a timestamp of the expected time for the transition to that state; and
  - the expected attribute values for the process based on the current attribute values;

the receipt of event signals for the process $\rho_i$ thereby generating an append-only contiguous chain of immutable blocks each providing a complete bitemporal view of the process $\rho_i$ in its evolution over information time through the sequence of states $S=(S_1, S_2, \ldots, S_n)$, each block showing, at that information time, the realized times at which transitions of the process to earlier states occurred, the values of the attributes at those times, the time the current state took effect and the current values of the attributes, and the expected times at which transitions of the process to later states are expected take effect.

2. The computing apparatus of claim 1, wherein one or more of the attributes defined in the stencils indicate an intended effect the process represented by the stencil has on a resource at completion of the process.

3. The computing apparatus of claim 2, wherein the intended effect the process has on a resource indicated by the attributes comprises one or more of:
- an availability of a resource;
- a physical location of a resource;
- a virtual location of a resource;
- a count of a resource;
- a status of a resource;
- a condition of a resource.

4. The computing apparatus of claim 1, wherein one or more of the attributes defined in the stencils takes a value from or based on a value contained in an event received on the event stream or queue.

5. The computing apparatus of claim 1, wherein to monitor events received as messages in an event stream, the process object manager is configured to monitor a stream of events on an event channel in an event driven architecture.

6. The computing apparatus of claim 1, wherein the number of states $S=(S_1, S_2, \ldots, S_n)$ in the sequence is at least three, and optionally five states.

7. The computing apparatus of claim 1, wherein when an event is received matching a signal in a mapping of a stencil for a given business process $\rho_i$ for transitioning to a state $S_j$ of that process, where the transition to one or more previous states in the sequence has not previously occurred, the instructions further to instruct the finite state machine instantiated for process $\rho_i$ to transition to the state $S_j$ and to generate and store in the block record for the state transition to $S_j$, for any skipped previous effect states of the process $\rho_i$:
- a timestamp of the time of the current state transition to the state $S_j$ at the time the process transitioned to the skipped effect state; and
- attribute values for the process as stored in the block for the transition to the effect state $S_j$.

8. The computing apparatus of claim 1, the process object manager further being to instantiate a process object $\rho_i$ based on the stencil for that process in response to receipt of the first signal event for causing a state transition to any state for the process.

9. The computing apparatus of claim 1, the process object manager further being to:
- in response to receipt of any event for the business process $\rho_i$ not corresponding to a state transition in the stencil for that process, instruct the process object $\rho_i$ to refine the stored information about the process in the current state $S_j$ or a prior state, causing the generation and storage in an immutable, denormalised block record a refined complete view of the state of the process at the time of receipt of the event, the generated block including:
  - a timestamp of the time at which the block was created representing the information time for the refinement;
  - updated current attribute values for the process based on the received event;
  - a reference to the most recently generated and stored block;
  - for any and all previous effect states $S_e=(S_1, \ldots, S_{j-1})$ of the process $\rho_i$:
    - a timestamp of the time the process transitioned to the previous effect state; and
    - attribute values for the process as stored in the block for that previous effect state;
  - and, for any and all subsequent effective states $S_e=(S_{j+1}, \ldots, S_n)$ of the process $\rho_i$:
    - a timestamp of the expected time for the transition to that state; and
    - the expected attribute values for the process based on the updated current attribute values.

10. The computing apparatus of claim 1, the process object manager being further to: when the current information time passes beyond the expected time stored in the current block process $\rho_i$ for the transition to a subsequent effective state $S_{j+1}$ for the process $\rho_i$, either:
- cause the process object $\rho_i$ instantiated for the process $\rho_i$ to automatically transition to the subsequent effective state $S_{j+1}$ for the process and to generate and store in a new block a complete view of the state of the process at the time of the deemed transition to state $S_{j+1}$, the block being optionally marked as compromised until a further event is received confirming or refining the deemed state transition; or
- cause the process object $\rho_i$ instantiated for the process $\rho_i$ to generate and store in a new block a complete view of the state of the process at the time of the expected deemed transition to state $S_{j+1}$, where the timestamps of the expected times for the transition to the subsequent effective states $S_e=(S_{j+1}, \ldots, S_n)$ are updated to reflect the absence of the expected signal event to causing transition to the next state $S_{j+1}$, and the block being optionally marked as compromised until a further signal event is received corresponding to the transition to a subsequent effective state $S_e=(S_{j+1}, \ldots, S_n)$.

11. The computing apparatus of claim 1, wherein the generated block further includes one or more of:
- a unique identifier for the process $\rho_i$;
- an index value for the block that is incremented for each block in the chain;
- wherein the reference to the most recently generated and stored block is the index value of the previous block in the chain.

12. The computing apparatus of claim 1, the memory further storing, in relation to the stencil for each process, tags for one or more hyperindices instantiated by a hyperindex manager to be notified by the process object on the generation and storage of a new block for the process, the process object manager being further to cause the process objects, on the generation and storage of a new block, to send a hyperindex notification to the hyperindices tagged in the stencil for the process $\rho_i$, the hyperindex notification including: a timestamp of the block creation in information time, an identifier of the process $\rho_i$ and a reference to the generated and stored block, the hyperindices thereby selectively indexing the relevant subset of all blocks and/or processes current for that hyperindex at all information times, the hyperindex notification optionally further including an indication of the current information state for the process.

13. The computing apparatus of claim 12, the process object manager being further to:
- when an instruction to close a process object is received, optionally from a rollup manager instantiated to manage and close processes, in response to the rollup manager determining that the process monitored by process object has transitioned to and settled in the final state $S_n$ of that process:
- cause to send to the hyperindices instantiated by a hyperindex manager tagged in the stencil for the process $\rho_i$, the hyperindices storing the reference to the final block for the process, an instruction to remove the closed process, the hyperindices thereafter removing the reference to the blocks for the closed process $\rho_i$ and/or the reference to the closed process $\rho_i$ from the hyperindex for the notified information time onwards; and
- close the process object.

14. The computing apparatus of claim 1, the process object manager further being configured to store in the blocks additional information relating to the process as a payload data.

15. The computing apparatus of claim 1, the process object manager further being configured to store in each block as the reference to the previous block a cryptographic hash of the previous block, the blocks thereby forming an immutable blockchain for each process.

16. The computing apparatus of claim 15, the process object manager causing created blocks to be transmitted to a network of peer computing apparatus each to validate and store copies of the created blocks, the network of peer nodes immutably storing the blockchain in a distributed ledger.

17. A computer implemented method for monitoring and storing data pertaining to business processes, the computer having access to a plurality of stencils, each stencil being for one of a plurality of business processes $\rho=(\rho_1, \rho_2, \ldots)$, each stencil being a homogeneously structured program-code template by which a processor may instantiate a process object to monitor progress of a process $\rho$, the process object to operate as a finite state machine able to advance through a sequence of a predefined number of at least two discretized states $S=(S_1, S_2, \ldots, S_n)$, the states universal to each stencil for all modelled processes, the stencil defining:
- one or more attributes for the modelled process $\rho_i$, each attribute having a specified data type, to be instantiated as key-value pairs; and
- for the sequence of states $S=(S_1, S_2, \ldots, S_n)$, a mapping specifying, for each of the states in the sequence, at least:
  - a signal event taken to cause a transition to that state, the signal events including information updating knowledge concerning the process $\rho_i$ defined by that stencil; and
  - an instruction for determining an expected timing for the transition to that state;
- wherein the states $S=(S_1, S_2, \ldots, S_n)$ in sequence represent indicators of increasing certainty about the progress of the processes and their attribute values from initialisation to completion;

the method comprising:
- monitoring events received as messages in a stream or queue, wherein at least some of the events include or infer information updating knowledge concerning one or more business processes $\rho=(\rho_1, \rho_2, \ldots)$; and
- in response to receipt of any event matching a signal event in a mapping of a stencil for a given business process $\rho_i$ for transitioning to a state $S_j$ of that process, instructing a process object instantiated for process $\rho_i$ based on the stencil for that process to transition to the state $S_j$, thereby causing the process object to generate and store in an immutable, denormalised block a complete view of the state of the process at the time of state transition, the generated block including:
  - a timestamp representing the information time for the transition to state $S_j$;
  - the current attribute values for the process based on information contained in the event and/or the stencil;
  - if a block has previously been generated corresponding to a transition to an earlier effective state $S_e=(S_1, \ldots, S_{j-1})$ of the process $\rho_i$, a reference to the most recently generated and stored block;
  - for any and all previous effect states $S_e=(S_1, \ldots, S_{j-1})$ of the process $\rho_i$:
    - a timestamp of the time the process transitioned to the previous effect state; and
    - attribute values for the process as stored in the block for that previous effect state;
  - and, for any and all subsequent effective states $S_e=(S_{j+1}, \ldots, S_n)$ of the process $\rho_i$:
    - a timestamp of the expected time for the transition to that state; and
    - the expected attribute values for the process based on the current attribute values;
- the receipt of event signals for the process $\rho_i$ thereby generating an append-only contiguous chain of immutable blocks each providing a complete bitemporal view of the process $\rho_i$ in its evolution over information time through the sequence of states $S=(S_1, S_2, \ldots, S_n)$, each block showing, at that information time, the realized times at which transitions of the process to earlier states occurred, the values of the attributes at those times, the time the current state took effect and the current values of the attributes, and the expected times at which transitions of the process to later states are expected take effect.

18. Computer readable medium comprising instructions which when executed cause computing apparatus to carry out the method as claimed in claim 17.

19. A computer readable medium storing an append-only contiguous chain of immutable blocks, generated by a computer implemented method for monitoring and storing data pertaining to business processes, the computer having access to a plurality of stencils, each stencil being for one of a plurality of business processes $\rho=(\rho_1, \rho_2, \ldots)$, each stencil being a homogeneously structured program-code template by which a processor may instantiate a process object to monitor progress of a process $\rho$, the process object to operate as a finite state machine able to advance through a sequence of a predefined number of at least two discretized states $S=(S_1, S_2, \ldots, S_n)$, the states universal to each stencil for all modelled processes, the stencil defining:

one or more attributes for the modelled process $\rho_i$, each attribute having a specified data type, to be instantiated as key-value pairs; and for the sequence of states $S=(S_1, S_2, \ldots, S_n)$, a mapping specifying, for each of the states in the sequence, at least:

a signal event taken to cause a transition to that state, the signal events including information updating knowledge concerning the process $\rho_i$ defined by that stencil; and an instruction for determining an expected timing for the transition to that state;

wherein the states $S=(S_1, S_2, \ldots, S_n)$ in sequence represent indicators of increasing certainty about the progress of the processes and their attribute values from initialisation to completion;

the method comprising:

monitoring events received as messages in a stream or queue, wherein at least some of the events include or infer information updating knowledge concerning one or more business processes $\rho=(\rho_1, \rho_2, \ldots)$; and in response to receipt of any event matching a signal event in a mapping of a stencil for a given business process $\rho_i$ for transitioning to a state $S_j$ of that process, instructing a process object instantiated for process $\rho_i$ based on the stencil for that process to transition to the state $S_j$, thereby causing the process object to generate and store in an immutable, denormalised block a complete view of the state of the process at the time of state transition, the generated block including:

a timestamp representing the information time for the transition to state $S_j$;

the current attribute values for the process based on information contained in the event and/or the stencil;

if a block has previously been generated corresponding to a transition to an earlier effective state $S_e = (S_1, \ldots, S_{j-1})$ of the process $\rho_i$, a reference to the most recently generated and stored block;

for any and all previous effect states $S_e=(S_1, \ldots, S_{j-1})$ of the process $\rho_i$:

a timestamp of the time the process transitioned to the previous effect state; and attribute values for the process as stored in the block for that previous effect state;

and, for any and all subsequent effective states $S_e=(S_{j+1}, \ldots, S_n)$ of the process $\rho_i$:

a timestamp of the expected time for the transition to that state; and the expected attribute values for the process based on the current attribute values;

the receipt of event signals for the process $\rho_i$ thereby generating an append-only contiguous chain of immutable blocks each providing a complete bitemporal view of the process $\rho_i$ in its evolution over information time through the sequence of states $S=(S_1, S_2, \ldots, S_n)$, each block showing, at that information time, the realized times at which transitions of the process to earlier states occurred, the values of the attributes at those times, the time the current state took effect and the current values of the attributes, and the expected times at which transitions of the process to later states are expected take effect.

20. Computer readable medium storing a plurality of append-only contiguous chains of immutable blocks as claimed in claim 19, the chains of immutable blocks each representing the evolution of one of a plurality of different business processes $\rho=(\rho_1, \rho_2, \ldots)$ over information time through a sequence of states $S=(S_1, S_2, \ldots, S_n)$ universal to each of the different processes.

\* \* \* \* \*